United States Patent [19]

Cheney et al.

[11] 3,727,192

[45] Apr. 10, 1973

[54] CENTRAL PROCESSING SYSTEM HAVING PRELOADER AND DATA HANDLING UNITS EXTERNAL TO THE PROCESSOR CONTROL UNIT

[75] Inventors: Thomas K. Cheney, Worthington; Albert D. Patterson, Galion; Henry E. Rondina, Wickliffe, Ohio; James A. Watts, Stockholm, Sweden

[73] Assignee: North Electric Company, Galion, Ohio

[22] Filed: Apr. 30, 1971

[21] Appl. No.: 139,014

[52] U.S. Cl. ............................. 340/172.5, 179/15 A

[51] Int. Cl. ............................................. G06f 9/18

[58] Field of Search .................. 340/172.5; 179/15 A

[56] References Cited

UNITED STATES PATENTS

| | | | |
|---|---|---|---|
| 3,573,854 | 4/1971 | Watson | 340/172.5 |
| 3,453,607 | 7/1969 | Cohler et al. | 340/172.5 X |
| 3,274,566 | 9/1966 | McGrogan, Jr. | 340/172.5 X |
| 3,311,896 | 3/1967 | Delmege, Jr. et al. | 340/172.5 |
| 3,350,692 | 10/1967 | Cagle et al. | 340/172.5 |
| 3,629,851 | 12/1971 | Werner | 340/172.5 |

*Primary Examiner*—Paul J. Henon
*Assistant Examiner*—Melvin B. Chapnick
*Attorney*—Johnson, Dienner, Emrich, Verbeck & Wagner

[57] ABSTRACT

A central processor unit (CPU) is used as a control element in an automatic telephone system. Certain other elements of the telephone system and peripheral devices thereof assigned various priority levels call for the services of the central processor unit by interrupting the central processor unit via an interrupt unit (IU). The central processor unit controls and supervises other elements of the telephone system and peripheral devices thereof via a multiplexer (MUX) and one or a plurality of data transfer units (DTU). The central processor unit comprises a data handling unit (DHU), a memory or storage module unit (SMU), a hardwired logic preloader (PRE), and a processor control unit (PCU) which, under control of a program stored in SMU, controls the various elements of the central processor unit and the associated telephone system. The data handling unit is a unit segregated from but cooperating with the processor control unit and includes segmented registers, shift control and character transfer gates for accommodating either words or characters. The processor control unit contains control logic and clock means which cooperate to stop the clock as required in the provision of asynchronous operation of the processor control unit with internal and external elements such as the shift control in the data handling unit, and the multiplexer unit. Communication between personnel and the central processor unit is effected by means of a master control panel (MCP) with manual controls and indication lamps thereon; and by means of keyboards via data transfer and multiplexer units.

41 Claims, 58 Drawing Figures

CENTRAL PROCESSOR UNIT COMPLEX

CENTRAL PROCESSOR UNIT COMPLEX

INVENTORS
THOMAS K. CHENEY
ALBERT D. PATTERSON
HENRY E. RONDINA
JAMES A. WATTS

BY Johnson Dienner Emrich Verbeck & Wagner
ATTORNEYS

PRELOADER PROGRAM FLOWCHART

PRELOADER PROGRAM
FLOWCHART

PATENTED APR 10 1973 3,727,192

SHEET 27 OF 50

PATENTED APR 10 1973 3,727,192

SHEET 36 OF 50

TABLE I

| CLOCK NO. ↓ / BIT NO. → | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | 0 | 0 | 0 | 0 | 0 | 0 | 0 | 0 | 1 | 1 | 1 | 1 | 0 | 0 | 0 | 0 |
| 1 | 0 | 0 | 0 | 0 | 0 | 0 | 0 | 0 | 0 | 1 | 1 | 1 | 1 | 0 | 0 | 0 |
| 2 | 0 | 0 | 0 | 0 | 0 | 0 | 0 | 0 | 0 | 0 | 1 | 1 | 1 | 1 | 0 | 0 |
| 3 | 0 | 0 | 0 | 0 | 0 | 0 | 0 | 0 | 0 | 0 | 0 | 1 | 1 | 1 | 1 | 0 |
| 4 | 0 | 0 | 0 | 0 | 0 | 0 | 0 | 0 | 0 | 0 | 0 | 0 | 1 | 1 | 1 | 1 |

TABLE II

| WEIGHT → | 1 | 2 | 4 | 8 | | | | | |
|---|---|---|---|---|---|---|---|---|---|
| CLOCK NO. ↓ | A1 | A2 | A3 | A4 | Σ1 | Σ2 | Σ3 | Σ4 | C4 |
| 0 | 0 | 0 | 1 | 0 | 1 | 1 | 0 | 0 | 1 |
| 1 | 1 | 1 | 0 | 0 | 0 | 1 | 0 | 0 | 1 |
| 2 | 0 | 1 | 0 | 0 | 1 | 0 | 0 | 0 | 1 |
| 3 | 1 | 0 | 0 | 0 | 0 | 0 | 0 | 0 | 1 |
| 4 | 0 | 0 | 0 | 0 | 1 | 1 | 1 | 1 | 0 |

TIMING SEQUENCE I

FIG. 49A ASSEMBLY DIAGRAM FOR CENTRAL PROCESSOR SYSTEM BLOCK DIAGRAM

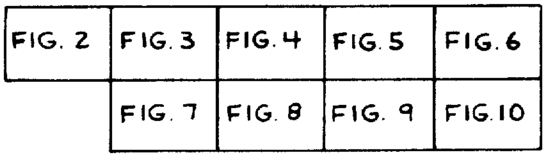

FIG. 49B ASSEMBLY DIAGRAM FOR PRE-LOADER LOGIC DIAGRAM

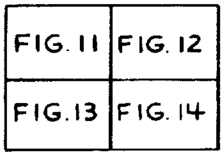

FIG. 49C ASSEMBLY DIAGRAM FOR PRE-LOADER PROGRAM FLOW CHART

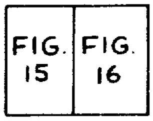

FIG. 49D ASSEMBLY DIAGRAM FOR DATA HANDLING UNIT LOGIC DIAGRAM

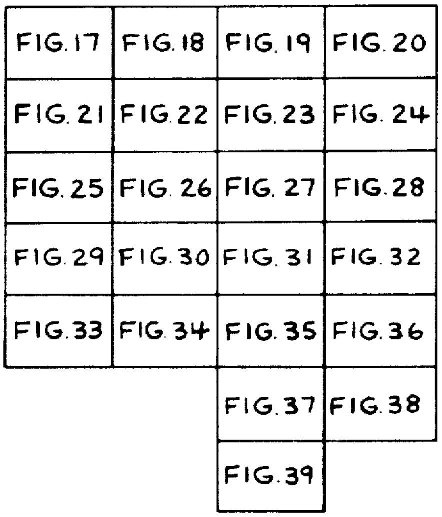

FIG. 49E ASSEMBLY DIAGRAM FOR CLOCK LOGIC DIAGRAM

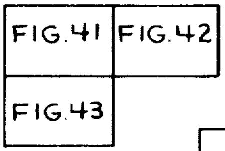

FIG. 49F ASSEMBLY DIAGRAM FOR SIXTEEN REGISTER ARRAY AND ADDRESSING ILLUSTRATION

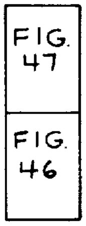

SYSTEM PROGRAM SECTIONS

A CENTRAL PROCESSING SYSTEM HAVING PRELOADER AND DATA HANDLING UNITS EXTERNAL TO THE PROCESSOR CONTROL UNIT

BACKGROUND OF THE INVENTION

1. Field of the Invention

The invention relates to automatic telephone switching systems controlled by central processor means having a stored program and more particularly to improvement of the processor thereof.

2. Description of the Prior Art

In prior art systems of this type the following arrangements are found:

Preloading was accomplished by means of a rather cumbersome arrangement comprising wired in logic in the control unit of the processor.

The data handling and control circuitries were intertwined in a unitary fashion making for inflexibility in design and usage.

Asynchronous operation of the processor control unit with other internal or external devices or circuits was accomplished, keeping the control clock running but specifying when the control unit would look at the controlled device or circuit for a return signal; which arrangement was somewhat inflexible in dealing with devices of different speeds and required more logic circuitry.

SUMMARY OF THE INVENTION

The present invention includes a preloading arrangement utilizing hardwired logic instructions in a circuit separate from the control logic circuit of the processor control unit which takes advantage of the fact that the control logic circuit is already logically arranged to handle program instructions received from the processor memory, whereby preloader instructions and instructions from the processor memory enter the control unit via common OR circuits so that the control circuit sees no difference. Placement of the preloader logic in the processor control unit requires more equipment, and the instruction handling capability inherent in the control unit is not utilized.

Also, the data handling unit is a unit segregated from the processor control unit but cooperating therewith under program control with certain arrangements therein whereby the data handling unit has the inherent capability of working with different types of processor control units, i.e., processor control units differing in word format and in sequence of operation. The word format may involve the complete word or any part thereof which has a specific meaning. The entire central processor unit unit including the data handling unit is made up of integrated circuits comprising an address register, a data register, a memory register with certain input and output logic, a shift control circuit which shift control circuit is driven by a 4Mh oscillator, an arithmetic and logic unit, a 16-register memory array using character and bit addressing, and certain logic which bypasses the 16-register memory array. All of these elements are segmented to accommodate either words or parts thereof. Parallel input signals from external sources arrive via the multiplexer as called for by the data handling unit, and is forwarded to the 16 cell memory register MR. In the case of Teletype information (8-bit code) or magnetic tape information (IBM 7-bit code), the data portion (4 bits thereof) is segregated by the DHU to provide a 4-bit character. Four characters are packed to form a word which is stored in the DHU for control purposes or transferred to the main memory SMU for storage. Under the supervision of the processor control unit, which is itself controlled by a stored program, addresses are formed in the address register and commands are formed in the data register which addresses and commands via the multiplexer and data transfer units effect control of external elements.

For shift control, the processor control unit under program control works in conjunction with the data handling unit including the shift control circuit therein by bringing the contents of one of the registers of the 16-register array into the data register and giving the shift control circuit the command to shift a given number of steps right or left which thereupon autonomously effects the shifting. For rotation, the processor control unit under program control works in conjunction with the data handling unit including the shift control by placing the contents of the A register, for example, in the memory register, placing the contents of a designated one of the memory array registers in the data register, and informing the shift control circuit as to the rotation operation and the number of steps to shift either right or left which thereupon autonomously effects the rotation. The spill-over of bits from the data register are loaded into the memory register, and the spill-over of bits from the memory register are loaded into the data register. This is done by gating within the shift control circuit. Such arrangement simplifies the control logic in the PCU but adds some equipment to the DHU, the advantage being that the design of the DHU is applicable for cooperation with different processor control units.

Additionally, the present invention provides for asynchronous operation of the processor control unit with a shift control of the data handling unit which is internal to the processor; and with external elements, such as the Teletype controller, the magnetic tape transport, the external data memory, etc., via the multiplexer and DTU. The processor control unit clock is not synchronized with the shift control clock or with the multiplexer clock. When the processor control unit initiates action of the shift control or multiplexer, the processor control clock is stopped and the shift control clock or multiplexer clock as the case may be is started.

In the case of the shift control clock, the PCU clock starts the shift controller. The shift controller then starts the shift control clock and stops the PCU clock. When the shift control clock has effected the designated number of shifts, the shift controller stops the shift control clock and restarts the PCU clock. The length of time the shift control clock is running is determined solely by the number of shifts to be executed.

In the case of the multiplexer clock, the PCU clock starts the multiplexer which, in turn, stops the PCU clock and starts the multiplexer clock. In the case of an "output data word" instruction the specified action is started by the outputting of a data word. At the end of the 13 $\mu$ S MUX clock cycle, the MUX clock stops and the PCU observing the stopping of the MUX clock restarts the PCU clock, even though the specified action of the external element may not be completed.

In the case of an "input data word" instruction, the data is inputted in 7.5 $\mu$S of the MUX clock cycle. At this time, as a result of the processor control unit observing the data ready signal from the multiplexer, the PCU starts its clock to load this data into the memory register and the MUX clock is permitted to run out since it performs no further function with respect to the PCU.

BRIEF DESCRIPTION OF THE DRAWINGS

FIGS. 49A–49F are the assembly figures referred to above;

DETAILED DESCRIPTION

Central Processor Unit Complex

Figure 1:
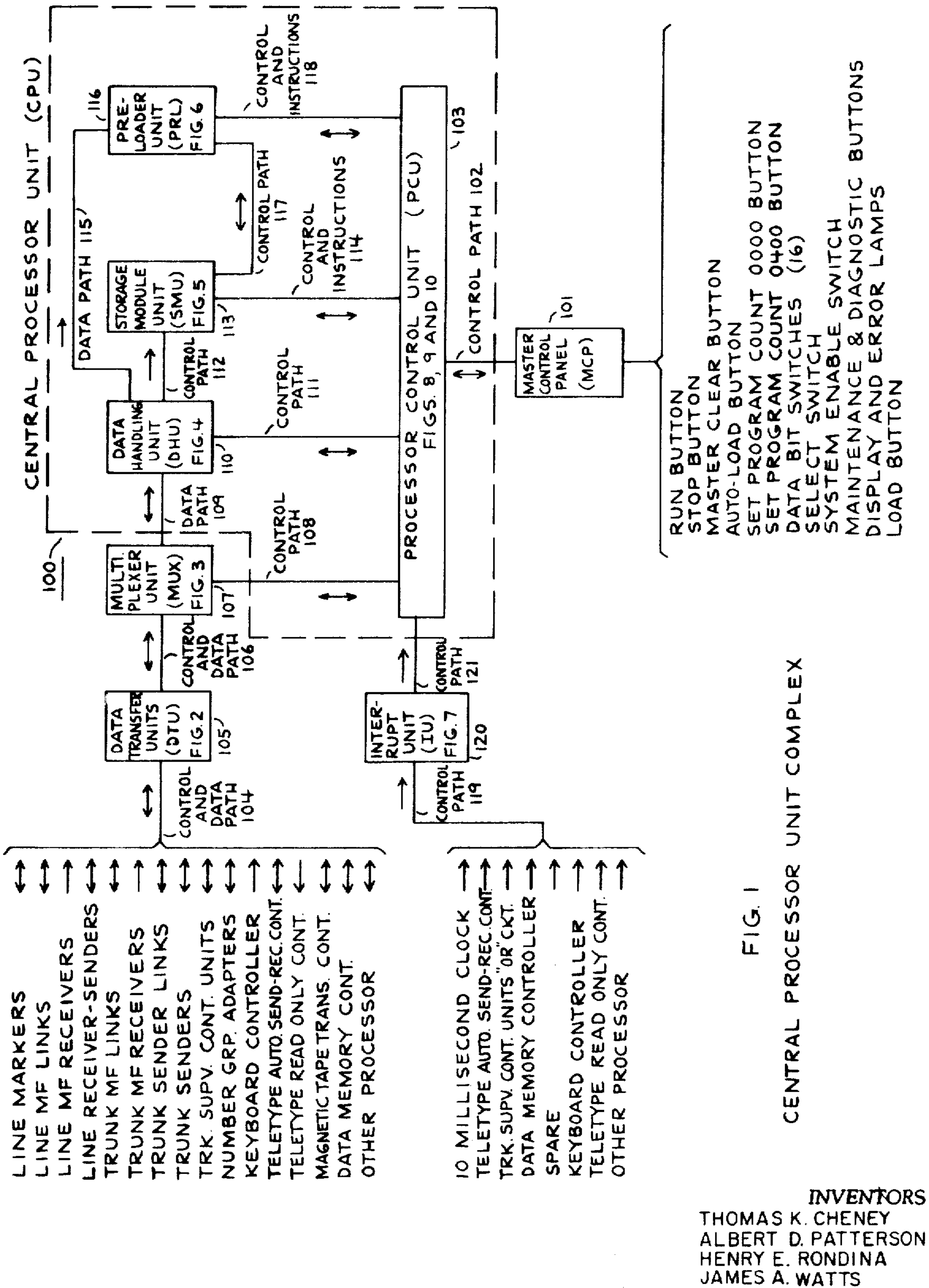
FIG. 1 is an overall bird's-eye block diagram view of the central processor unit complex with indications of input and output signals between the central processor unit and the associated telephone system and personnel.

Referring now to FIG. 1 in which the central processor unit complex is shown, the central processor unit CPU per se labeled 100 is shown within the dotted line and is made up of the data handling unit DHU labeled 110, the storage module unit SMU labeled 113, the preloader unit PRL labeled 116, and the processor control unit PCU labeled 103. Control, data, and instruction paths, each of which comprises a plurality of conductors, connecting the various units are illustrated as shown. The SMU stores program instructions and scratch pad memory information during system operation.

A master control panel MCP labeled 101 connected to the processor control unit over control path 102 provides means for manual control and supervision of the central processor unit. This comprises buttons and switches for manual control and lamps for manual supervision as shown.

Communication between the central processor unit and various elements of the telephone system, such as line markers for example, and peripheral devices such as the Teletype tape controller and magnetic tape transport is effected over data path 109, multiplexer unit MUX labeled 107, control and data path 106, and data transfer units such as the DTU labeled 105, and over control data path 104 shown; the multiplexer 107 serving a plurality of data transfer units, each of which has 64 outward paths and 64 inward paths. A control operation outward from the central processor unit to an element of the telephone system is designated an SMR operation. The bringing in of information from the telephone system to the central processor unit is designated an RT operation.

Communication between the processor control unit and the multiplexer for control purposes is effected over control path 108.

Certain elements of the telephone system and peripheral devices as indicated, such as the 10 millisecond clock or the Teletype auto-send-receive controller, for example, have the ability over control path 119, the interrupt unit IU labeled 120, and control path 121 to interrupt the processor control unit in its program execution. Various priority levels are assigned to the interrupts. Also, a masking operation of the interrupts occurs in the processor control unit.

Each path in FIG. 1 comprises a plurality of conductors, the directions of signals being indicated by arrowheads.

Attention is called at this point to U.S. Pat. No. 3,558,829 which issued Jan. 26, 1971 to the assignee of the present invention which illustrates in general the type of telephone system with which the central processor unit of the present invention cooperates. It should be observed, however, that the central processor unit, the multiplexer unit, and data transfer unit arrangements of the present application differ in certain respects from the arrangement shown in U.S. Pat. No. 3,558,829.

Power On

The system is placed in operation by operating the power switches (not shown) in the various equipment racks (not shown); and then turning on the system enable switch on the Master Control Panel MCP. When the system enable switch is turned on, all components of the system, such as flip-flops are placed in the clear condition, i.e., in the start condition.

Execution of Preloader Program

The SMU is illustrated as a 16,384 word memory, nominally 16K, with octal memory addressing from 00000 to 37777, although the memory could have a larger capacity. When first installed, the SMU contains no instructions stored in its memory.

The initial few basic instructions to get things "off the ground" are contained in hardwired logic in the preloader PRL. Execution of the basic hardwired preload instructions is necessary to bring the loader program and its data table of constants from the Teletype paper tape and store it in the SMU.

Figure 4:
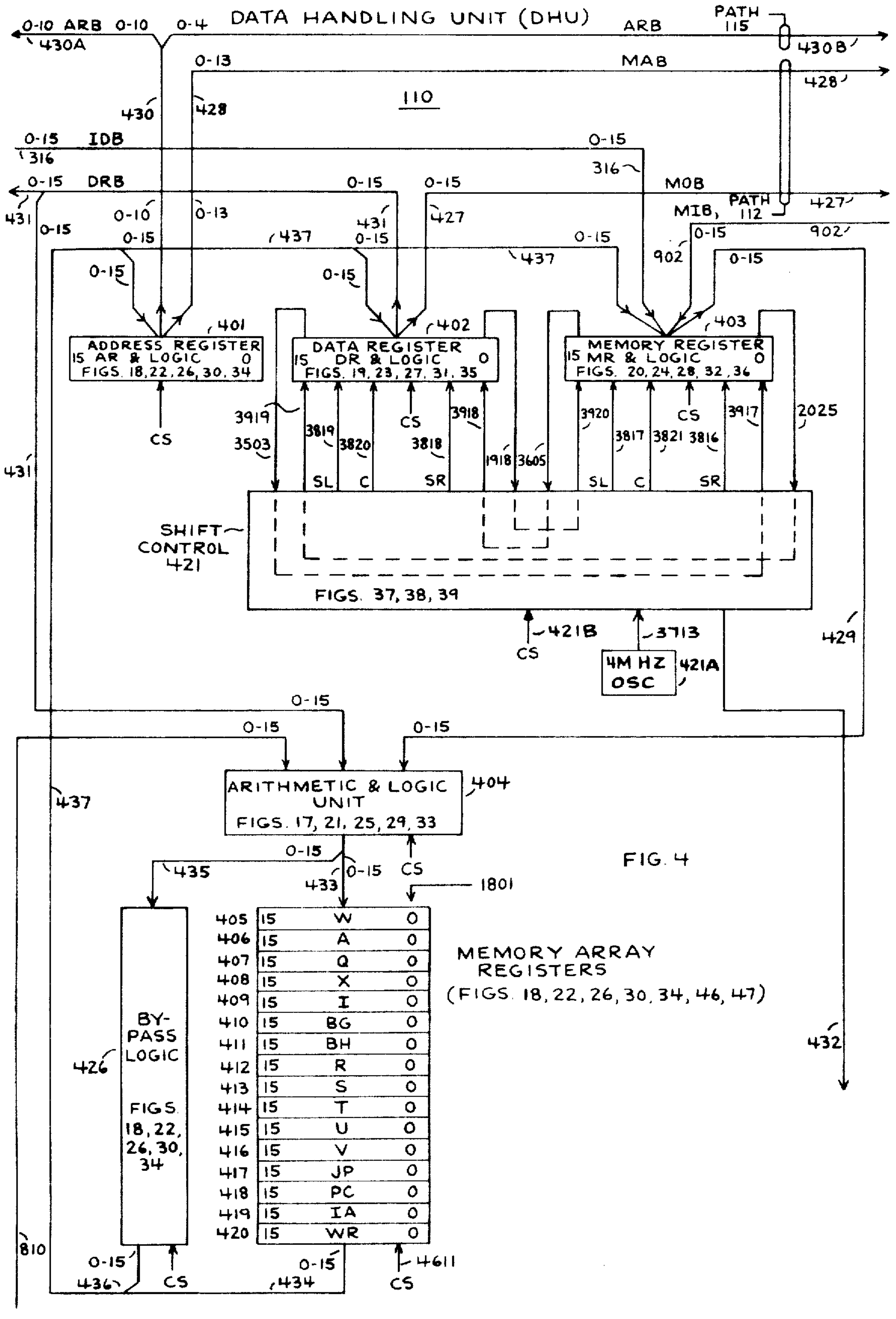
Figure 8:
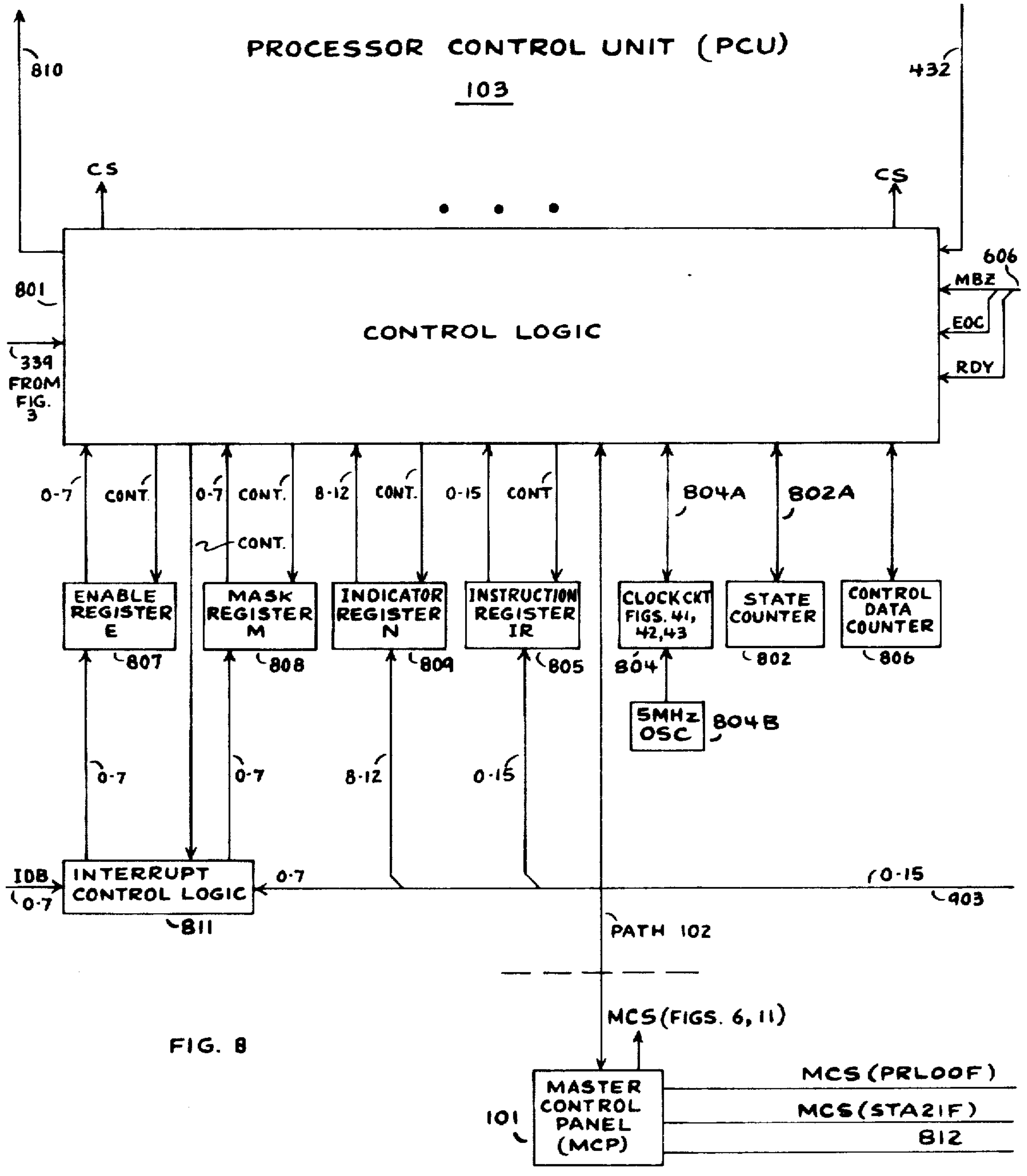
Figure 9:
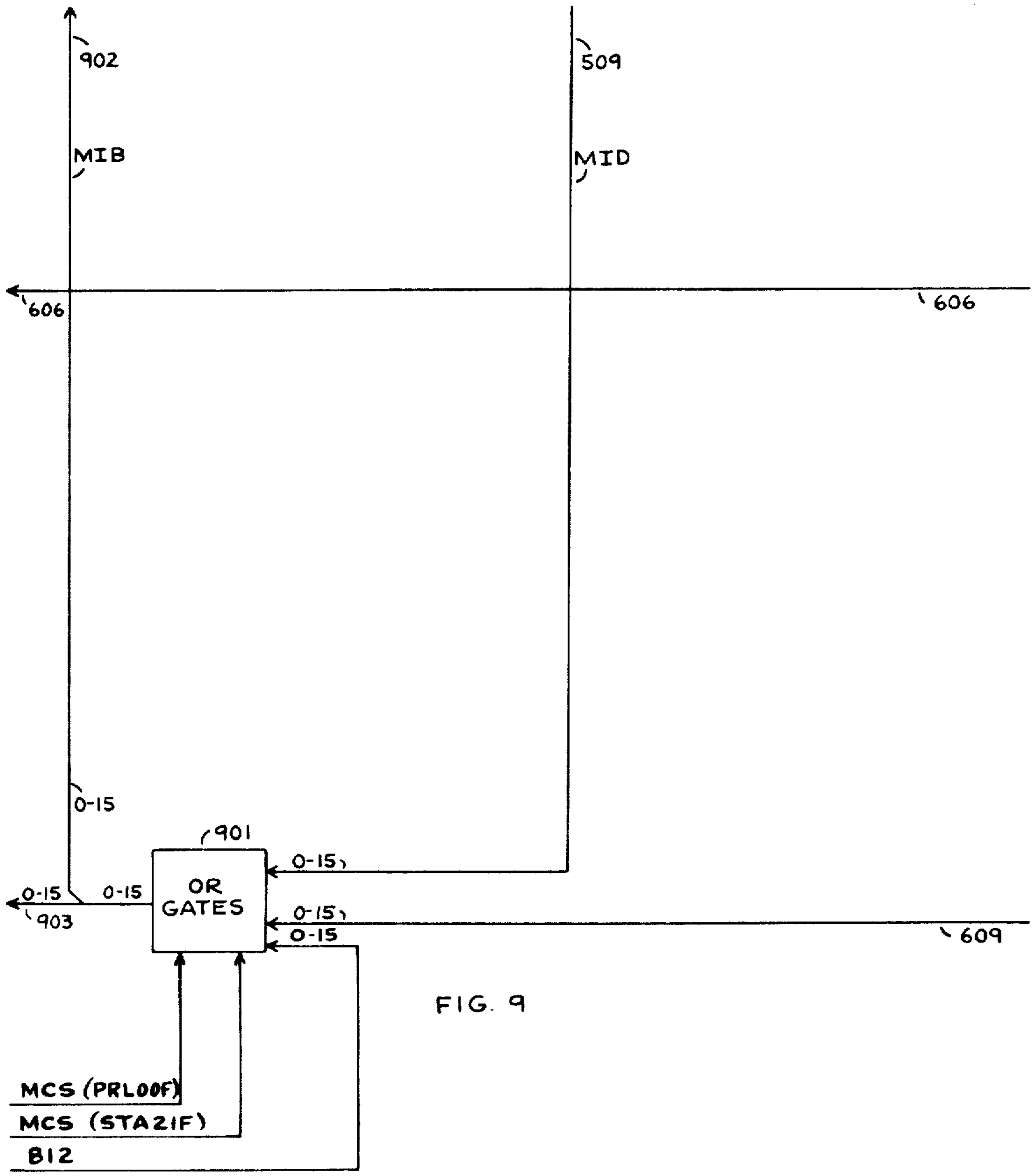

In preparing the processor for the preloading operation, the attendant presses the Set PC 0000 button on MCP which sets the program count register PC of FIG. 4 in DHU to zero; presses the master clear button on MCP which further insures that the system is clear; presses the latching autoload button on the MCP which conditions the PCU logic to execute the elementary program instructions contained in the preloader PRL and conditions the OR gates of FIG. 9; and presses the RUN button which starts the PCU clock 804 of FIG. 8 to cycle. The PCU, as will become clearer hereinafter, causes the preloader to send instructions to the PCU over path 118 (FIG. 1). These instructions, brought in from the PRL to the PCU, enable the PCU to condition the DHU, MUX, and DTU to be receptive to units of data in ASCII code (8 bits) from the Teletype machine and to bring in these units of data at such time as they appear from the Teletype automatic-send-receive machine controller.

Thereupon, the attendant goes to the Teletype machine, turns the mode switch thereon to the "ON-LINE" position; sets the mode switch to the Tape-Tape Send (TTS) position; loads the paper type containing the loader program; and operates the tape reader switch to the run position. As the Teletype machine runs, execution of the preloader instructions by the PCU causes the PCU and DHU combination to continually scan the DTU, via the MUX for data and control signals. The control signals indicate, among other things, when data has been provided from the Teletype controller to the DTU. When a unit of data (8 bits) is received by the DTU, the first 4 bits thereof represent a character or one-fourth word.

The preloader instructions also cause the PCU and DHU combination to receive four units of data, each of which units is received in the memory register MR of DHU (FIG. 4), transferred to A register 406, shifted 12 positions left, whereby 4 information bits of the unit are retained and the 4 control bits of the unit are shifted out of the A register. The 4 remaining bits are rotated with the contents of the I register which results in packing in the I register of the DHU (see FIG. 4). At such time as four units have been received and so processed the first word will have been stored in the I register. The third complete word is stored over control path 112 in SMU beginning at octal address 400, for example, as directed by the first word received.

As each fourth Teletype data unit is received, the SMU word data is stored in SMU and the SMU storage address is incremented. This process continues until all the loader program instructions are entered into the SMU, the second word received having specified the number of words in the loader program, whereby the last word is stored at address $625_8$ for example.

Execution of Loader Program

Execution of the loader program stored in SMU enables the CPU to:

a. Load starting parameters in SMU from the loader program data tables.

b. Address the Teletype machine.

c. Enables loading of various programs from Teletype paper tape including bootloader program, test programs, etc.

As stated, execution of the loader program Stored in SMU is necessary to bring in the bootloader program and bootloader data table of constants from Teletype tape and store the same in SMU, the bootloader program being designed to provide direct control of the magnetic tape transport for subsequent magnetic tape motion and character reading plus the data handling, checking, and SMU storage.

Accordingly, the attendant depresses the "set program count to 0400 button," the master clear button, and the run button; thus preparing the PCU to use the loader program, which was stored in SMU beginning at $0400_8$ to bring in and store the bootloader program. The PCU causes the DTU via the MUX to continuously scan for incoming units of information.

The attendant thereupon takes the last test tape off the Teletype auto-send machine; places the bootloader program tape on the Teletype machine; and operates the tape reader switch on the teletype machine to run position.

The first word of the bootloader program as received by the CPU will direct the storage of the bootloader program beginning at address $7000_8$ of SMU, for example, and the second word indicating the number of words in the bootloader program, whereby the last word thereof will be stored at address $10056_8$, for example.

EXECUTION OF THE BOOTLOADER PROGRAM

Execution of the bootloader program enables the CPU to:

a. Control the magnetic tape transport to bring in the word group O–256 from the magnetic tape to the magnetic tape transport which enables the magnetic tape transport to respond to CPU control signals.

b. Control the magnetic tape transport to bring in the system program and data tables from the magnetic tape and store them. A tape control block (TCB) precedes each group of like records and specifies where and how the records will be stored. Some records, such as instructions, will be stored in SMU; others, such as data tables, will be stored in the data memory.

After the bootloader program has been stored in SMU, the attendant manually positions the data bit switches to 7001, 7002, or 7003 (the three starting address of the bootloader program in SMU).

Figure 5:
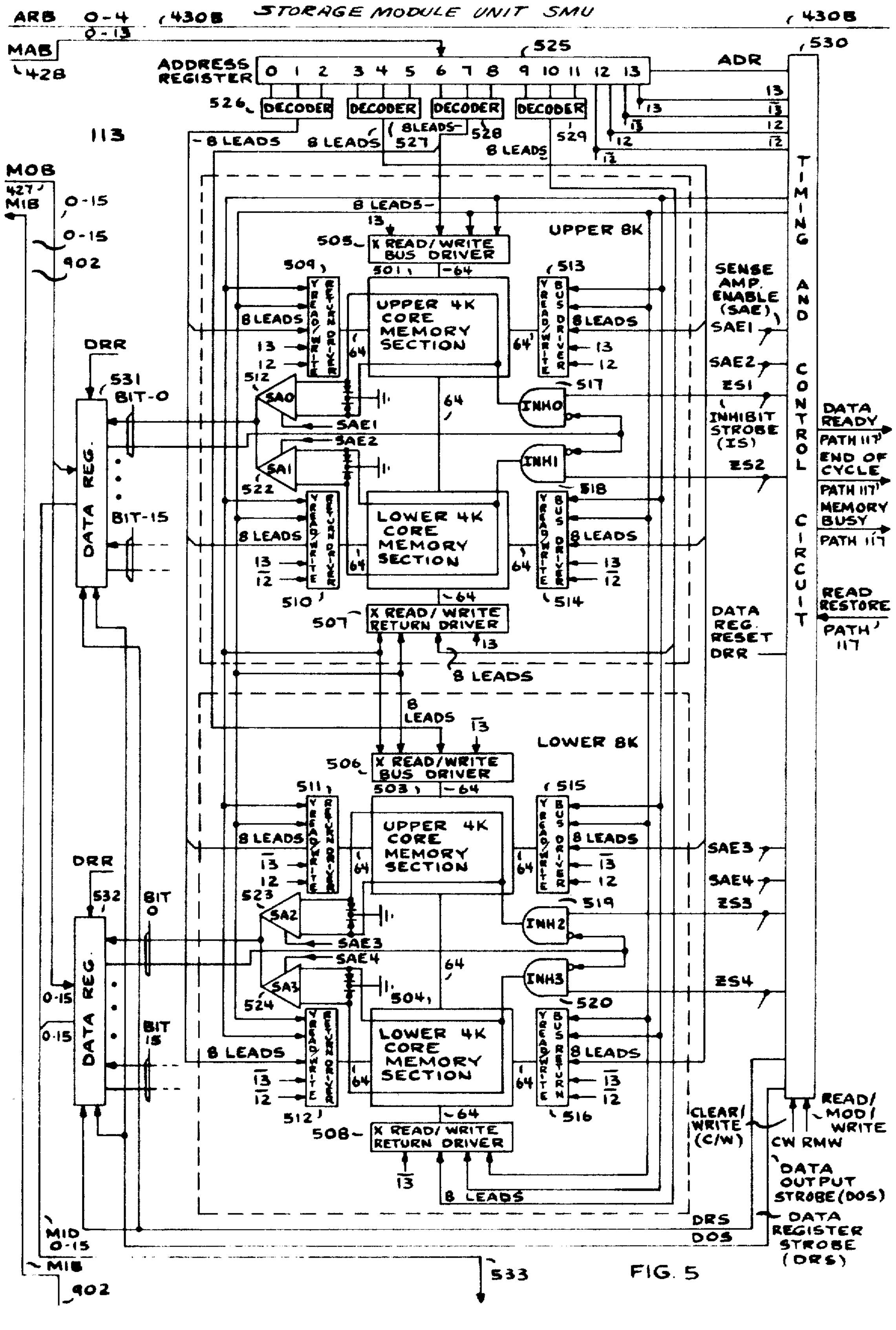

| | |
|---|---|
| Starting at 7001 | effects the reading of one file from magnetic tape |
| Starting at 7002 | effects the clearing of core memory of FIG. 5 from addresses 0–36100 (octal) and then reads one file from magnetic tape. |
| Starting at 7003 | effects usage of the read portion of magnetic tape controller. |

The attendant then operates the select switch to the program counter PC position; depresses the load button which stores the beginning address in the PC register; and then depresses the run button. Thereupon the CPU continuously under program control scans via the MUX and DTU for incoming information units from the magnetic tape transport. Each information unit is in a 7-bit IBM BA 8421 code, in which the first 6 bits thereof represent one-fourth of an APZ-142 word.

Thereupon the attendant places the magnetic tape containing the system program on the magnetic tape transport file feel, and threads the tape by the read heads and onto the takeup reel. MTT mode switch is then operated to "BRAKE RELEASE" position enabling attendant to wind tape from the file reel to the takeup reel until load point passes read heads. MTT mode switch is then operated to "LOAD" position causing tape to be loaded, i.e., enter vacuum columns, and "AUTO" button depressed to allow processor control of MTT.

Execution of program instructions from the SMU enables the PCU and DHU to rewind tape to load point and read the first tape control block (TCB) from the magnetic tape transport via DTU and MUX. The first word of this TCB, which was received as four units of information, containing four parts of a word and packed as described above, specifies the memory destination of the following records and the second word the number of segments of the following program. The third word specifies the size of the records (in words) and the fourth word specifies the number of records following the TCB until the next TCB. The fifth word specifies the absolute location address of the first word of the first record following the TCB and the sixth word contains the upper 2 bits of the starting address when the absolute location exceeds 65K. The seventh and eight words are zeros, used to maintain a minimum record size of eight words. This TCB contains control data which, in cooperation with the bootloader program, directs the loading of several successive data records, comprising the program for running the system, into SMU. In other words, the TCB specifies the number of succeeding records, the beginning SMU word location, and number of words for each succeeding record and other control information. As each data record is read it is stored in the specified SMU location. This continues until all data records specified by the first TCB have been read. At that time, either a new TCB will be read, or an end of file will be detected. The end of file terminates the loading operation.

It should be appreciated that the loader program stays in the SMU for subsequent possible use but that any remaining test program which was temporarily stored in SMU is over-laid by the system program.

Execution of System Program Including Interrupt Operation

When the system program comprising periodic routines, executive service routines, and non-periodic routines (see FIG. 50A) has been loaded into SMU from magnetic tape as described, the system is prepared for automatic operation and goes about its business according to the system program until interrupted.

More specifically the NX-1E telephone system is controlled by a stored program processor executing a series of program routines. These routines perform all call processing activities for many calls simultaneously, as well as scheduling the sequence of execution of the routines by the processor. In addition to call processing, some routines provide administration and maintenance capability for the systems, with the processor not performing call processing (off-line).

Figure 50A:
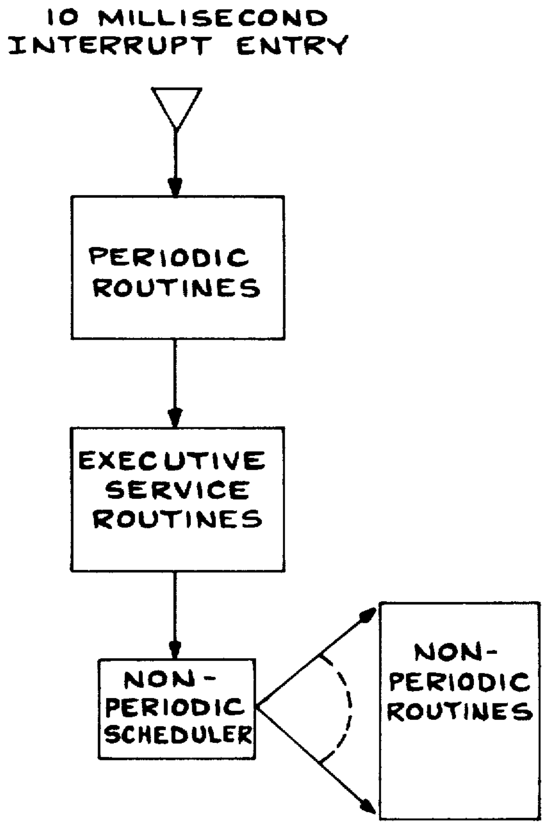
FIG. 50A is an illustration of system program sections of routines.

The NX-1E telephone software system program, for the most part, contains three large sections illustrated in FIG. 50A. One section contains all routines which are executed by the processor on a periodic basis (i.e., every 10 milliseconds or multiples thereof). Another section contains all routines which provide high level (Executive) services for other programs. This section is normally also executed every 10 milliseconds. The final section contains all routines which are executed on a non-periodic basis by the processor under control of a non-periodic scheduler routine. These routines are executed during the remainder of the 10 millisecond period following the periodic and executive services.

Figure 50B:
FIG. 50B is an illustration of the timing of the system program sections of routines.

The software system is essentially driven by the 10 millisecond interrupt signal applied to each processor. As shown in FIG. 50B, the 10 millisecond interrupt causes an entry into the periodic routines from the non-periodic routines. After executing the periodic routines, the executive service routines are executed and then the non-periodic routines are re-entered. The diagram shows that periodic and executive service routines are completely executed each 10 millisecond period in contrast to the non-periodic routines which are only partially completed. This means that the complete execution of all non-periodic routines requires several 10 millisecond periods to elapse.

The 10 millisecond interrupt causes an entry into the XICR (Executive Interrupt Control Routine). Following the execution of XICR, the XPSR (Executive Period Scheduler Routine) is entered. XPSR schedules routines for execution after which XPSR is re-entered to schedule the next routine until all periodic routines have been executed. At that time, the periodic routine section has been completed and the exit is taken. It should be noted that some routines are not scheduled for execution by XPSR each time. The AFISP routine, for example, is scheduled every other time (½). In real time, then, AFISP would be scheduled and executed once every 20 milliseconds.

Some routines are of fixed or constant execution time whereas certain other routines are of variable execution time. The variation of execution time is, of course, primarily a function of the instantaneous traffic.

The entry executive service routines is from the periodic section exit. The first of the executive service routines in the XECR (Executive Control Routine), a scheduler routine which is re-entered until all executive service routines have been executed.

The initial entry to the non-periodic routines is used only after all non-periodic routines have been executed. At all other times, the entry will be at the point where execution was terminated due to the 10 millisecond interrupt occurring. The non-periodic routines essentially represent a continuous program loop for execution when no higher level routines (i.e., periodic or executive service routines) are being executed. Certain series of routines are executed repeatedly for the number of times necessary to serve the individual ones of a group of hardware devices.

The real-time execution of routines should be that of the processor trying to execute the non-periodic routines but being interrupted every 10 milliseconds to execute the periodic and executive service routines; after which, the processor returns to the non-periodic routine loop and continues from where it was interrupted. One should realize that the execution of routines by the processor as described above is a continuous process regardless of the number of cells being processed. For example, the process is the same, as far as has been described, for no calls as for many.

Call processing consists of doing the necessary processing work for a call as it progresses. This is not done for one call at a time, but, for as many calls as the system has concurrently in progress. The simultaneous processing of many calls in various stages of progress is accomplished by: (1) establishing a data base for each call to be used only by that call throughout its entire processing, and (2) time sharing the call processing software logic for each call. The data base contains, in addition to all call data, several words which are used to keep track of the call's progress relative to the softward logic routines. These "status" words, then, continually reflect the call status at all times and are used and updated by the software logic routines as the call progresses through the system.

In the lower left corner of FIG. 1, the following interrupts are illustrated:

Ten millisecond clock — level 0

Teletype Automatic Send-Receiver Controller — level 1

Trunk Supply Control Unit OR Circuit — level 2

Data Memory Controller — level 3

Spare — level 4

Keyboard Controller — level 5

Teletype Read Only Controller — level 6

Other processor — level 7

These interrupt signals over individual leads in control path 119 enter interrupt unit UA labeled 120 where they are assigned interrupt priority levels 0–7 as illustrated with level 0 being the highest priority.

Priority level signals over individual leads in path 121 to the processor control unit are the means by which the various indicated conditions are brought to the attention of the PCU. The priority control signal remains until the condition causing the interrupt has been serviced. The PCU schedules the execution of the servicing program instructions on a priority basis. The scheduling of service programs is accomplished by different instruction address formation depending upon the interrupt priority. The instruction address as formed by the interrupt, over-rides the normal sequential instruction address formation by the PCU and results instead in the PCU executing instructions beginning at the location in SMU of the address formed.

The instructions executed, beginning at the interrupt address location, service the external interrupt condition and reset the interrupt control signal. After servicing the interrupt, the instructions allow the PCU to return to the normal instruction which would have been executed had the interrupt signal not have occurred. Normal execution of instructions will then continue.

The PCU in executing instructions and servicing the interrupts issues control signals, identified as CS signals in various drawings, to PRL over path 118, to SMU over path 114, to DHU over path 111, and to MUX over path 108; and receives signals from these units over these paths.

Communication Between External Elements

And Central Processor Unit Via Data Transfer

Units and Multiplexer

The multiplexer unit 107 serves eight data transfer units, such as 105, each of which is connected to a maximum of 64 outlets to external elements (such as line marker and Teletype auto-send controller elements); and to 64 inlets from external elements (such as line marker and Teletype auto-send controller elements).

Figure 2:
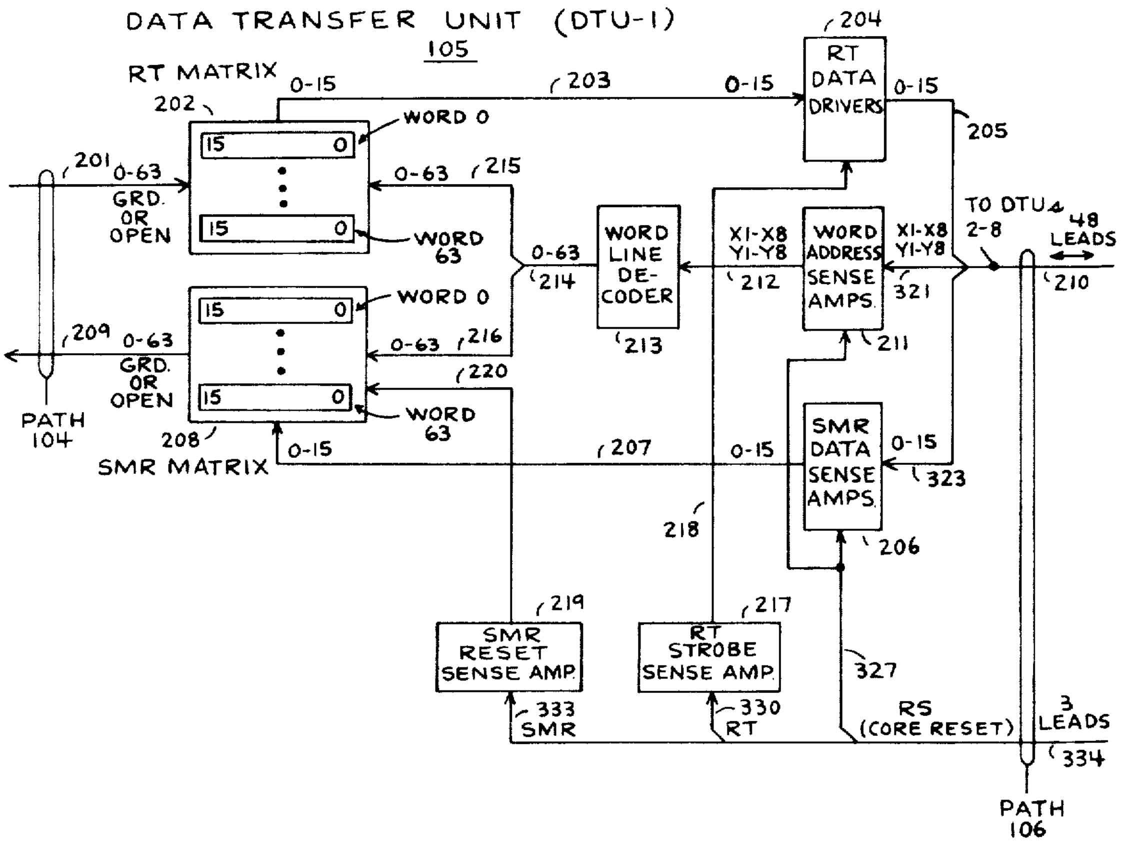
FIGS. 2–10 assembled as shown in FIG. 49A provide a more detailed block diagram of the central processor unit with elements thereof arranged in the same geometrical relationship found in FIG. 1.

The 64 outlets are 64 words, each having 16 cells or bits 0–15 found in FIG. 2. This 64-word arrangement is the SMR matrix labeled 208.

The 64 inlets are 64 words, each having 16 cells or bits 0–15 found in FIG. 2 also. This 64-word arrangement is the RT matrix labeled 202.

These two matrices comprise interfaces between the external elements and the DTU.

The various devices in communication via SMR and RT words may require a variable number of bits and words.

For example:

| | RT Words | SMR Words |
|---|---|---|
| Keyboard Controller | | |
| | Bits 0–9 | Bits 0–15 |
| | Bits 0–10 | Bits 0–5 |
| | | Bit 0 |
| Teletype Auto-Send-Receive | | |
| | Bits0–11 | Bits 0–12 |
| Controller | | |
| Teletype Read Only | | |
| | Bits0–1 | Bits 0–12 |
| Controller | | |
| Magnetic Tape Transport | | |
| | Bits0–13 | Bits 0–6 |
| Control | | |
| | | Bits 0–6 |
| Data Memory Controller | | |
| | Bits 0–15 | Bits 0–15 |
| | Bits 0–4 | Bits 0–15 |
| | | Bits 0–3 |
| Other Processor | | |
| | Bits0–15 | Bits 0–15 |

SMR Operation

In order to control these external elements and to provide data to these elements, various combinations of binary data are output from the DHU via the MUX to the SMR word.

Figure 3:
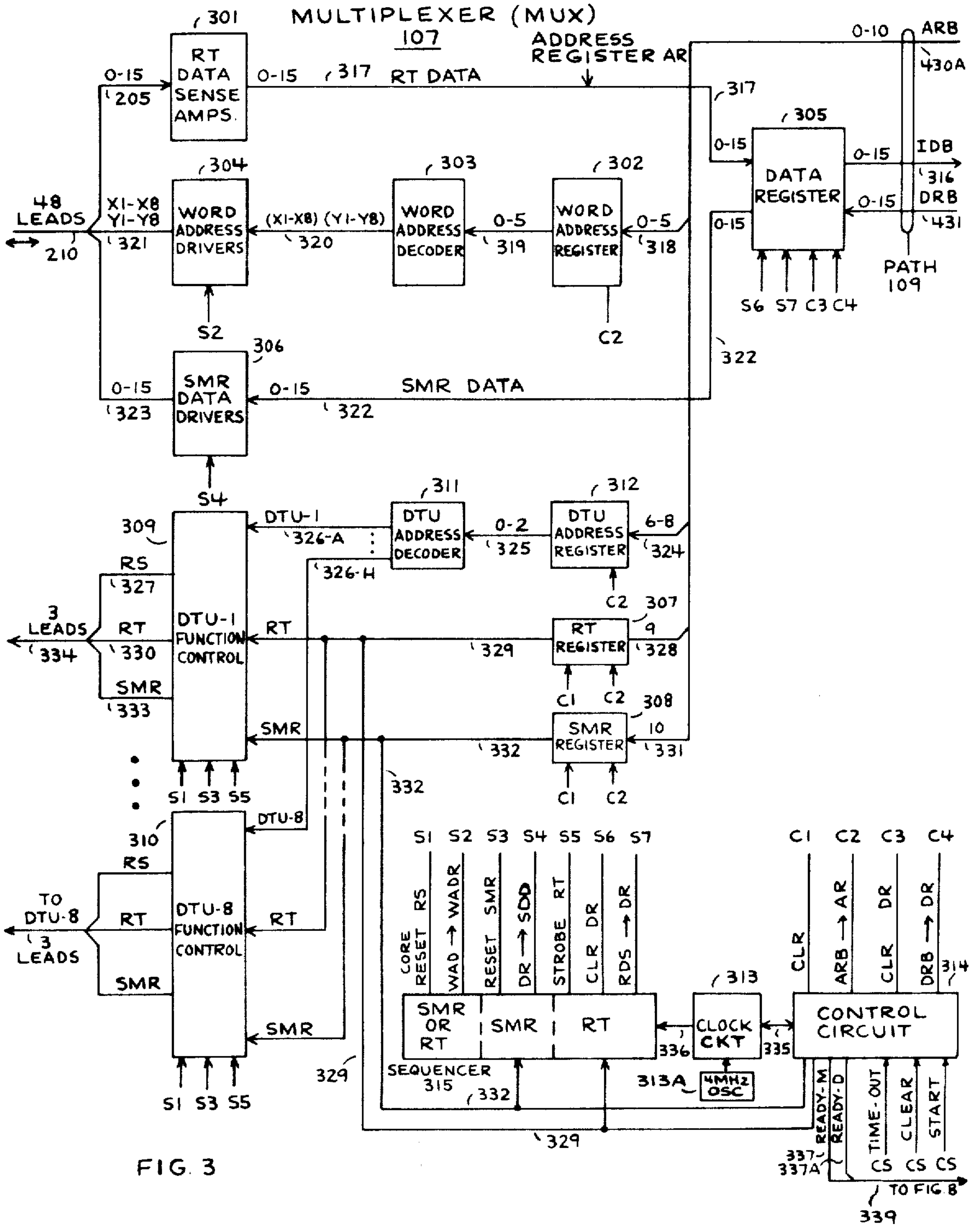

Thus the SMR is word organized with each SMR word having a unique word address. The DTU–SMR operation begins by the PCU executing instructions from the SMR which load the SMR data and SMR word address into DHU registers A and Q respectively, found in FIG. 4. Once this is accomplished, the PCU executes an ODW (output data word) instruction received from SMR which initiates the MUX operation, in which the data and address are transferred to the data and address registers of DHU (FIG. 4), then transferred to the data and address registers of MUX (FIG. 3). The MUX uses the address presented to select the DTU and the SMR word. The MUX resets the addressed SMR word of the DUT, then transfers the SMR data to the addressed word, whereby it reaches the controlled device over path 209 in path 104. Following that, the MUX signals the PCU over path 108 that the operation is completed. The PCU then resumes its other business executing instructions.

RT Operation

In order to test external element or device conditions and to receive data from these devices, various binary data is input from the RT word via the MUX to the DHU.

Thus the RT matrix is word organized with each RT word having a unique address. The DTU–RT operation begins by the PCU executing instructions from the SMU which load the RT word address into register Q of DHU in FIG. 4. Once this is accomplished, the PCU executes an IDW (input data word) instruction from the SMU which initiates the MUX operation The MUX uses the address presented to select the DTU and RT word. The MUX then transfers the RT word data from the DTU to Data Register 305 in FIG. 3 of MUX. Following that, the MUX signals PCU over path 108 that the operation is completed. The PCU then effects the transfer of data from Data Register 305 of MUX to the memory register 403 of DHU.

Data received in memory register 403 of DHU, forwarded to the A register 406, is then manipulated in DHU as necessary; and then placed in the data register thereof and stored in the core memory of SMU, for example.

MORE DETAILED DESCRIPTION

Referring now to FIGS. 2–10, assembled as shown in FIG. 49A, a more detailed description follows.

Clock 804 of FIG. 8 is the primary control device for determining the order of events within the Processor Control Unit (PCU of FIGS. 8–10) which, in turn, controls the Central Processor Unit CPU of FIGS. 4–10 and the Multiplexer MUX of FIG. 3; the MUX in turn controlling the operation of Data Transfer Units DTU, one of which is DHU–1, shown on FIG. 2.

Clock

FIGS. 8, 41, 42, 43

Figure 41:
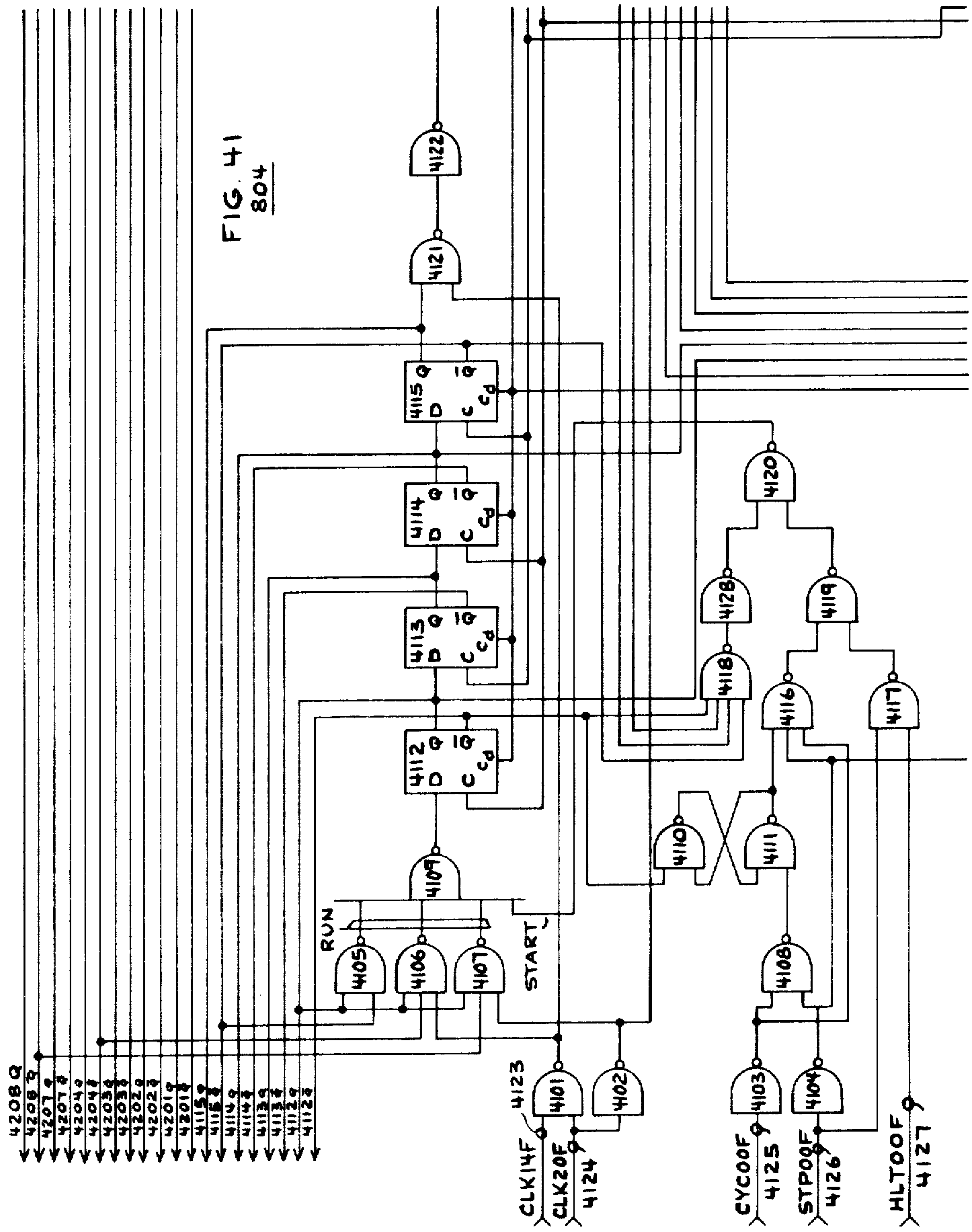
FIGS. 41–43 assembled as shown in FIG. 49E provide a logic diagram of the clock shown in FIG. 8.
Figure 42:
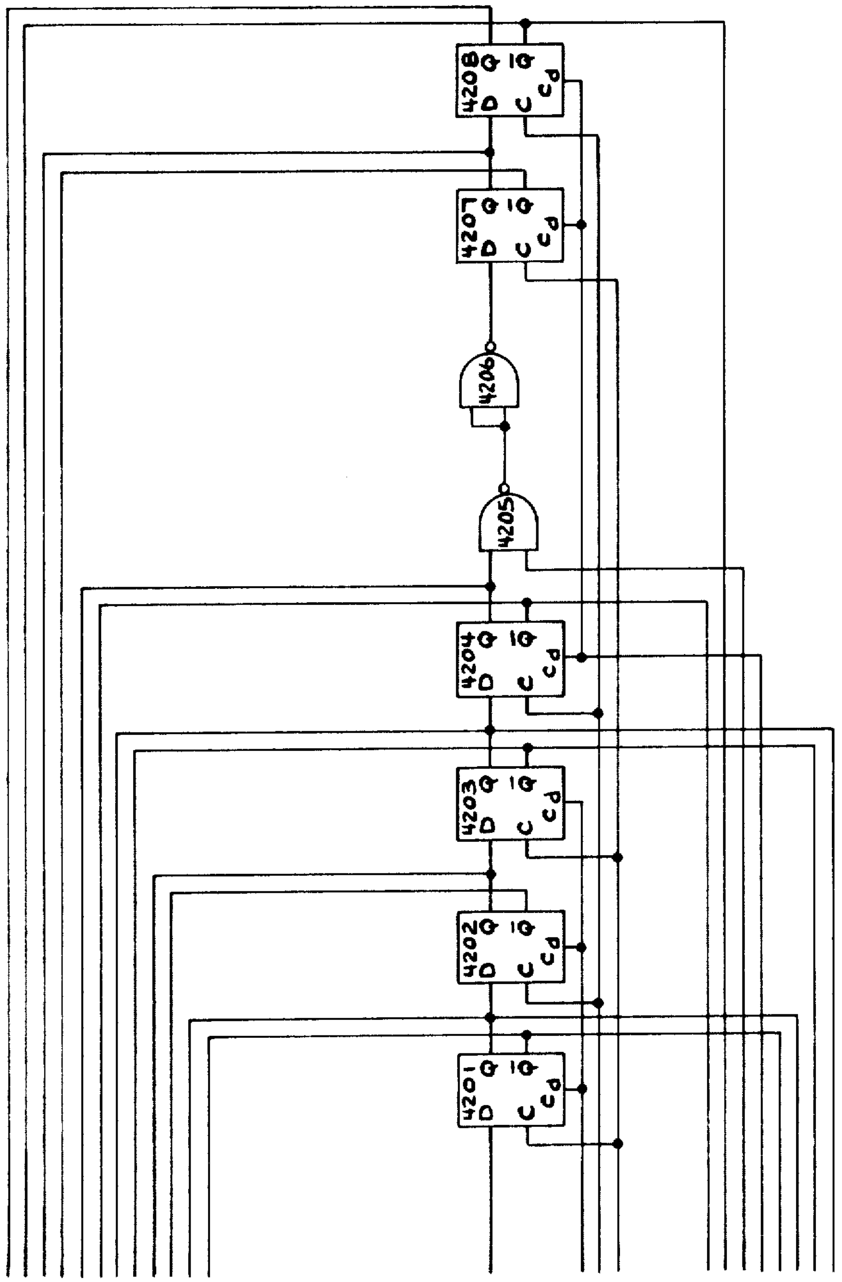
Figure 43:
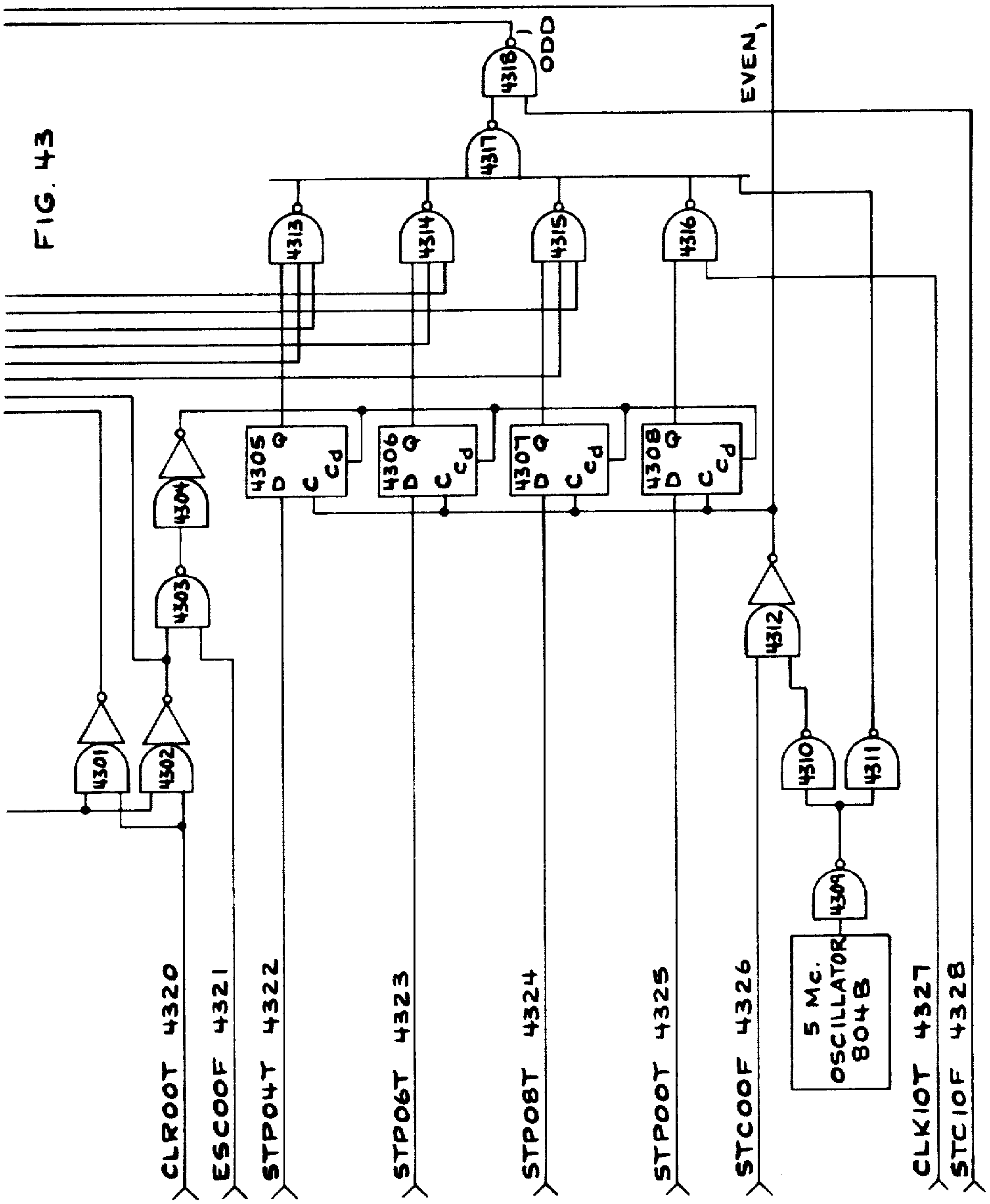

The Clock shown as box 804 in FIG. 8 is expanded as a logic diagram in FIGS. 41–43.

Purpose of Clock

The primary purpose of the clock is to time orient a number of events to form a sequence. The sequence is then used by the processor to perform some function. The clock, therefore, is the primary control device for determining the order of events within the PCU.

General Description of Clock

The Clock shown as box 804 of FIG. 8 and as a logic diagram in FIGS. 41–43, consists of a 5 Mc. oscillator, 804B, the clock counting chain made up of flip-flops 4112, 4113, 4114, 4115, 4201, 4202, 4204, 4207 and 4208, the clock length set circuit made up of gates 4101, 4102, 4121, 4122, 4205, and 4206, the pulse and conditional stop circuits consisting of flip-flops 4305, 4306, 4307, and 4308 and gates 4309 through 4318 and the clock cycle sequencer consisting of gates 4103, 4104, 4108, 4110, 4111, 4116, 4117, 4118, 4128 and 4120.

The 5 Mc oscillator is a standard discrete component astable multivibrator with a 5 Mc crystal used for synchronization.

The clock counting chain is a form of a two phase variable length ring counter with gates 4105, 4106, 4107 and 4109 providing the start and end of chain signals.

The clock length set circuit determines the length of the count.

The pulse and conditional stop circuit provides the pulses to drive the clock counting chain providing no conditional stop signals are present. The conditional stop circuit inhibits the pulses to the clock counting chain for as long as that stop signal is present.

The clock cycle sequencer provides the run and stop signals for the clock counting chain. The stop signal is effected only at the end of a counting sequence whereas the conditional-stop signals from the pulse and conditional stop circuits are effected at some specific time during the clock counting chain sequence.

Path 804A of FIG. 8 comprises the input and output leads seen at the left of FIGS. 41 and 43.

Detailed Description of Clock

When power first comes up on the system as a result of operating the system enable switch on the MCP, the STPOOF, 4126, lead from the control logic 801 comes up in a low condition since the system is in the stop condition. The low on lead 4126 causes a high to appear at the output of inverter 4104 which enables gates 4301 and 4302. A positive pulse now appears on the CLROOT 4320 (the T of this lead designation specifies that when this lead is activated, the signal thereon is TRUE, i.e., logic 1), lead from the power up clear circuit of control logic 801 (without depressing the master clear button on MCP), is inverted by gates 4301 and 4302 and clears flip-flops 4112, 4113, 4114, 4115, 4201, 4202, 4203, 4204, 4207 and 4208. Since the EXCOOF lead 4321 (the F of this lead designation specifies that when this lead is activated, the signal thereon is FALSE, i.e., logic 0), is high at this time to enable gate 4303, the negative going pulse at the output of gate 4302 is inverted by gates 4303 and 4304. The negative going pulse at the output of 4304 now clears flip-flops 4305, 4306, 4307 and 4308.

As a matter of definition, a flip-flop is cleared when its C*d* input is made low. This action causes the Q output of the flip-flop to go low regardless of the previous condition of the flip-flop.

The low on STPOOF lead 4126 also causes the output of gate 4117 to be high. The high on lead CYCOOF, 4125, causes a low on the output of inverter 4103 which, in turn, causes the output of gate 4116 to be high. The high outputs from gates 4116 and 4117 cause the output of gate 4119 to be low which in turn makes the output of gate 4120 a high.

Since flip-flop 4112 is in a cleared condition, the low output at Q causes the outputs of gates 4105, 4106 and 4107 to be high which, together with the high output from gate 4120, cause the output of gate 4109 to below. This low output from gate 4109 holds the D input of flip-flop 4112 low and as a result the clock counting chain remains in the cleared state.

The output of the 5 Mc. oscillator, 4319, is shaped an buffered by inverter 4309. The output of inverter 4309 is inverted again by gates 4310 and 4311. As long as the STCOOF lead, 4326, remains high, gate 4312 remains enabled and the output of 4312 continues to pulse in accordance with the input from gate 4310. The output pulses from gate 4312 serve to clock the flip-flops 4305, 4306, 4307, 4308, 4113, 4115, 4202, 4204, and 4208.

Since the leads STPO4T, 43322, STPO6T, 4323, STOPO8T, 4324 and STPOOT, 4325, remain low until a stop is present, the Q outputs of flip-flops 4305, 4306, 4307 and 4308 will also remain low causing the outputs of gates 4313, 4314, 4315 and 4316 to remain high and keep gate 4317 enabled.

With this condition present, the output of gate 4317 will pulse in accordance with the input from gate 4311. As long as the STC10F lead, 4328, remains high, the gate 4318 will invert the pulses from gate 4317. The output of gate 4318 is used to clock the flip-flops 4112, 4114, 4201, 4203 and 4207.

Figure 44:
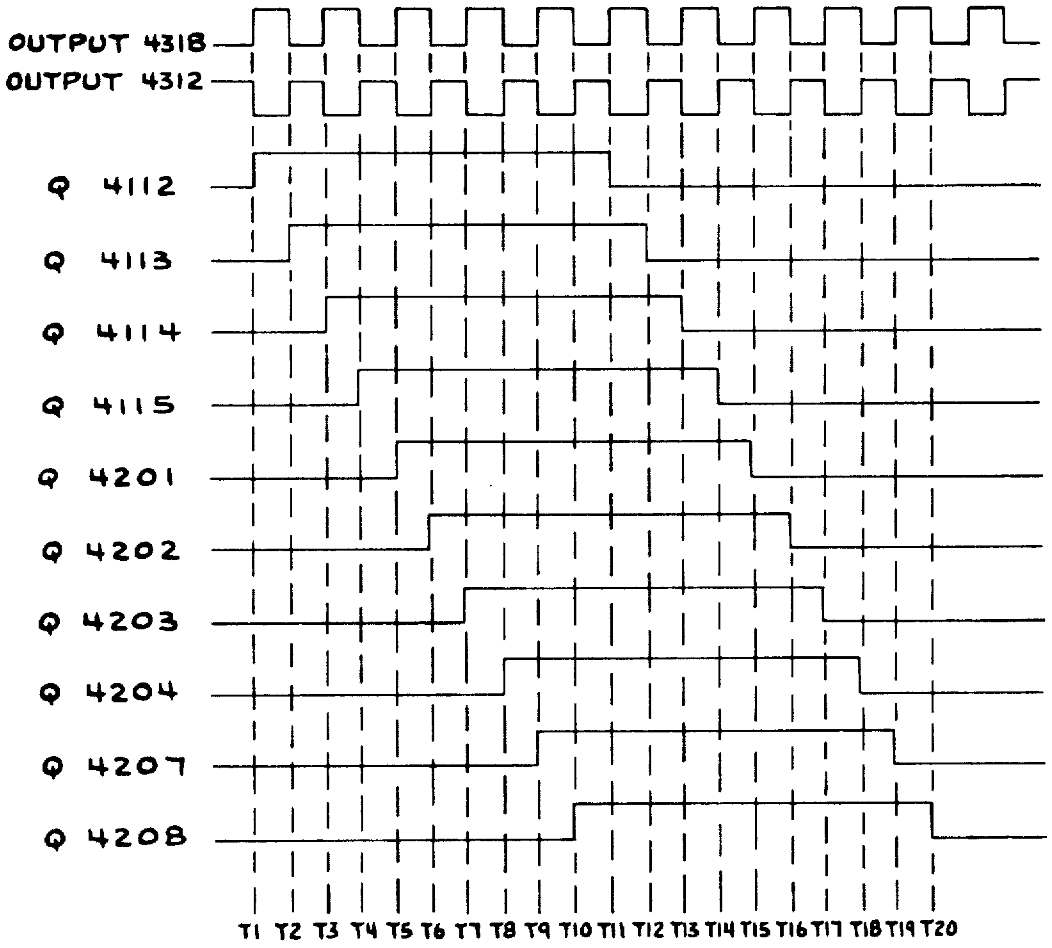
FIG. 44 comprises a sequence chart of the clock counter.

The output of gate 4318 is called the odd clock and the output of gate 4312 is called the even clock. The output pulses from these two gates will be 180° out of phase as a result of the fact that from the output of inverter 4309 the even clock passes through two gates, 4310 and 4312, whereas the odd clock passes through three gates 4311, 4317 and 4318. The phase relationship between the outputs of gates 4312 and 4318 is shown in FIG. 44.

Although the 5 Mc. oscillator is running continuously, "starting the clock" means starting the clock to advance through its sequential chain of flip-flops. When the clock is started to begin preloading, it is conditioned by lead CLK14F being low and lead CLK20F being high which causes the clock to advance through 16 counts in State 1 of PCU. During execution of instructions, each instruction determines a selection of states which are selected by and counted off by the state counter 802 (FIG. 8). In the various states, the clock advances through 16 counts, eight counts, or 20 counts as follows:

| State | Count |
|---|---|
| 1 | 16 |
| 2 | 8 |
| 3 | 16 |
| 4 | 16 |
| 5A | 20 |
| 5B | 16 |
| 5C | 8 |
| 6 | 20 |
| 7 | 16 |
| 8 | 16 |
| 9 | 16 |

In state 6, during the execution of a store control data (SCD) command or a restore control data (RCD) command, the clock goes through 14 cycles of 20 counts each. The control data counter 806 of FIG. 8 counts these 14 clock cycles. These clock cycles are incident to storing the contents of certain registers of the memory array of FIG. 4 in SMU or the restoring of the same from SMU.

The lead conditions from PCU for the clock to advance through the various counts are as follows:

| | CLK14F | CLK20F |
|---|---|---|
| 20 Count | High | Low |
| 16 Count | Low | High |
| 8 Count | High | High |

The clock advancement through the maximum (20) counts which is first described is provided by conditioning the leads, as now described.

It is first assumed that lead CLK20F, 4124, is low, the lead HLTOOF, 4127, is high and lead STPOOF, 4126 goes high. The high condition on leads 4126 and 4127 causes the output of gate 4117 to be low which, in turn, causes the output of gate 4119 to be high. Since the clock counting chain is in the cleared mode, all inputs to gate 4118 are high. The low on the output of gate 4118 becomes a high at the output of inverter 4128 which, together with the high output of gate 4119 causes the output of gate 4120 to be low. This low output forces the output of gate 4109 to be high. As a result we have a high input to the clock counting chain which starts the clock counter.

On the next odd clock pulse from gate 4318, the Q output of flip-flop 4112 will go high as shown at T1 of FIG. 44. This high output enables gates 4105, 4106, and 4107 which (with the CLK20F lead, 4124 low) causes the outputs of inverters 4101 and 4102 to be high, and the outputs of gates 4105, 4106 and 4107 to be low to maintain the high output from gate 4109.

The low at the $\overline{Q}$ output of flip-flop 4112 causes the output of gate 4118 to be high. This high becomes a low at the output of inverter 4128 which, in turn, inhibits gate 4120 by forcing its output to a high.

In effect, at this time, the length of the count has been determined by the low input on lead CLK20F, 4124. That is, the clock was started by removing the low from the STPOOF, 4126, lead and when the flip-flop 4112 was set, the clock control was transferred from the start circuit at gate 4120 to the run circuit consisting of gates 4105, 4106 and 4107.

On the succeeding even clock pulse from gate 4312, the Q output of flip-flop 4113 goes high as shown at T2 in FIG. 44. The next odd clock pulse sets flip-flop 4114 and the succeeding even clock pulse sets flip-flop 4115 as shown at T3 and T4 on FIG. 44 respectively. When flip-flop 4115 sets, the $\overline{Q}$ output goes low which causes the output of gate 4105 to go high. At the same time, the high at the Q output of flip-flop 4115 and the high at the output of inverter 4101 cause the output of gate 4121 to go low. The output of inverter 4122, therefore, goes high to enable the counter to continue and set flip-flops 4201, 4202, 4203 and 4204 in the same manner as was described previously. This action is shown at T6, T6, T7 and T8 of FIG. 44. When the $\overline{Q}$ output of flip-flop 4204 goes low, the output of gate 4106 is forced to a high. At the same time, the high at the Q output of flip-flop 4204 together with the high output of inverter 4102 make the output of gate 4205 a low which, in turn, makes the output of inverter 4206 a high enabling the counter to continue.

The counter will continue as before and flip-flops 4207 and 4208 will be set as shown at T9 and T10 of FIG. 44. When the $\overline{Q}$ output of flip-flop 4208 goes low, the output of gate 4107 is forced high. Now, all of the inputs to gate 4109 are high and as a result, the output goes low. The next odd clock pulse will cause the Q output of flip-flop 4112 to go low which disables gates 4105, 4106, and 4107. The clock counter now resets all remaining flip-flops in the same manner in which they were set. This action is shown as T11 through T20 in FIG. 44.

When the $\bar{Q}$ output of flip-flop 4208 finally returns to a high condition, the output of gate 4118 returns low to make the output of inverter 4128 a high and return control of the counter chain to the STPOOF lead, 4126. As long as this lead remains high, provided that there is no half or conditional stop signal present, the clock counting chain will continue to cycle.

The clock cycle just described was 20 pulses long, but clock lengths of eight and 16 pulses are also available. To obtain an eight-pulse clock length both leads CLK14F, 4123, and CLK20F, 4124, must be high causing the outputs of inverters 4101 and 4102 to be low which, in turn, disables gates 4106, 4107, 4121 and 4205. From this, it is obvious that the control of the clock counter, once it has been started, is transferred to flip-flop 4115 and gate 4105. Until flip-flop 4115 sets, the output of gate 4105 is low to force the output of gate 4109 to a high. Once flip-flop 4115 sets, however, the output of gate 4105 goes high making the output of gate 4109 a low. Data is prevented from propagating any further than flip-flop 4115 by virtue of the fact that gate 4121 is disabled by the low output of gate 4101.

The 16 pulse clock cycle is essentially the same as the eight-pulse cycle except that the lead CLK14F, 4123, must be low at the start of the sequence. The low on 4123 causes a high output at gate 4101 to enable gates 4106 and 4121. The gate 4121 allows data to be transferred from flip-flop 4115 to flip-flop 4201 at the fifth count in the sequence. The gate 4106 is used to keep the output of gate 4109 high until the flip-flop 4204 sets at the eighth count of the sequence.

These sequences described above are continuous. That is, when one sequence ends another sequence begins immediately. Dual rail output signals from the counting flip-flops to the PCU as timing control signals are shown in the upper left corner of FIG. 41 as follows: for 20 count, leads 4112$\bar{Q}$ to 4208Q; for 16 count, leads 4112$\bar{Q}$ to 4204Q; and for 8 count, leads 4112$\bar{Q}$ to 4115Q. The Q signals thereof are illustrated in FIG. 44 from which the $\bar{Q}$ signals would be inferred.

PROCESSOR CONTROL UNIT (PCU)

FIGS. 1, 8, 9, 10

Definitions

The following group of definitions will be used in the further description of the Processor Control Unit PCU.

Program — A program is a set of instructions used to perform some function of the system.

Instruction — An instruction is a 16-bit word which completely defines some operation within a function of the system. Every instruction contains an operation code which may be a portion of the instruction, or the complete instruction.

Command — A command is an ordered set of one or more logic directives generated by the Control Logic Unit 801 resulting from an instruction word, and used to perform some controlling operation. An ordered set of one or more logic directives which results from an instruction word is also called an instruction.

Purpose

The primary purpose of the PCU is to convert the instruction contained in the Instruction Register 805 received via OR gates 901 from PRL or SMU in a sequence determined by the Clock 804 and Control Logic 801 into a set of commands which can perform some operation.

The PCU also provides for recognition of interrupt conditions; recognition of a high, equal or low condition when comparing two quantities; recognition of an overflow condition; and recognition of a program branch condition.

General Description of PCU

The PCU contains an Instruction Register IR labeled 805, which provides storage for the instruction being performed; a Control Logic Unit 801, which decodes the instruction contained in the Instruction Register 805, into a series of commands which will perform some operation; a Clock 804, which provides the proper time orientation for the series of commands; a State Counter 802, which uses the decoded instruction contained in the Control Logic Unit 801 to specify a certain sequence of clock cycles called states. The above listed units are used to perform the primary task of the PCU, that is, to translate an instruction into a series of commands which can perform some useful operation.

The PCU also contains an Indicator Register N labeled 809, which stores the results of tests for high, equal, low and overflow conditions to determine whether a program branch should be taken or not. The Indicator Register also contains a Branch Indicator (not shown) which instructs the Control Logic Unit 801, the State Counter 802, as to whether or not a branch condition is present.

The interrupt recognition circuit in the PCU consists of Enable Register E labeled 807, a Mask Register M labeled 808, and an Interrupt Logic Circuit 811.

A Master Control Panel 101, actually composed of three individual panels is used to manually control the PCU and to provide a visual indication of system status.

Figure 6:
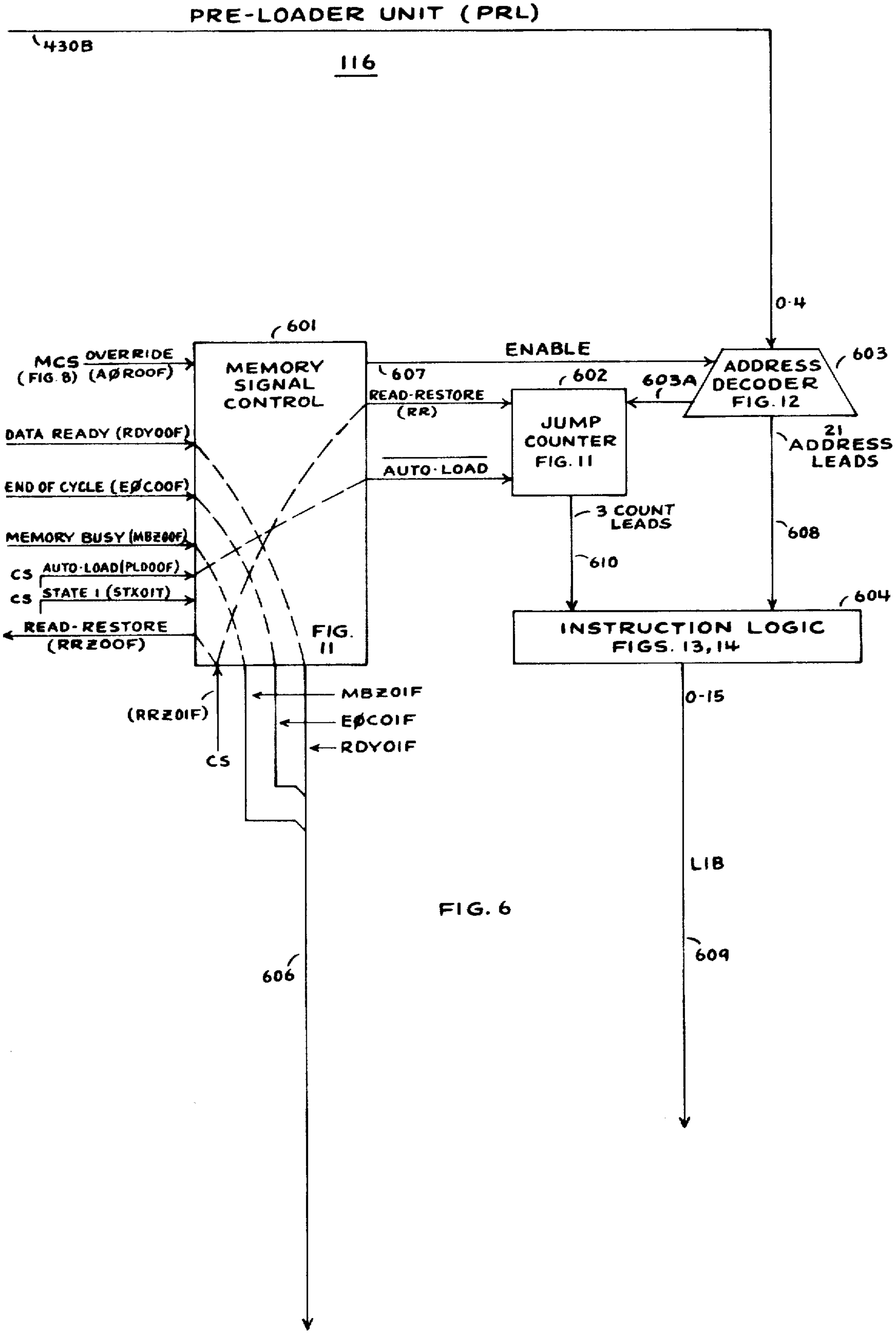
Figure 7:
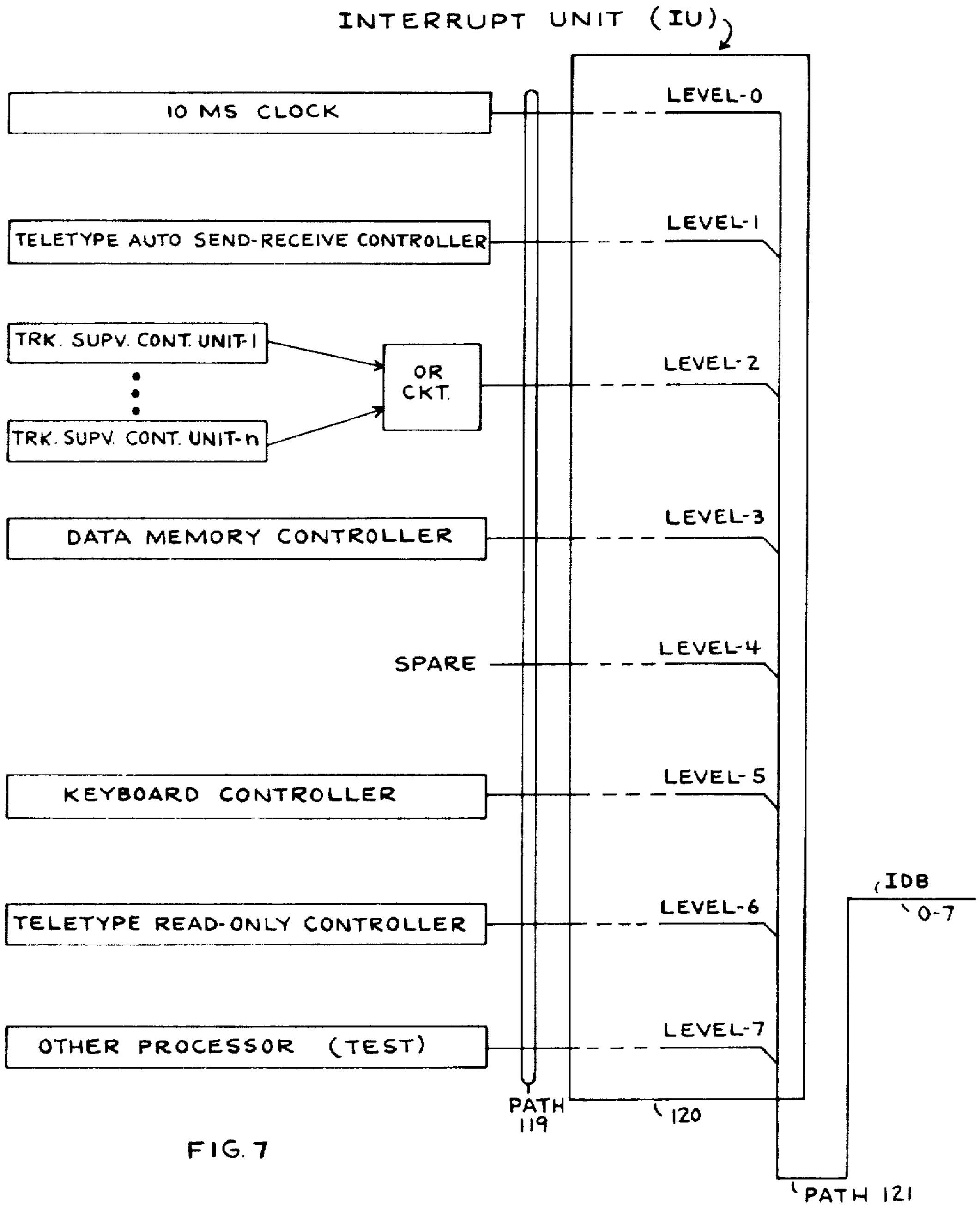
Figure 11:
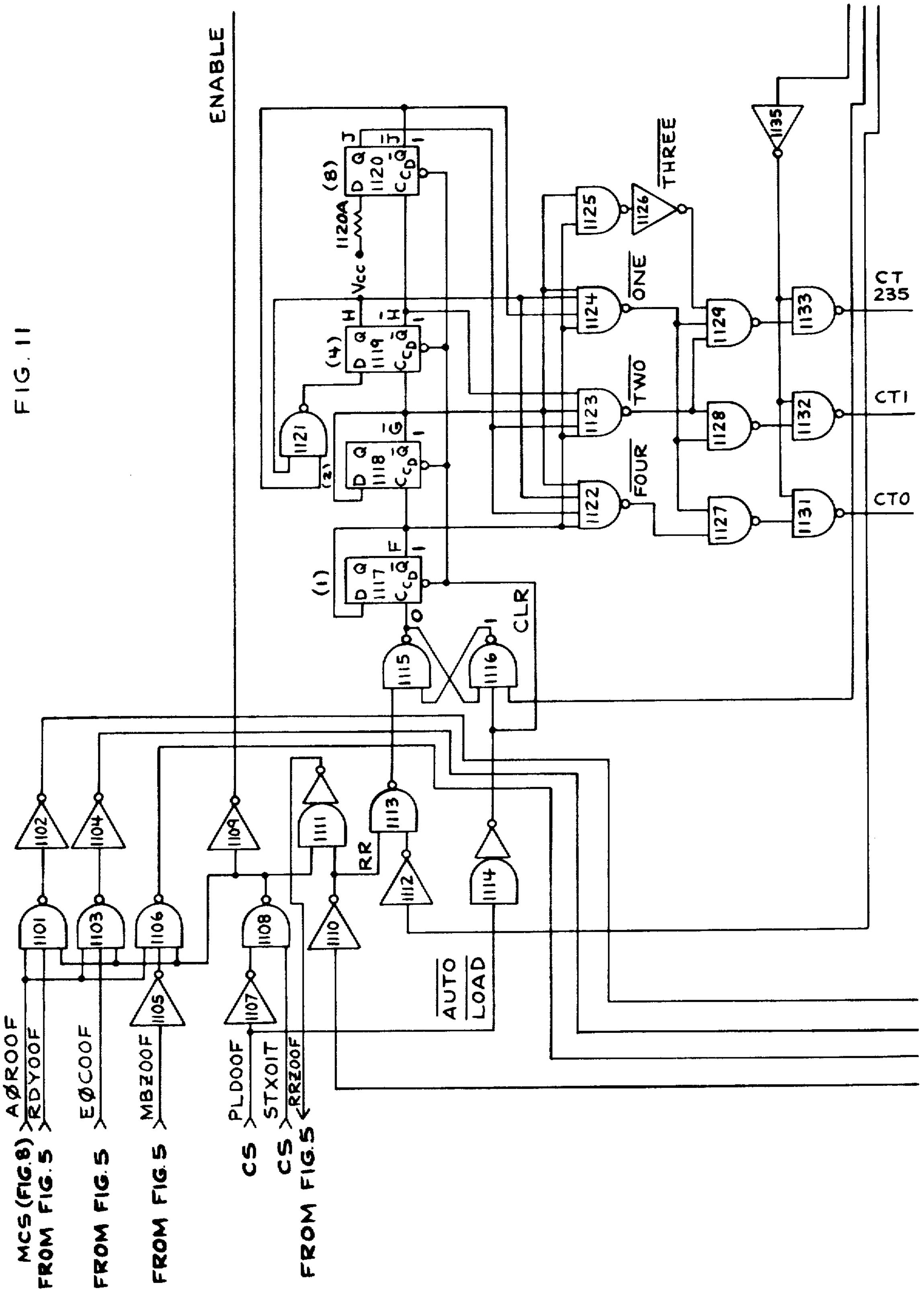
FIGS. 11–14 assembled as shown in FIG. 49B provide a logic diagram of the preloader found in FIGS. 1 and 6.
Figure 12:
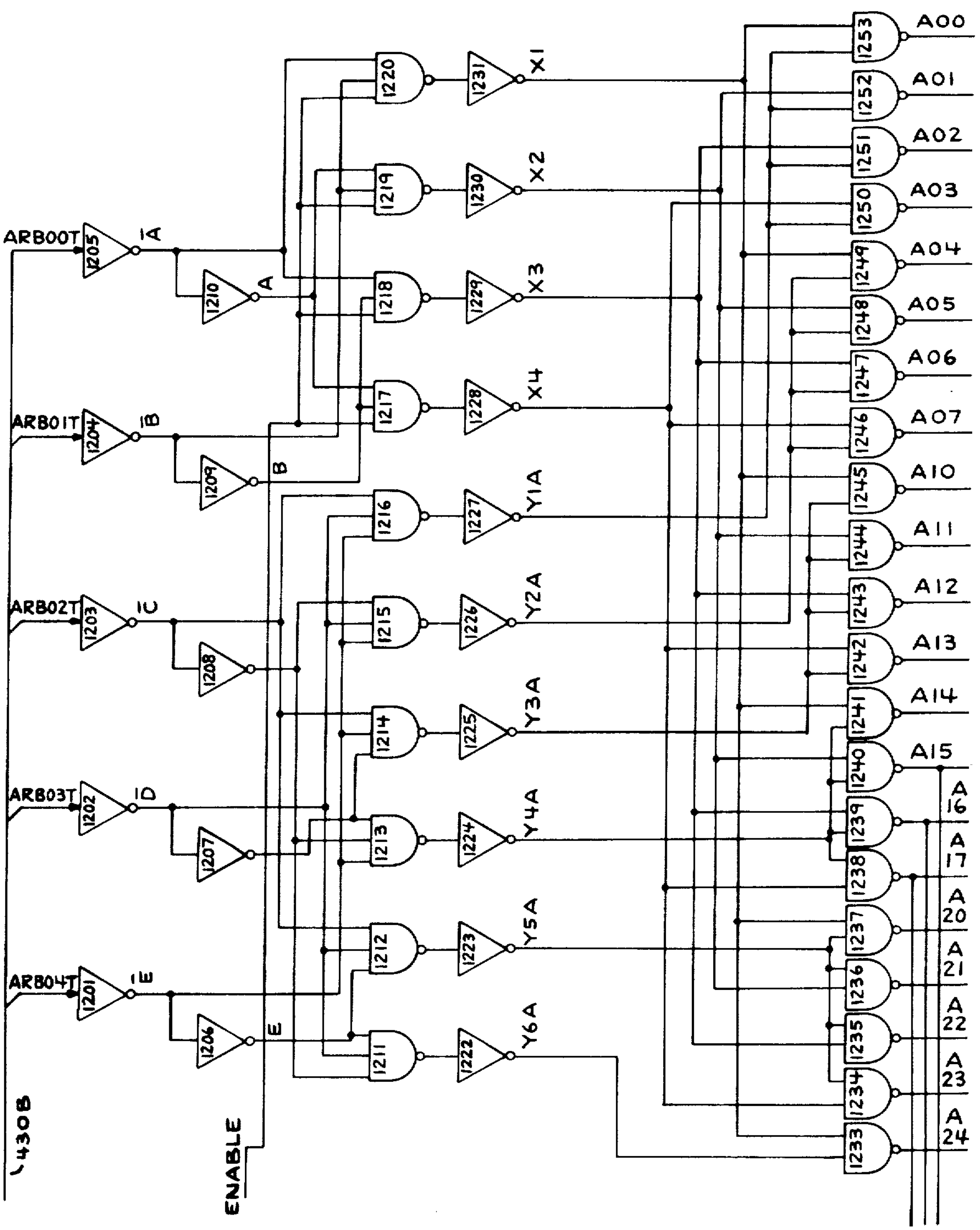
Figure 13:
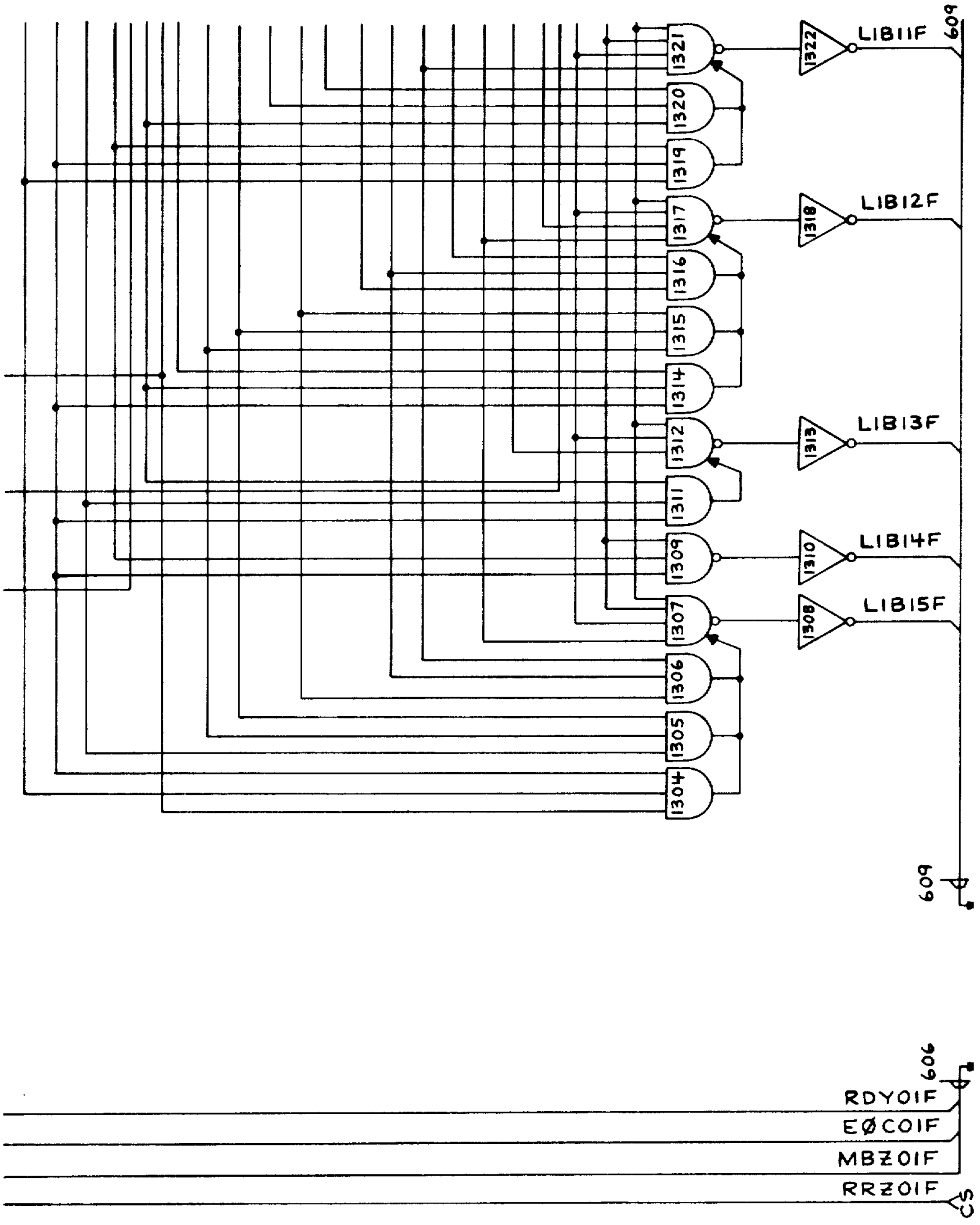
Figure 14:
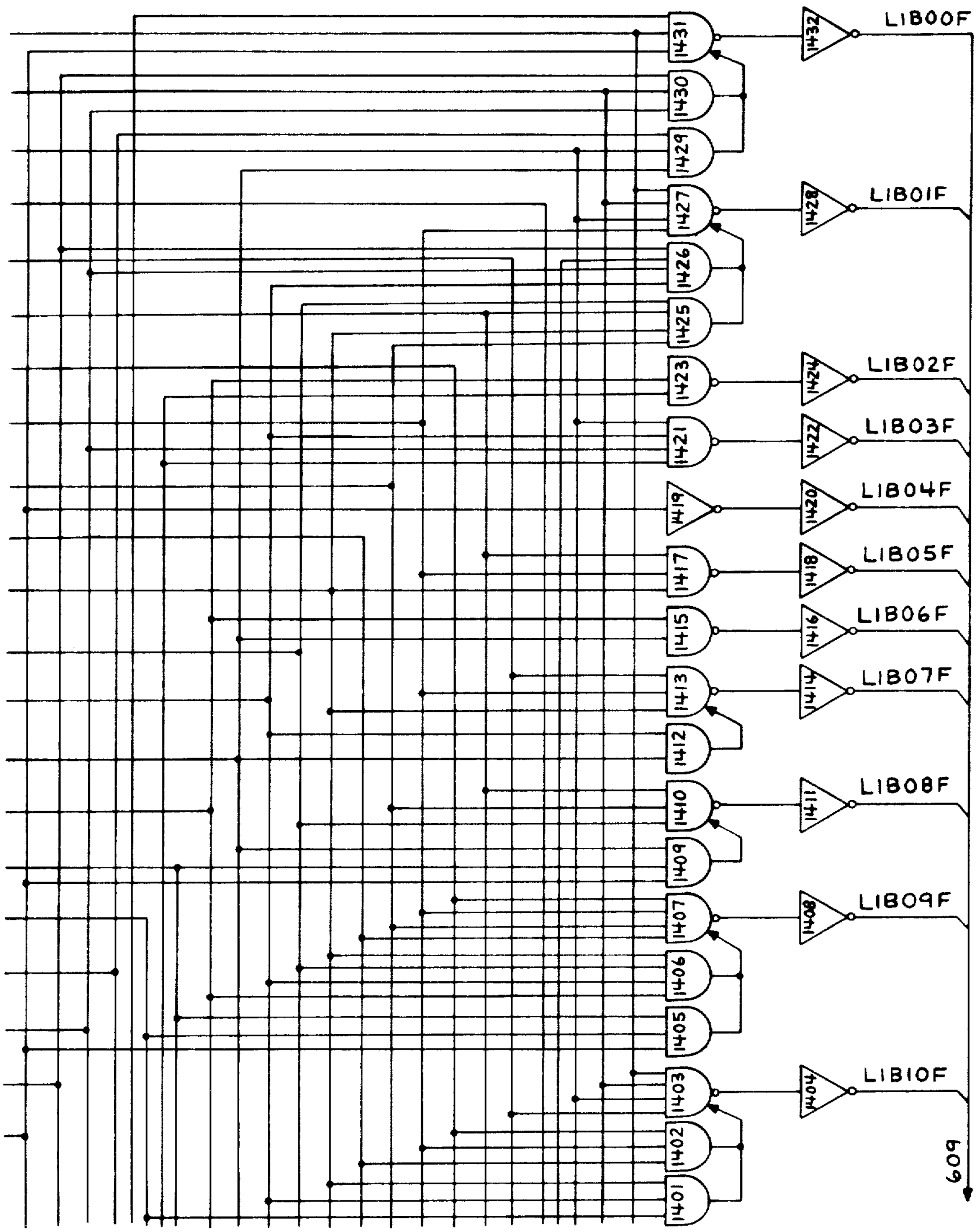

In addition to the functions effected over path 102, the master control panel 101 effectuates certain other functions as follows:

Leads MCS (FIGS. 6, 11)

The depression of the over-ridge button results in the actuation of this lead which via logic in the preloader circuit blocks signals from the SMU over leads RDY01F, E000 0F and MBZ01F to the PCU which normally conditions the PCU for SMU operation.

Lead MCS (PRLOOF)

The depression of the auto-load button results in the actuation of this lead which conditions OR gate circuit 901 to pass information signals incoming over path 609.

Lead MCS (STA21F)

The depression of the load button results in the actuation of this lead which conditions OR gate circuit 901 to pass information signals incoming over path 812 from the data bit switches which are manually set.

If neither lead MCS (PRLOOF) nor MCS (STA21F) are actuated, the OR circuit 901 is automatically conditioned to pass information signals incoming over path 509.

The Control Data Counter 806, which counts successive clock cycles in "state 6," provides an operating sequence for the array registers 405–420, which are being stored in SMU or restored from SMU during an interrupt sequence so that the array register space can be used to serve the interrupt after which the information is brought back.

Detailed Description of PCU

It should be observed that the State Counter 802 presents a plurality of leads, over path 802A, to the control logic corresponding to the various states by which selectively, in sequence, the control logic is conditioned to execute the commands corresponding to the states. Normally the State 1 lead will be in the high condition, predisposing the control logic to execute State 1. The State Counter also, as a result of the various instruction words from PRE or SMU, is enabled to selectively program the highs on these leads to the control logic at the end of sequences of Clock 804 to direct the control logic to the next appropriate state. The control logic over path 804A informs the Clock 804 as to the number of steps to count for each state and the State Counter 802, in turn, via the control logic, monitors for the last step in each state.

It should be recalled that when the attendant initially pressed the Run Button, Clock 804 started counting. This count provided signals to the Control Logic 801 at each step, to enable the control logic to execute the various logic directives associated with State 1 during which the the first instruction word from PRL was brought into the Instruction Register 805 of PCU and the Memory Register 403 of DHU. This first word in Instruction Register 805 enables the Control Logic 801 to present information to the State Counter, enabling the State Counter to selectively inform the Control Logic of the various states at the end of clock sequences.

Since the primary task of the PCU is to translate the contents of the Instruction Register 805, into a group of commands, we will consider the composition of the instruction contained in the Instruction Register.

Every instruction contains an operation code and may or may not contain a modifier, an address, or both.

Every instruction is comprised entirely of an operation code, bits 0–15; or takes the following form:

| 15 | 14 13 12 11 10 | 9 8 | 7 6 5 4 3 2 1 0 |
|---|---|---|---|
| Mode of addressing or further definition of operation code | Operation Code | Mode of addressing or further definition of operation code | Data which can further define operation code or be part of an address, or be data. Furthermore this can be broken up into two 4-bit portions. |

In addition, for purposes of identification, every instruction operation code has a mnemonic. The following is a list of the 65 various operation code mnemonics, their meanings and their associated operation codes.

| MNEM | Meaning | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| LBZ | Load base address register zero (410) | 0 | 0 | 0 | 1 | 0 | 0 | 0 | 0 | | | | | | | | |
| LBØ | Load base address register one (411) | 1 | 0 | 0 | 1 | 0 | 0 | 0 | 0 | | | | | | | | |
| LIA | Load IA register (419) | | 0 | 0 | 1 | 1 | 1 | | | | | | | | | | |
| LDA | Load A register (406) | | 0 | 1 | 0 | 0 | 0 | | | | | | | | | | |
| LDQ | Load Q register (407) | | 0 | 1 | 0 | 0 | 1 | | | | | | | | | | |
| LDX | Load X register (408) | | 0 | 1 | 0 | 1 | 0 | | | | | | | | | | |
| LDI | Load I register (409) | | 0 | 1 | 0 | 1 | 1 | | | | | | | | | | |
| LMR | Load M register (808) | 0 | 0 | 0 | 1 | 0 | 1 | 1 | 1 | | | | | | | | |
| LER | Load E register (807) | 1 | 0 | 0 | 1 | 0 | 1 | 1 | 1 | | | | | | | | |
| STA | Store A register, (406) | | 0 | 1 | 1 | 0 | 0 | | | | | | | | | | |
| STQ | Store Q register (407) | | 0 | 1 | 1 | 0 | 1 | | | | | | | | | | |
| STX | Store X register (408) | | 0 | 1 | 1 | 1 | 0 | | | | | | | | | | |
| STI | Store I register (409) | | 0 | 1 | 1 | 1 | 1 | | | | | | | | | | |
| ADA | Add to A register (406) | | 1 | 0 | 0 | 0 | 0 | | | | | | | | | | |
| ADQ | Add to Q register (407) | | 1 | 0 | 0 | 0 | 1 | | | | | | | | | | |
| ADX | Add to X register (408) | | 1 | 0 | 0 | 1 | 0 | | | | | | | | | | |
| ADI | Add to I register (409) | | 1 | 0 | 0 | 1 | 1 | | | | | | | | | | |
| SBA | Subtract from A register (406) | | 1 | 1 | 0 | 0 | 0 | | | | | | | | | | |
| SBQ | Subtract from Q register (407) | | 1 | 1 | 0 | 0 | 1 | | | | | | | | | | |
| AMA | Add A register (406) to memory | | 1 | 0 | 1 | 0 | 1 | | | | | | | | | | |
| AMQ | Add Q register (407) to memory | | 1 | 0 | 1 | 0 | 0 | | | | | | | | | | |
| AMØ | Add one to memory | | 1 | 0 | 1 | 1 | 0 | | | | | | | | | | |
| SMA | Subtract A register (406) from memory | | 1 | 1 | 0 | 1 | 0 | | | | | | | | | | |
| SMQ | Subtract Q register (407) from memory | | 1 | 1 | 0 | 1 | 1 | | | | | | | | | | |
| SMØ | Subtract one from memory | | 1 | 0 | 1 | 1 | 1 | | | | | | | | | | |
| LPA | Logical product with A register (406) | | 1 | 1 | 1 | 0 | 0 | | | | | | | | | | |
| EØA | Exclusive or with A register (406) | | 1 | 1 | 1 | 0 | 1 | | | | | | | | | | |
| CMA | Compare memory with A register (406) | | 1 | 1 | 1 | 1 | 0 | | | | | | | | | | |
| CMQ | Compare memory with Q register (407) | | 1 | 1 | 1 | 1 | 1 | | | | | | | | | | |
| SHR | Shift right | 0 | 0 | 0 | 1 | 0 | 0 | 0 | 1 | | | | | | | | |
| SHL | Shift left | 1 | 0 | 0 | 1 | 0 | 0 | 0 | 1 | | | | | | | | |
| RTR | Rotate right | 0 | 0 | 0 | 1 | 0 | 0 | 1 | 0 | | | | | | | | |
| RTL | Rotate left | 1 | 0 | 0 | 1 | 0 | 0 | 1 | 0 | | | | | | | | |
| TAZ | Test A register (406) Zero | | 0 | 0 | 0 | 1 | 0 | 0 | 0 | | | | | | | | |
| TQZ | Test Q register (407) Zero | | 0 | 0 | 0 | 1 | 0 | 0 | 1 | | | | | | | | |
| TXZ | Test X register (408) Zero | | 0 | 0 | 0 | 0 | 0 | 1 | 0 | | | | | | | | |
| TXI | Test X register (408) Zero and increment | | 0 | 0 | 0 | 0 | 0 | 1 | 1 | | | | | | | | |
| TXD | Test X register (408) Zero and decrement | | 0 | 0 | 0 | 0 | 1 | 0 | 0 | | | | | | | | |
| TØF | Test overflow indicator on | | 0 | 0 | 0 | 1 | 0 | 1 | 0 | | | | | | | | |
| TIZ | Test I register (409) Zero | | 0 | 0 | 0 | 0 | 1 | 0 | 1 | | | | | | | | |
| TII | Test I register (409) Zero and increment | | 0 | 0 | 0 | 0 | 1 | 1 | 0 | | | | | | | | |
| TID | Test I register (409) Zero and decrement | | 0 | 0 | 0 | 0 | 1 | 1 | 1 | | | | | | | | |
| TEQ | Test equal indicator on | | 0 | 0 | 0 | 1 | 0 | 1 | 1 | | | | | | | | |
| THI | Test high indicator on | | 0 | 0 | 0 | 1 | 1 | 0 | 0 | | | | | | | | |
| TLØ | Test low indicator on | | 0 | 0 | 0 | 1 | 1 | 0 | 1 | | | | | | | | |
| SBZ | Set bit to Zero | 0 | 0 | 0 | 0 | 0 | 0 | 0 | 1 | | | | | | | | |
| SBØ | Set bit to one | 1 | 0 | 0 | 0 | 0 | 0 | 0 | 1 | | | | | | | | |
| TBZ | Test bit equal to Zero | 0 | 0 | 0 | 0 | 1 | 1 | 1 | 0 | | | | | | | | |
| TBØ | Test bit equal to one | 1 | 0 | 0 | 0 | 1 | 1 | 1 | 0 | | | | | | | | |
| TSZ | Test bit equal to one, set bit to Zero | 1 | 0 | 0 | 0 | 1 | 1 | 1 | 1 | | | | | | | | |
| TSØ | Test bit equal to Zero, set bit to one | 0 | 0 | 0 | 0 | 1 | 1 | 1 | 1 | | | | | | | | |
| JMP | Jump | | 0 | 0 | 1 | 1 | 0 | | | | | | | | | | |
| JMR | Jump relative | | 0 | 0 | 1 | 0 | 0 | 1 | 1 | | | | | | | | |
| ØDW | Output data word | 1 | 0 | 0 | 1 | 0 | 1 | 1 | 0 | 1 | 0 | 0 | 0 | 0 | 0 | 0 | 0 |
| IDW | Input data word | 0 | 0 | 0 | 1 | 0 | 1 | 1 | 0 | 1 | 0 | 0 | 0 | 0 | 0 | 0 | 0 |
| HLT | Halt | 0 | 0 | 0 | 0 | 0 | 0 | 0 | 0 | 0 | 0 | 0 | 0 | 0 | 0 | 0 | 0 |

| MNEM | Meaning | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| ENA | Enable interrupt | 0 | 0 | 0 | 1 | 0 | 1 | 0 | 0 | 0 | 0 | 0 | 0 | 0 | 0 | 0 | 0 |
| DIS | Disable interrupt | 1 | 0 | 0 | 1 | 0 | 1 | 0 | 0 | 0 | 0 | 0 | 0 | 0 | 0 | 0 | 0 |
| MAC | No operation | 1 | 0 | 0 | 0 | 0 | 0 | 0 | 0 | 0 | 0 | 0 | 0 | 0 | 0 | 0 | 0 |
| SCD | Store control data | 0 | 0 | 0 | 1 | 0 | 1 | 0 | 1 | 0 | 0 | 0 | 0 | 0 | 0 | 0 | 0 |
| RCD | Restore control data | 1 | 0 | 0 | 1 | 0 | 1 | 0 | 1 | 0 | 0 | 0 | 0 | 0 | 0 | 0 | 0 |
| SPI | Set processor interrupt | 1 | 0 | 0 | 1 | 0 | 1 | 1 | 0 | 0 | 1 | 0 | 0 | 0 | 0 | 0 | 0 |
| RPI | Reset processor interrupt | 1 | 0 | 0 | 1 | 0 | 1 | 1 | 0 | 0 | 0 | 1 | 0 | 0 | 0 | 0 | 0 |
| RTI | Reset external interrupt | 1 | 0 | 0 | 1 | 0 | 1 | 1 | 0 | 0 | 0 | 0 | 1 | 0 | 0 | 0 | 0 |
| RPE | Reset processor error interrupt | 1 | 0 | 0 | 1 | 0 | 1 | 1 | 0 | 0 | 0 | 0 | 0 | 1 | 0 | 0 | 0 |

Note that some of the operation codes are a complete 16-bit word. These codes are complete in themselves and require no modifier. They specify a specific action which is always performed in the same manner. These codes may, therefore, be considered as instructions. The other codes are not complete and require either a modifier or an address or both to specify how to where the specific action is to occur. For example, the operation code mnemonic LDA indicates that the A register is to be loaded but does not specify what the A register,406, is to be loaded with.

The following is a listing of the encoded modifiers and their mnemonics:

| MNEM. | 15 14 13 12 11 10 | 9 | 8 | 7 | 6 5 4 3 2 1 0 |
|---|---|---|---|---|---|
| N | 0 | 0 | 0 | | |
| R | 1 | 0 | 0 | | |
| D0 | 0 | 0 | 1 | | |
| D1 | 1 | 0 | 1 | | |
| X0 | 0 | 1 | 0 | | |
| X1 | 1 | 1 | 0 | | |
| I0 | 0 | 1 | 1 | | |
| I1 | 1 | 1 | 1 | | |
| 0 | | | | 0 | 000 |
| 1 | | | | 0 | 001 |
| 2 | | | | 0 | 010 |
| 3 | | | | 0 | 011 |
| 4 | | | | 0 | 100 |
| 5 | | | | 0 | 101 |
| 6 | | | | 0 | 110 |
| 7 | | | | 0 | 111 |
| 8 | | | | 1 | 000 |
| 9 | | | | 1 | 001 |
| 10 | | | | 1 | 010 |
| 11 | | | | 1 | 011 |
| 12 | | | | 1 | 100 |
| 13 | | | | 1 | 101 |
| 14 | | | | 1 | 110 |
| 15 | | | | 1 | 111 |

N — No Address.

R — Array Register.

D0 — Direct Address — Base Register BG conatenation.

D1 — Direct Address — Base Register BH concatenation.

X0 — Increment Address without changing instruction word. Contents of X added to D0 to form X0.

X1 — Increment Address without changing instruction word.

Contents of X added to D1 to form X1.

I0 — Increment Address without changing instruction word. Contents of I added to D0 to form I0.

I1 — Increment Address without changing instruction word. Contents of I added to D1 to form I1.

NOTE: D0, D1, X0, X1, I0, I1 become stored in WR.

The modifiers N, R, D0, D1, X0, X1, I0 and I1 specify which of the address forms is to be used. The remaining modifiers, 0–15, represent a quantity and are used with special operation codes.

The address portion of the word may use one or more of the following forms. The number of forms that an instruction may take is dependent upon the operation code. The list of address forms is as follows:

| | | |
|---|---|---|
| Form 1 | LABEL | The lower 8 bits of the location associated with the label are encoded into bits 0–7 of the memory word. |
| Form 2 | LABEL | The upper eight bits of the location associated with the label are encoded into bits 0–7 of the memory word. |
| Form 3 | LABEL | The absolute difference between the current instruction location and the location associated with the label is encoded into bits 0–7 of the memory word. If the location of the label is greater than the current instruction location, the encoded memory word will contain a 1 in bit position 15. Otherwise, bit 15 will contain a 0. |
| Form 4 | NUMBER | The value of the number is encoded into bits 0–7 of the memory word. The number may be specified in the mnemonic in octal or decimal where the octal value can range from 0 to 377 and the decimal value can range from 0 to 255. The number written in octal will use subscript 8. The number written in decimal will be followed by the letter D in the mnemonic. |
| Form 5 | LABEL | Same as Form 3 except that the value is encoded into bits 0–3 of the memory word. |
| Form 6 | ARRAY LABEL | The special mnemonics specify the encoded values in bit positions 0–3 of the memory word. |

Label, as used herein, is the address of location in SMU. Memory words, as used herein, refer to words fed over OR gate 901.

The following special mnemonics are considered ARRAY LABELS (referring to the Memory Array Registers of FIG. 4) when used with the instruction modifier "R." They have the following values:

| Array label | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| W | | | | | | | | | | | | | 0 | 0 | 0 | 0 |
| A | | | | | | | | | | | | | 0 | 0 | 0 | 1 |
| Q | | | | | | | | | | | | | 0 | 0 | 1 | 0 |
| X | | | | | | | | | | | | | 0 | 0 | 1 | 1 |
| I | | | | | | | | | | | | | 0 | 1 | 0 | 0 |
| BZ | | | | | | | | | | | | | 0 | 1 | 0 | 1 |
| BØ | | | | | | | | | | | | | 0 | 1 | 1 | 0 |
| R | | | | | | | | | | | | | 0 | 1 | 1 | 1 |
| S | | | | | | | | | | | | | 1 | 0 | 0 | 0 |
| T | | | | | | | | | | | | | 1 | 0 | 0 | 1 |
| JR (Jump Register) | | | | | | | | | | | | | 1 | 0 | 1 | 0 |
| U | | | | | | | | | | | | | 1 | 0 | 1 | 1 |
| V | | | | | | | | | | | | | 1 | 1 | 0 | 0 |
| PC (Program Counter) | | | | | | | | | | | | | 1 | 1 | 0 | 1 |
| IA (Interrupt Address) | | | | | | | | | | | | | 1 | 1 | 1 | 0 |
| WR (Working Register) | | | | | | | | | | | | | 1 | 1 | 1 | 1 |

The operation codes cannot assume every modifier and/or address form. The list of operation codes and the allowable modifiers and address forms is as follows:

| OP CODE | | MODIFIER | ADDRESS FORM |
|---|---|---|---|
| LBZ | | None | Forms 2 and 4 |
| LB0 | | None | Forms 2 and 4 |
| LIA | | N | Form 4 |
| LIA | | R | Form 6 |
| LIA | | D0 | Forms 1 and 4 |
| LIA | D1 | | Forms 1 and 4 |
| LIA | | | |
| X0 | | | Forms 1 and 4 |
| LIA | | | |
| X1 | | | Forms 1 and 4 |
| LIA | | | |
| I0 | | | Forms 1 and 4 |
| LIA | | | |
| I1 | | | Forms 1 and 4 |
| LDA | | Same as LIA | |
| LDQ | | " | |
| LDX | | " | |
| LDI | | " | |
| STA | | " | |
| STQ | | " | |
| STX | | " | |
| STI | | " | |
| ADA | | " | |
| ADQ | | " | |
| ADX | | " | |
| ADI | | " | |
| SBA | | " | |
| SBQ | | " | |
| AMA | | " | |
| AMQ | | " | |
| AM0 | | " | |
| SMA | | " | |
| SMQ | | " | |
| SM0 | | " | |
| LPA | | " | |
| E0A | | Same as LIA | |
| CMA | | " | |
| CMQ | | " | |
| JMP | | " | |
| LMR | None | | Form 4 |
| LER | None | | Form 4 |
| SHR | Dec. 0–15 | | Form 6 |
| SHL | Dec. 0–15 | | Form 6 |
| RTR | Dec. 0–15 | | Form 6 |
| RTL | Dec. 0–15 | | Form 6 |
| SBZ | Dec. 0–15 | | Form 6 |
| SB0 | Dec. 0–15 | | Form 6 |
| TAZ | None | | Form 3 |
| TQZ | None | | Form 3 |
| TXZ | None | | Form 3 |
| TXI | None | | Form 3 |
| IXD | None | | Form 3 |
| T0F | None | | Form 3 |
| TIZ | None | | Form 3 |
| TII | None | | Form 3 |
| TID | None | | Form 3 |
| TEQ | None | | Form 3 |
| THI | None | | Form 3 |
| TL0 | None | | Form 3 |
| JMR | None | | Form 3 |
| TBZ | Dec. 0–15 | | Form 5 |
| TB0 | Dec. 0–15 | | Form 5 |
| TSZ | Dec. 0–15 | | Form 5 |
| TS0 | Dec. 0–15 | | Form 5 |

Before an instruction word can be formed, it is necessary to know the specific actions of each modifier and operation code. The modifier and/or operation code actually define the type of instruction which, in turn, defines a sequence of states which the control logic must follow to perform a specific operation. Since a state is a fixed length sequence of commands, one of the criteria for determining whether or not a command should be activated is the type of the instruction. The following is a list of instruction types and method of determination:

| TYPE | CONDITION |
|---|---|
| 1 | Any instruction using the N, D0, D1, X0, X1, I0 or I1 modifier. |
| 2 | any instruction using the R modifier |
| 3 | LB0 or LBZ op. Code |
| 4 | SHR, SHL, RTR, or RTL op. code |
| 5 | SBZ or SB0 op. code |
| 6 | TS0, TSZ, TB0 or TBZ op. code |
| 8 | LMR, or LER op. code |
| 9 | SCD, RCD, DIS, ENA, 0DW, IDW, RPI, SPI, RTI or RPE op. code |
| 17 | TXZ or TXI op. code |
| 19 | MAC or HLT op. code |
| 27 | TIZ, TID, TII or TXD op. code |
| 37 | TEQ, TAZ, TQZ or T0F op. code |
| 47 | THI or TL0 op. code |
| 57 | JMR op. code |

NOTE: Types 17, 27, 37, 47, and 57 are different forms of what could be called type 7. Type 19 is a different form of type 9.

The instruction word arrives through the OR gates 901 into IR register.

The IR register inspects the incoming instruction to see if it fits into a recognized category such as load, add, subtract, store, logical product, exclusive OR, compare, add to memory, subtract from memory. Instruction register IR via control logic 801 signals the state counter 802 giving the operation code (if recognized), bits 8, 9 and 15 which may be a modifier or a means of defining the instruction, and the instruction type (type 1 or 2 if the operation code is recognized; type 3, 5, 7 if the operation code is not recognized).

The operation code modifier and instruction type are sent to the State Counter 802, which translates this information into a sequence of states. Each state performs a fixed sequence of operations as a result of the instruction word. Each state and its operation are listed below with an indication of the general purpose of the state.

State 1

(Bring in instruction from PRL or SMU)

Stop Clock, 804, after four counts if the SMU is not ready. (RDYOOF from SMU via path 606 is high if SMU is not ready).

Stop Clock 804, after eight counts if the SMU is not ready and the Override and Preload buttons on the Master Control Panel 803 are not operated.

Load the interrupt data on path 121 via Interrupt Control Logic 811 into E Register 807.

Load the contents of the PC Register 418 into the Address Register 401, if the branch flag is not set in the Indication Register 809.

Load the contents of the JR Register 417 into the Address Register 401, if the branch flag is set in the Indicating Register 809.

Also, load the contents of PC Register or JR Register, as the case may be, into the Data Register 402.

Add 1 to the contents of the Data Register 402, and store the result in the PC Register 418.

Read the word stored in the SMU at the address specified by the contents of the Address Register 401.

Load the SMU word into the Memory Register 403 and the Instruction Register 805 via the MIB 902 leads.

Reset the Control Data Counter 806.

Strobe the State Counter 802 to determine the next state.

State 2

(Concatenation with base register for D mode addressing).

Load the contents of the BG Register 410 into the

Memory Register 403, bit positions 8–15 if bit 15 of the instruction word is 1.

NOTE: The two above operations cause only 8 bits to be loaded into the Memory Register 403 because the BG 410 and BH 411 Registers are only 8 bits in length.

Load the contents of the Memory Register 403 into the WR Register 420.

Strobe the State Counter 802 to determine the next state.

State 3

(Formulation of address for X or I mode addressing.)

Load the contents of the BG Register 410 into the Memory Register 403, bit positions 8–15 if bit 15 of the instruction word is 0.

Load the contents of the BH Register 411 into the Memory Register 403, bit positions 8–15 if bit 15 of the instruction word is 1.

Load the contents of the X Register 408 into the Data Register 402, if the modifier is X0 or X1.

Load the contents of the I Register 409 into the Data Register 402, if the modifier is I0 or I1.

Add the contents of the Memory Register 403 to the contents of the Data Register 402, and store the sum in the WR Register 420.

Strobe the State Counter 802 to determine the next state.

State 4

(Retrieval of SMU word at address formed in 2 or 3; also including retrieval of same for RCD command).

Stop Clock 804 after 4 counts if the SMU is not ready.

Stop Clock 804 after 8 counts if the SMU is not ready and the Override and Preload buttons on the Master Control Panel 803 is not operated.

Load the contents of the WR Register 420 onto Address Register 401.

Also load the contents of the WR Register 420 into the Data Register 402, if the instruction word is RCD.

Add 1 to the contents of the Data Register 402 and store the sum in the WR Register 420, if the instruction word is RCD.

Read the word stored in the SMU at the address specified by the contents of the Address Register 401.

Load the SMU word into the Memory Register 403.

Strobe the State Counter 802 to determine the next state.

Relative to the next three states, i.e., 5A, 5B, and 5C, it can be said that the physical operation described by the operation code of the instruction (which may be a portion of, or the complete instruction) will be performed in one of these states; with the exception of STA, STQ, STX, and STI which will be performed in State 6; with the exceptions to the exception that STA, STQ, STX, and STI will be performed in State 5C in the R Mode, and in States 5C and 6 in the N Mode. As an example of State 5 operation, the operation code mnemonic LDA specifies that the A Register 406 is to be loaded with some value. The actual loading of the A Register 406 will occur in State 5C.

State 5A

Performance of physical operation described by operation code with clock count of 20. This state is used for test commands, rotate commands, etc.

State 5B

Performance of physical operation described by operation code for instruction with clock count of 16. This state is used for longer operational sequences such as the jump command in the N Mode, input data word command (IDW), shift commands, AMA and AMQ in any mode, etc.

State 5C

Performance of physical operation described by operation code for instruction with clock count of 8. This state is used for shorter operational sequences such as output data word command (ODW), commands such as STA, STQ, STX, and STI in the R Mode. Commands STA, STQ, STX, and STI in the N Mode will be partially performed in this state, including storage in WR Register. With respect to the operation code mnemonic LDA, the actual loading of the A Register 406 will occur in this state.

State 6

(Performance of instruction if operational code is stored; or storage of contents of array registers in SMU if instruction is SCD. Instructions for STA, STQ, STX, and STI in the N Mode will be partially performed in State 6.)

Stop Clock 804 after four counts if the SMU is not ready.

Load the contents of the IA Register 419 into the Address Register 401 if the instruction word is SCD and the Control Data Counter 806 is at 0.

Load the contents of the WR Register 420 into the Address Register 401 if the instruction word is SCD and the Control Data Counter 806 is not at 0.

Load the contents of the WR Register 420 into the Address Register 401 if the modifier is not N or R and the instruction word is not SCD.

Add 1 to the contents of the Memory Register 403 and store the sum in the WR Register 420 if the instruction word is SCD.

Load the contents of the A Register 406 into the Data Register 402 if the operation code is STA.

Load the contents of the Q Register 407 into the Data Register 402 if the operation code is STQ.

Load the contents of the X Register 408 into the Data Register 402 if the operation code is STX.

Load the contents of the I Register 409 into the Data Register 402 if the operation code is STI.

Load the contents of the A Register 406 into the Data Register 402 if the instruction word is SCD and the Control Data Counter 806 is at 1.

Load the contents of the Q Register 407 into the Data Register 402 if the instruction word is SCD and the Control Data Counter 806 is at 2.

Load the contents of the X Register 408 into the Data Register 402 if the instruction word is SCD and the Control Data Counter 806 is at 3.

Load the contents of the I Register 409 into the Data Register 402 if the instruction word is SCD and the Control Data Counter 806 is at 4.

Load the contents of the BG Register 410 into the

Data Register 402 if the instruction word is SCD and the control Data Counter 806 is at 5.

Load the contents of the BH Register 411 into the Data Register 402 if the instruction word is SCD and the Control Data Counter 806 is at 6.

Load the contents of the R Register 412 into the Data Register 402 if the instruction word is SCD and the Control Data Counter 806 is at 7.

Load the contents of the S Register 413 into the Data Register 402 if the instruction word is SCD and the Control Data Counter 806 is at 8.

Load the contents of the T Register 414 into the Data Register 402 if the instruction word is SCD and the Control Data Counter 806 is at 9.

Load the contents of the JR Register 417 into the Data Register 402 if the instruction word is SCD and the Control Data Counter 806 is at 10.

Load the contents of the W Register 405 into the Data Register 402 if the instruction word is SCD and the Control Data Counter 806 is at 0, 11 or 12.

Advance the Control Data Counter 806.

Strobe the State Counter 802 to determine the next state.

State 7

(Retrieval of SMU word at address formed in 2 or 3.)

Stop Clock 804 after four counts if the SMU is not ready.

Stop Clock 804 after eight counts if the SMU is not ready and the Override and Preload buttons on the Master Control Panel 803 have not been operated.

Load the contents of the WR Register 420 into the Address Register 401.

Read the word stored in the SMU at the address specified by the contents of the Address Register 401.

Load the SMU word into the Memory Register 403.

Strobe the State Counter 802 to determine the next state.

State 8

(Store word contained in Data Register in SMU)

Stop Clock 804 after four counts if the SMU is busy.

Load the contents of the WR Register 420 into the Data Register 402.

Write the contents of the Data Register 402 into the SMU at the address specified by the contents of the Address Register 401.

Strobe the State Counter 802 to determine the next state.

State 9

(Interrupt initialization)

Load the contents of the PC Register 418 into the Data Register 402.

Load the contents of the Data Register 402 into the W Register 405.

Load the Interrupt Address, which is on lines 810, into the PC Register 418.

Reset the Processor Interrupt Enable within Control Logic 801.

Strobe the State Counter 802 to determine the next state.

Figure 40:
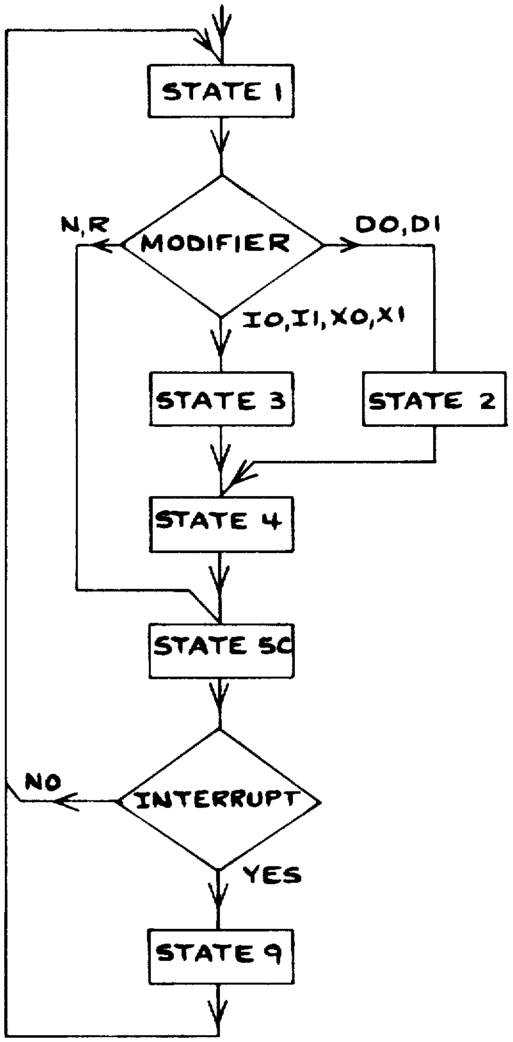
FIG. 40 comprises a flow chart for the load command.

The flow chart, FIG. 40, pertains to the operation codes LDA, LDX, LDQ and LDI, for example. These operation codes are all treated in the same manner, except in State 5C, since they all specify that a register is to be loaded.

It should be noted here that every instruction begins in State 1, since it is in State 1 that the next instruction is ordered from the SMU.

When the system is first powered up, State 1 is automatically done first. The first thing that is done is to load any interrupt signals into the Enable Register 807. Next, assuming that a branch condition is not present, the PC Register 418 is loaded into both the Address Register 401 and the Data Register 402. From the Data Register 402 the contents of the PC Register are gated into the Arithmetic and Logic Unit 404 where they are incremented by 1 and stored back in the PC Register 418. In this manner, the PC Register 418 always contains the address of the next instruction in the program.

From the Address Register 401 the contents of the PC Register are sent to the SMU. The SMU, in turn, will read out the contents of the address specified by the contents of the Address Register 401. The SMU word is then loaded into the Memory Register 403 and Instruction Register 805. The Instruction Register 805 then transfers the SMU word to the Control Logic Unit 801 where it is translated into operation code, modifier and instruction type. This information is then sent to the State Counter 802 which translates this information into a sequence of states.

For the sake of illustration, let us assume that the SMU instruction word mnemonic is LDA, N, 6. This means that the operation code is LDA and the modifier is N. We also know from before that this combination can have address Form 4 only. From address Form 4 it is apparent that the quantity with which the A Register 406 is to be loaded is contained in bits 0–7 of the memory word. In this case that quantity is $6_8$.

From FIG. 40 we can see that from State 1 this instruction will proceed directly to State 5C. In State 5C the quantity contained in bit positions 0–7 of the word contained in the Memory Register 403 will be loaded into bit positions 0–7 of the A Register 406.

The N modifier can load any quantity up to $377_8$. For quantities larger than this another modifier must be used. The most common method of loading a large number is to store the number in a data table in the SMU. Normally the data tables are stored in the higher order addresses and the program is stored in the lower order addresses of the SMU. The access addresses up to the full capacity of the memory, the modifiers DO, DI, XO, X1, IO and I1 are used. Let us see, now, what happens when the DO modifier is used. Assume that the instruction, now, is LDA, DO, 6; whereby in State 1, $6_8$ will be loaded into the Memory Register 403 in bit positions 0–7.

Referring to FIG. 40, the next operation is to execute State 2. The first thing that happens is that the content of the BG Register 410 are loaded into the Memory Register 403 in bit positions 8–15. Remember that the BG Register 410 is only 8 bits in length. Next, the contents of the Memory Register 403 are loaded into the WR Register 420. Assuming that the BG Register 410 contained $2_8$, we would have:

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| LDA, DO, 6 | 0 | 0 | 1 | 0 | 0 | 0 | 0 | 1 | 0 | 0 | 0 | 0 | 0 | 1 | 1 | 0 |
| BG (410) | 0 | 0 | 0 | 0 | 0 | 0 | 1 | 0 | | | | | | | | |
| WR (420) | 0 | 0 | 0 | 0 | 0 | 0 | 1 | 0 | 0 | 0 | 0 | 0 | 0 | 1 | 1 | 0 |

The WR Register now contains $1006_8$. This process of linking the contents of two registers is called concatenation and is used to form addresses greater than $377_8$. Effectively, this process replaces the upper 8 bits of the instruction word with the contents of the BG Register 410.

From FIG. 40, the next step is State 4. In State 4, the contents of the WR Register 420 are loaded into the Address Register 401. Next, the SMU receives a read command from the PCU (See CS lead labeled RMD, FIG. 5), and as a result will read out the word stored in the address specified by the contents of the Address Register 401. This word is subsequently stored in the Memory Register 403.

Since the SMU word is 16 bits in length, this word may have any value up to $177,777_8$.

The next step, now, is State 5C. The operation in State 5C is the same as for the N modifier, that is, the contents of the Memory Register 403 are loaded into the A register 406, with the exception, however, that the N modifier will cause only the lower 8 bits of the Memory Register 403 to be loaded into the A Register 406 whereas with any other modifier, all 16 bits will be loaded. Thus, the A Register may be loaded with any value up to $177, 177_8$.

If the instruction had been LDA, D1, 6, the only difference would have been that the BH Register 411 would have been used instead of the BG Register 410 for concatenation in State 2.

Occasionally the base address registers BG, 410, and BH, 411, do not contain the proper value to designate the desired address. To obtain the proper address in the simplest manner, the X0, X1, I0, I1 modifier can be used. Assume, as before, that it is desired to load the A register with the word stored at SMU address $1006_8$. Further assume that the BG, 410, and BH, 411, registers contain $0_8$. To keep from constantly having to change the contents of the base address registers 410 and 411, the X register 408 can be loaded with $1000_8$ and the instruction would then read LDA, X0, 6.

The first step in this instruction is State 3 as is seen from FIG. 40. In State 3, the contents of the BG register, 410, are concatenated with bits 0–7 of the memory register 403 as before. Next, the contents of the X register 408 are binarily added to the previous result and the sum is then stored in the WR register as before. The process would appear as follows:

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| LDA, XO, 6 | 0 | 0 | 1 | 0 | 0 | 0 | 1 | 0 | 0 | 0 | 0 | 0 | 0 | 1 | 1 | 0 |
| BG (410) | 0 | 0 | 0 | 0 | 0 | 0 | 0 | 0 | | | | | | | | 0 |
| Result | 0 | 0 | 0 | 0 | 0 | 0 | 0 | 0 | 0 | 0 | 0 | 0 | 0 | 1 | 1 | 0 |
| X (408) | 0 | 0 | 0 | 0 | 0 | 0 | 1 | 0 | 0 | 0 | 0 | 0 | 0 | 0 | 0 | 0 |
| WR (420) | 0 | 0 | 0 | 0 | 0 | 0 | 1 | 0 | 0 | 0 | 0 | 0 | 0 | 1 | 1 | 0 |

This is the same result that was obtained when the DO modifier was used. States 4 and 5C will now be executed the same as before.

Had the modifier been X1 instead of X0, the BH, 411, register would have been used in State 3 instead of the BG register 410.

The I0 modifier will perform the same function as the X0 modifier except that the I register 409, would be added to the result instead of the X register 408, in State 3.

In summary, it can be seen that the modifier defines the manner in which the action specified by the operation code of the instruction is to be performed. In the case of the LDA operation code, the A register 406, is loaded directly with bits 0–7 of the instruction word when the modifier is N.

It should be obvious, now, that the modifier specifies the manner in which the SMU address of the desired word is formed. With the N modifier, No address is formed. The D0 modifier specifies that the address is formed Directly from the concatenation of the BG register, 410, and bits 0–7 of the instruction. The 0 in the modifier mnemonic specifies linking with the BG register, 410, whereas a 1 in the modifier mnemonic specifies linking with the BH register 411. The X0 and X1 modifiers specify that the concatenation process will occur as before but to the result of this process is added the contents of the X register 408. The I0 and I1 modifiers have the same functions as the X0 and X1 modifiers except that the I register 409, is to be added to the result of the concatenation process. The R modifier indicates that the Array Registers 405 to 420 are to be addressed rather than the SMU. An instruction which uses the R modifier will contain the address of the register, which contains the desired word, in bit positions 0–3.

Assume, now, that the A Register 406 is to be loaded with the word contained in the R Register 412. The instruction would now be LDA, R, R. From FIG. 40 it can be seen that the first step is State 5C. In State 5C the R Register 410 is loaded into the Memory Register 403. From here on the operation of State 5C is the same as before. That is, the contents of the Memory Register 403 are loaded into the A Register 406.

The last step in this instruction is a check to see if any recognized interrupts were set in the E Register 807 in State 1. A recognized interrupt is one for which the corresponding bit is set in the Mask Register 808. The reason for using this method is that it is not always desirable to permit every interrupt. To circumvent this problem only those interrupts which are desired will have a bit set in the M Register 808.

If no interrupt is recognized, now, the State Counter 802 will return to State 1 to retrieve the next instruction from the SMU. If an interrupt is recognized, the State Counter 802 will go to State 9. In State 9, the contents of the PC Register 418 are loaded into the W Register 405. The interrupt address, which is on the DBI 810 lead, is loaded into the PC Register 418. The interrupt address is the SMU address of the first word of the program for that particular interrupt.

The next step, now, is State 1 and the word brought in from the SMU will be the first word of the interrupt program. The last word of the interrupt program will load the contents of the W Register 405 into the PC Register 418. On the subsequent State 1, the original program will be resumed at the same point where the interrupt was recognized.

The Indicator Register 809 is used primarily with instructions which specify a test. If the test is true, the Indicator Register 809 is not set. However, if the test is false, the corresponding bit in the Indicator Register 809 is set which, in turn, sets the branch flag. The branch flag is an indicator which specifies the program branch to take depending upon the result of some conditional statement. For example, the instruction TBZ 10 indicates that bit 10 of the A Register 406 is to be tested for a Zero (i.e. true). If this bit is zero, the next program instruction will be performed. If the bit is not zero (i.e. 1, false), then the bit corresponding to the branch flag will be set in the Indicator Register 809. This branch flag means that the address of the next SMU word to be read will come from the JR Register 417 instead of from the PC Register 418.

Every test instruction is a conditional statement. If the condition of the test is met, the next program instruction will be performed. If the condition is not met, the program will jump the number of steps indicated by the value encoded in bits 0–7 of the test instruction. The direction of the jump is determined by bit 15 of the test instruction if the instruction operation code is TAZ, TQZ, TXZ, TXI, TXD, TOF, TIZ, TII, TID, TEQ, THI or TLO. If bit 15 is a 0, the jump will be forward, and if bit 15 is a 1, the jump will be backward. If the instruction operation code is TBZ, TBO, TSZ or TSO, the direction of the jump will always be forward.

The high, low and equal bit positions in the Indicator Register 809 are used only with the CMA or CMQ operation codes which specify a comparison test. The operation code CMA specifies that the contents of the Memory Register 403 will be compared to the contents of the A Register 406. If the contents of the Memory Register 403 are greater than the contents of the A Register 406, the bit corresponding to the high indicator will be set in the Indicator Register 809. Similarly, if the contents of the registers are equal, the bit corresponding to the equal indicator will be set. Also, if the contents of the Memory Register 403 are less than the contents of the A Register 406, the bit corresponding to the low indicator will be set.

The bit corresponding to the overflow indicator in the Indicator Register 809 will be set any time the value of the contents of any Array Register 405–420 exceeds $177,777_8$.

data handling unit (DHU) FIGS. 1, 4, 17–39

One of the purposes of the data handling unit DHU is to provide temporary storage and compiling capabilities necessary to convert 4 teletype words to one data word.

The DHU also provides temporary data storage in the sixteen Array Registers 405 through 420 for often needed data such as the program count for example. This arrangement results in a savings of a considerable amount of time since these words no longer have to be stored in and retrieved from the SMU.

The logic necessary to perform essential arithmetic functions, such as addition and subtraction, is also included in the DHU.

Through word segmentation and the use of the shift instruction, the DHU is capable of working with either the Processor Control Unit PCU of processor APZ–142 or of the processor APZ–130.

General Description of DHU

The DHU consists of an arithmetic and logic unit 404, a memory array comprising 16 storage registers labeled 405–420, an Address Register AR and logic labeled 401, a Data Register DR and logic labeled 402, a Memory Register MR and logic labeled 403, a shift control 421, and a Bypass Logic Circuit 426.

Figure 18:
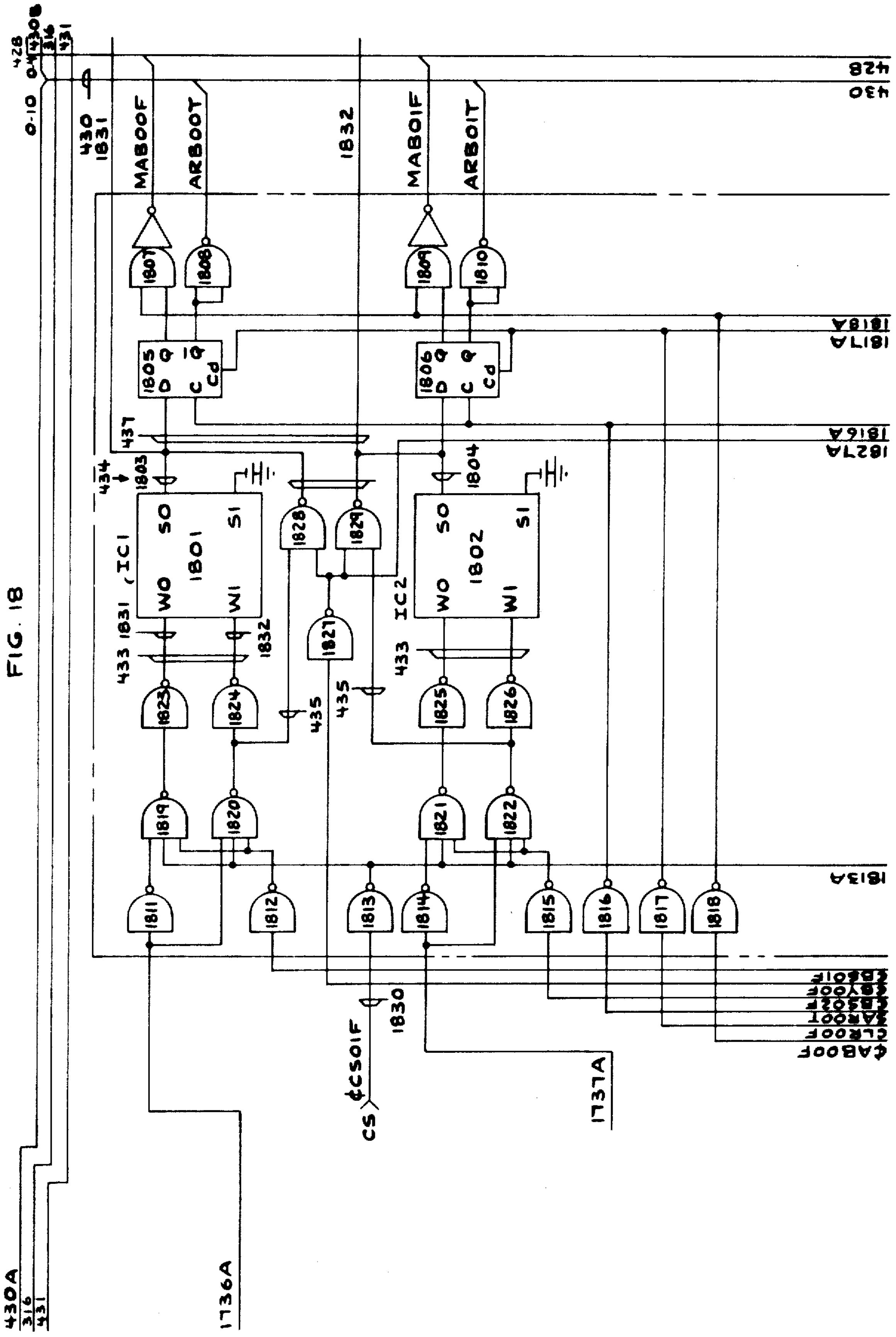
Figure 19:
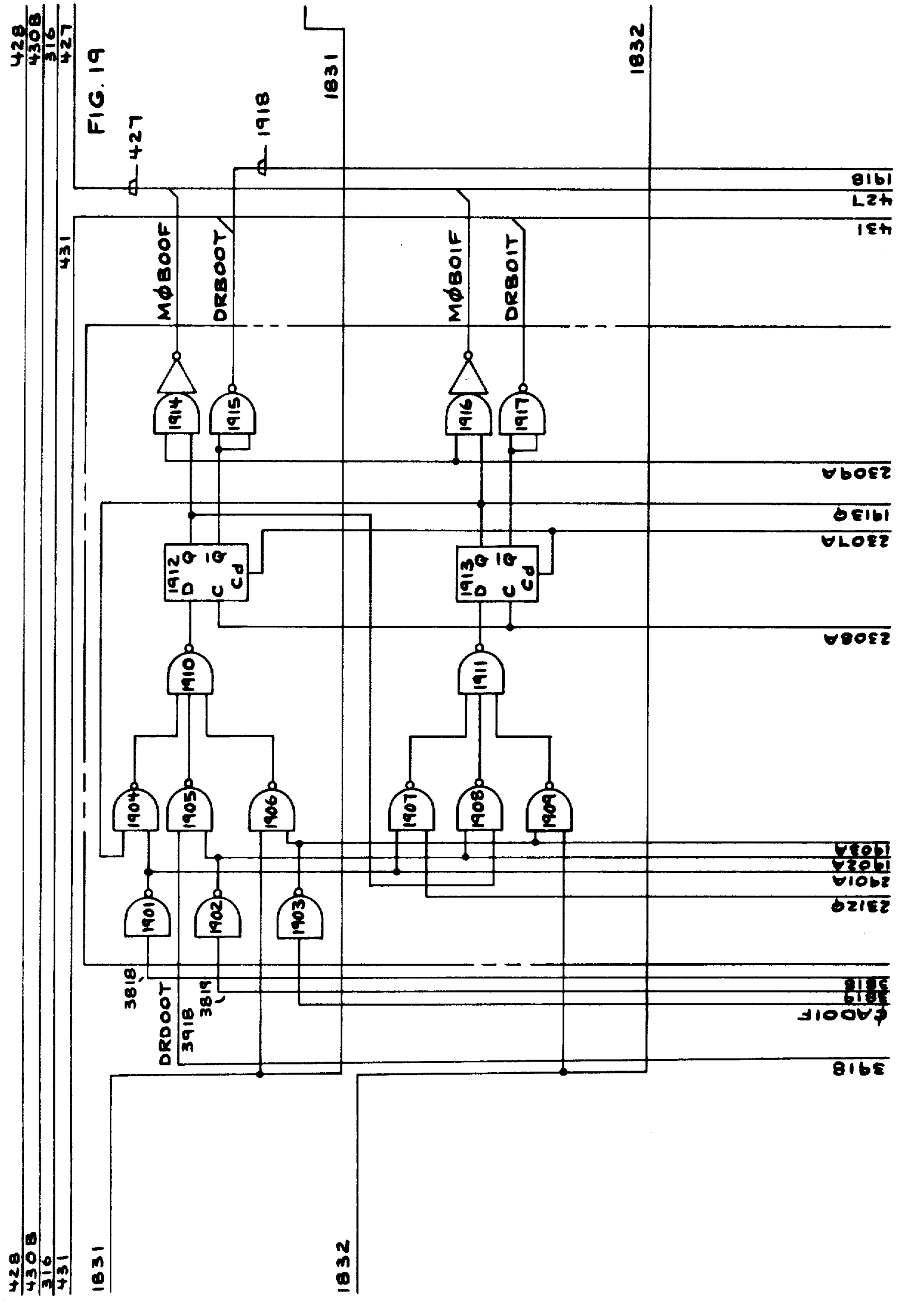
Figure 22:
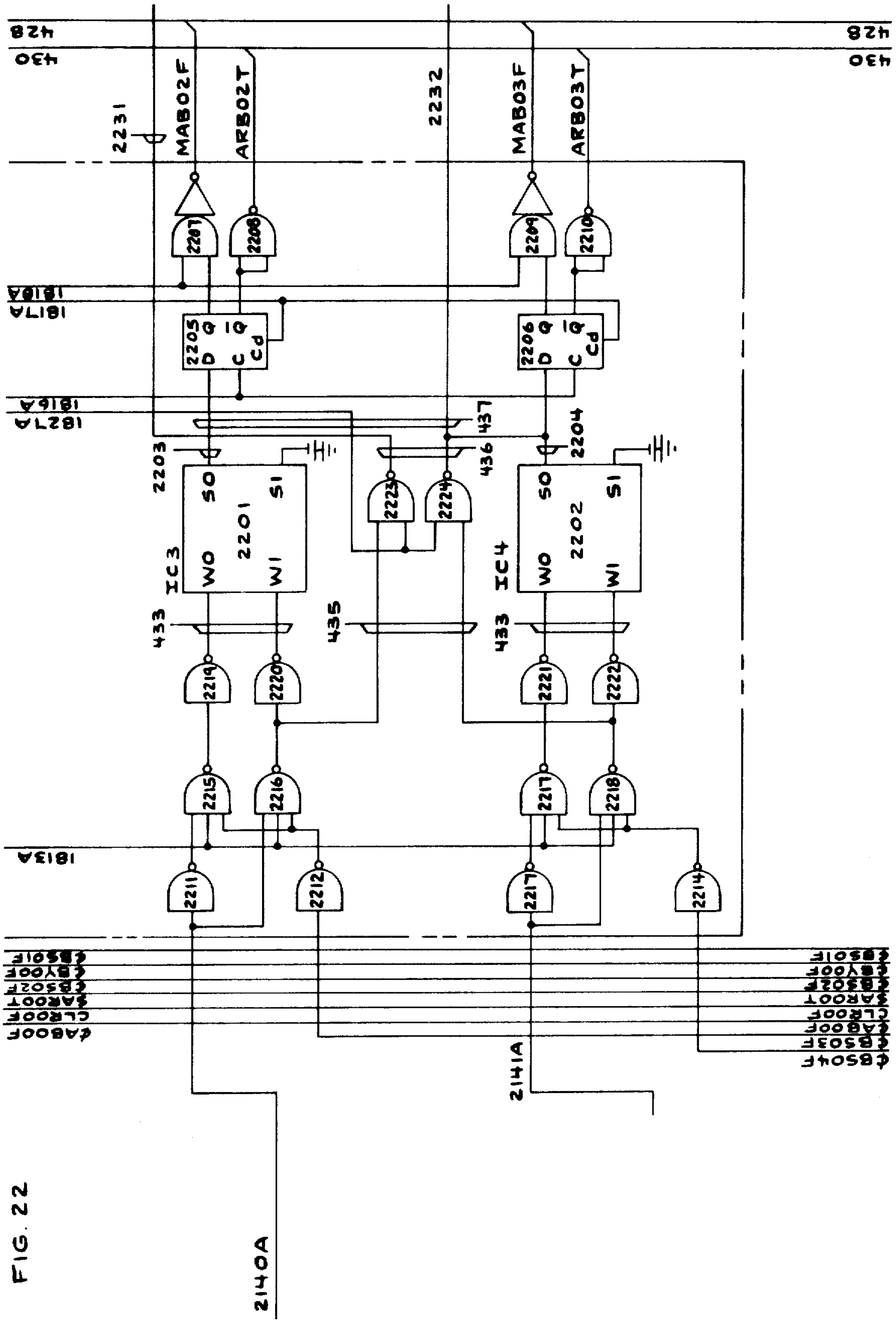
Figure 23:
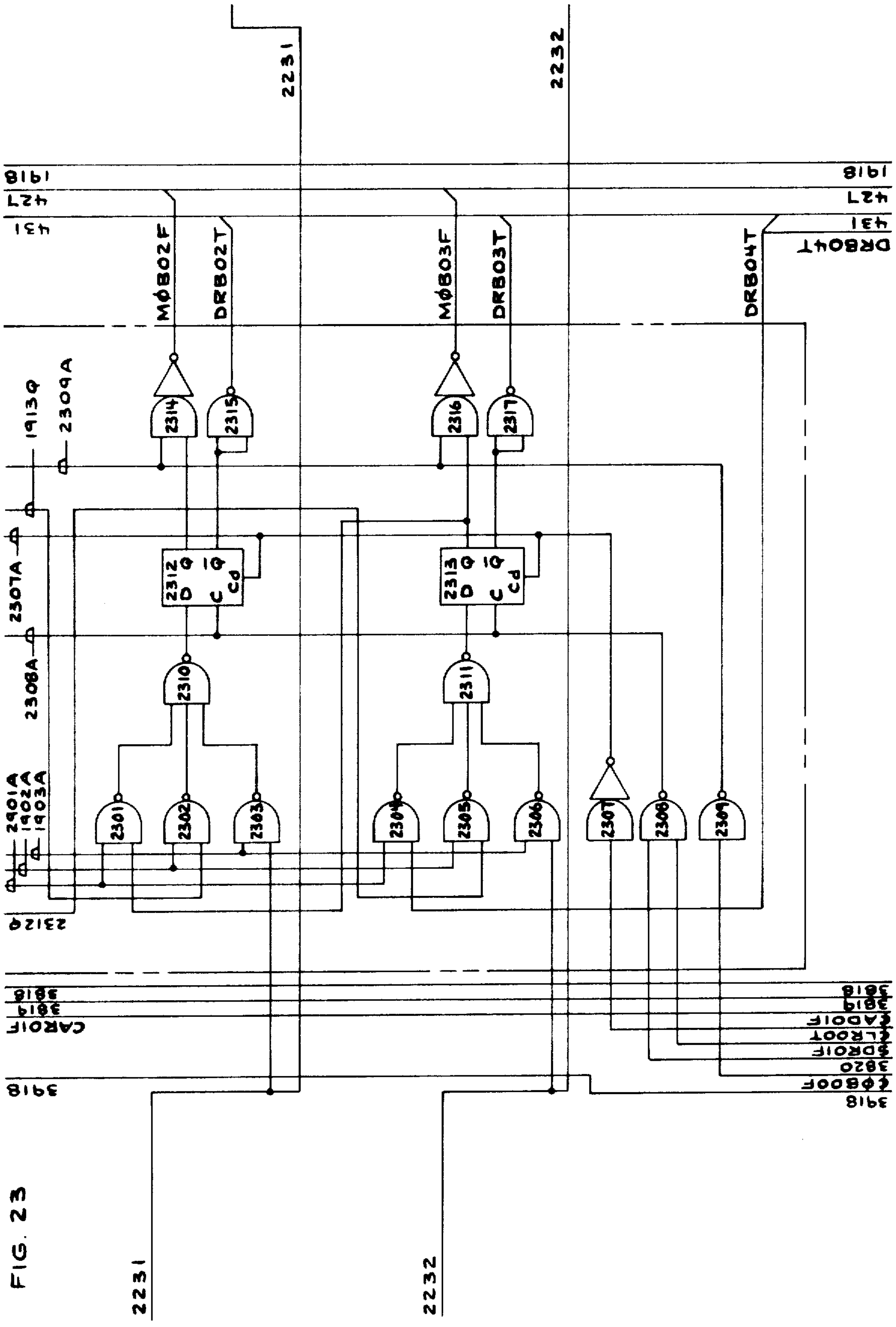
Figure 24:
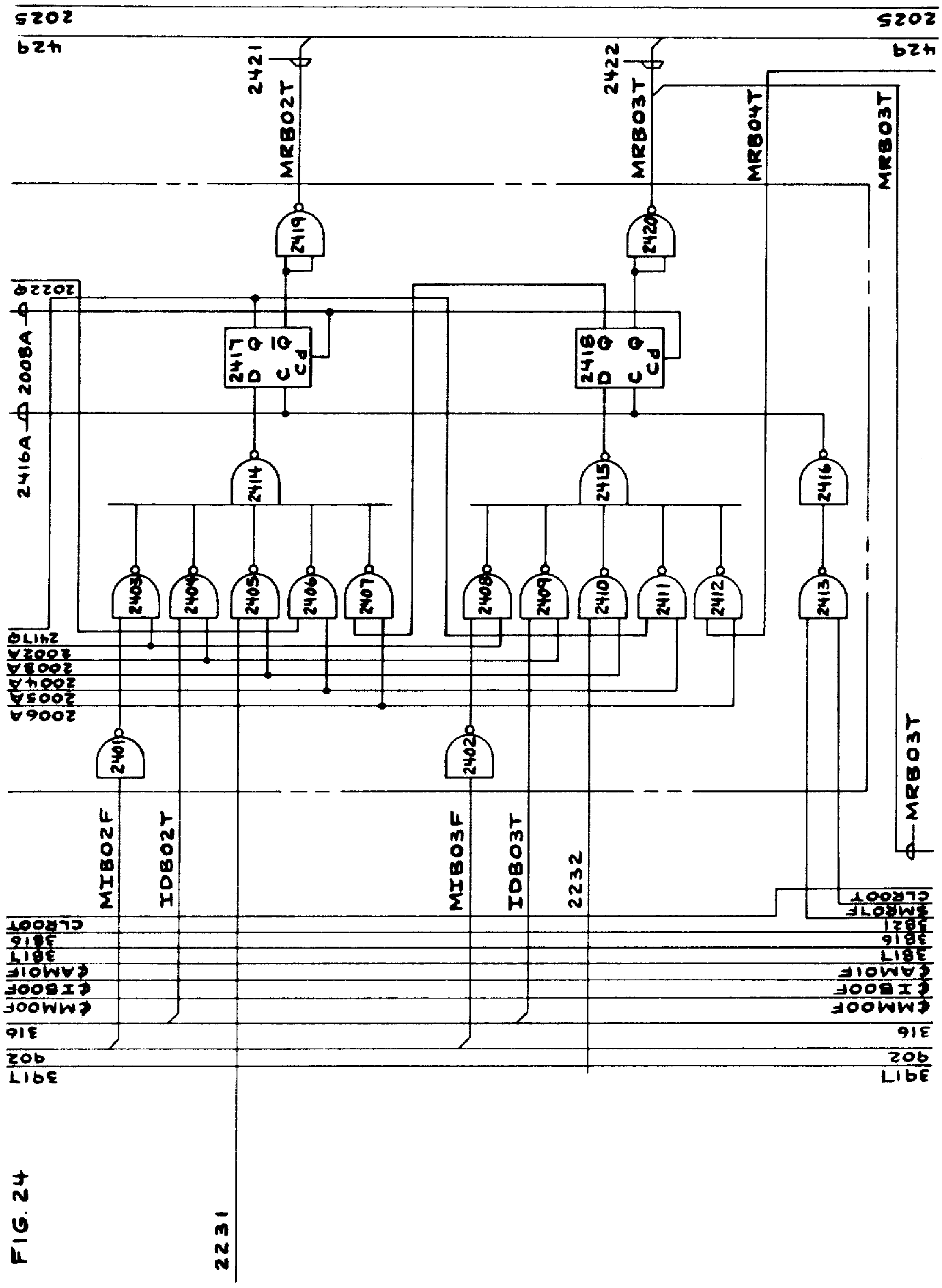
Figure 25:
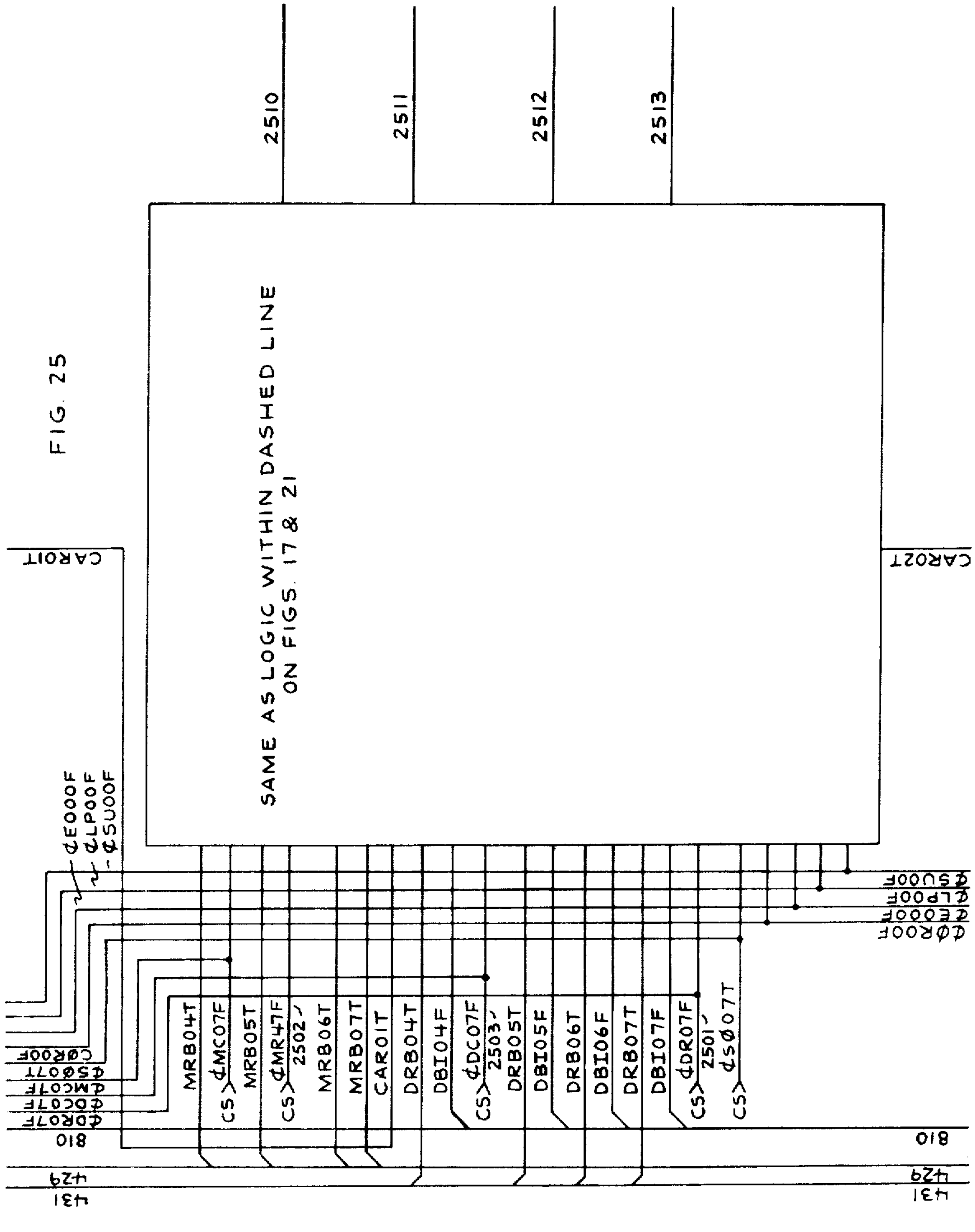
Figure 26:
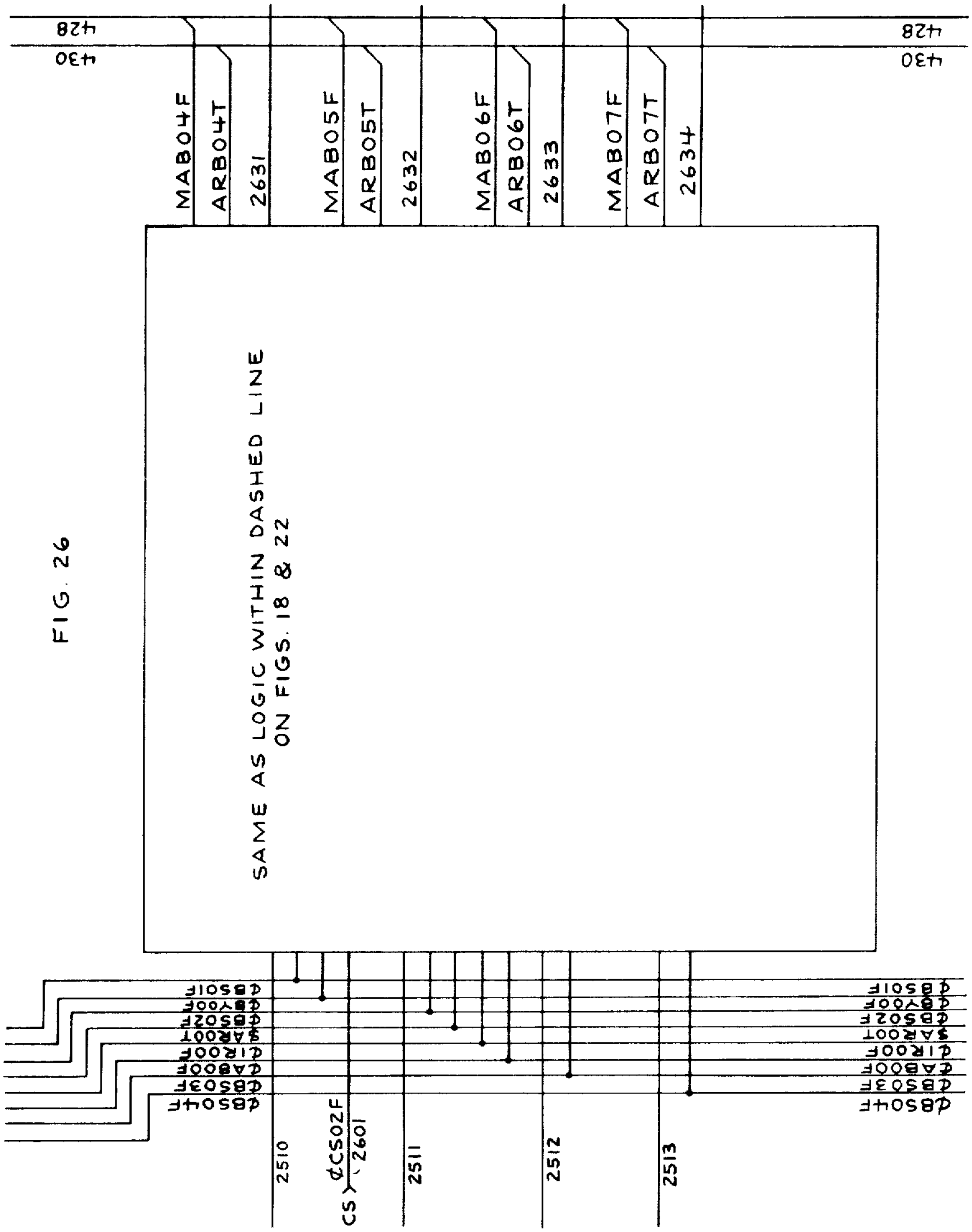
Figure 27:
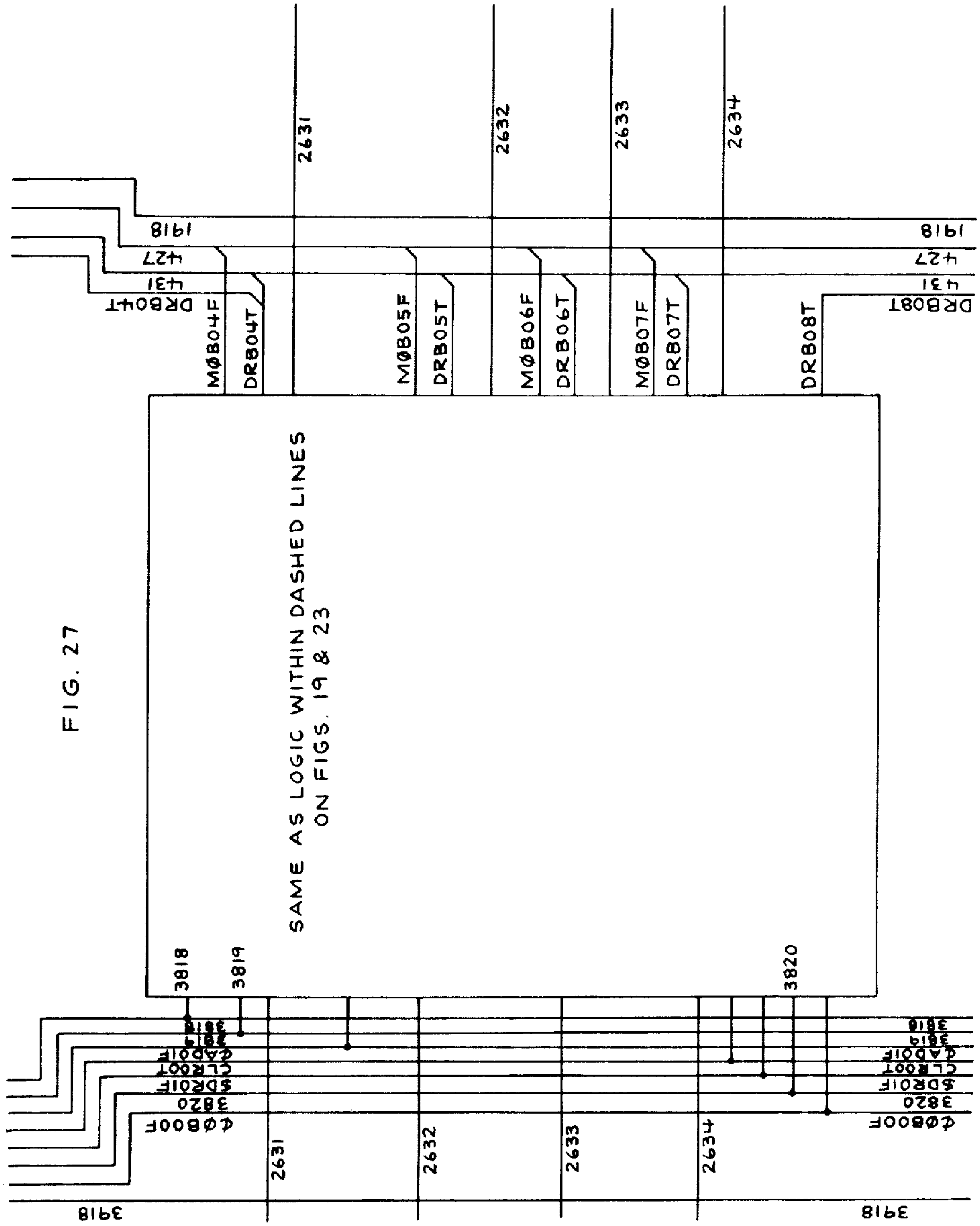
Figure 28:
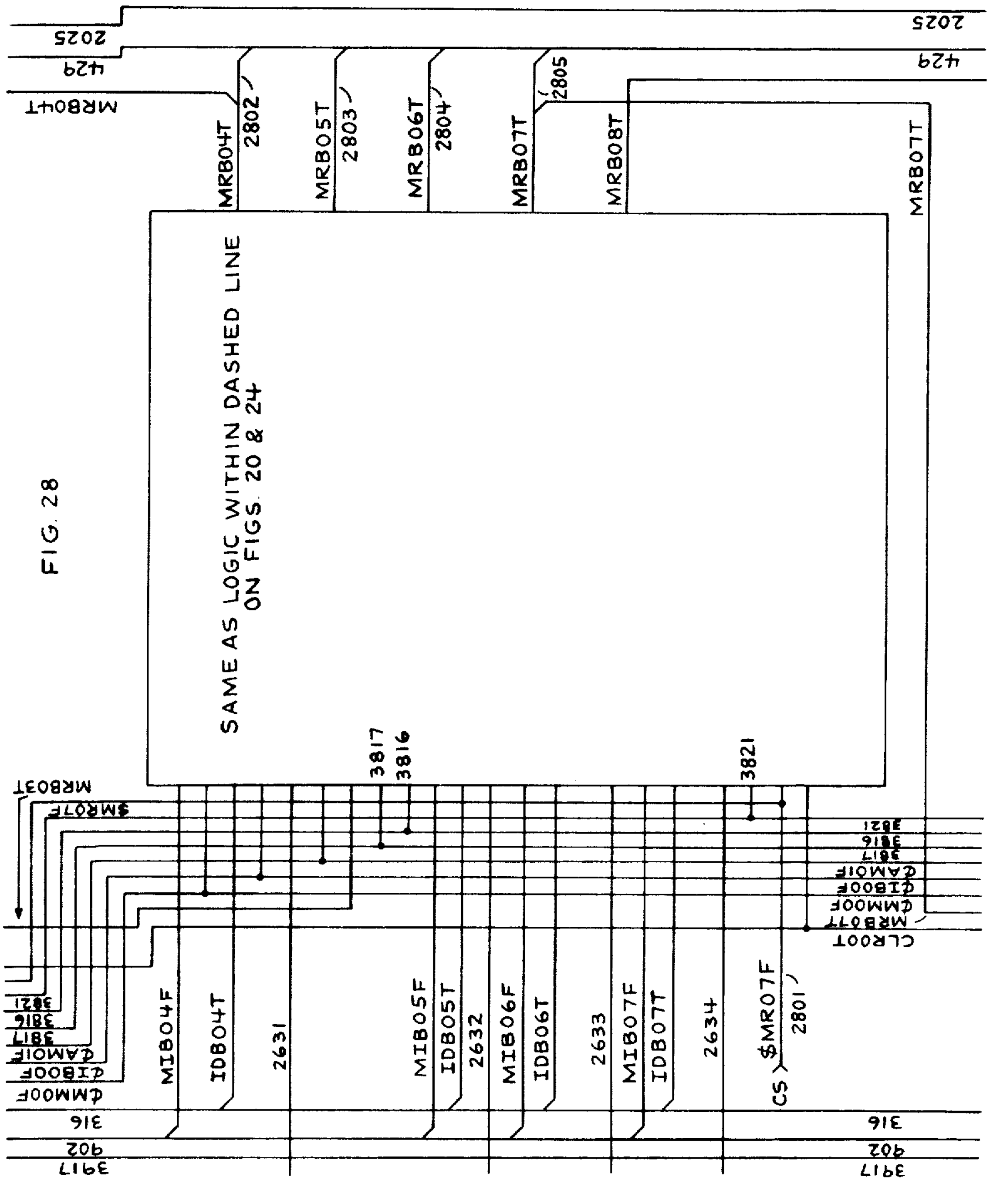
Figure 30:
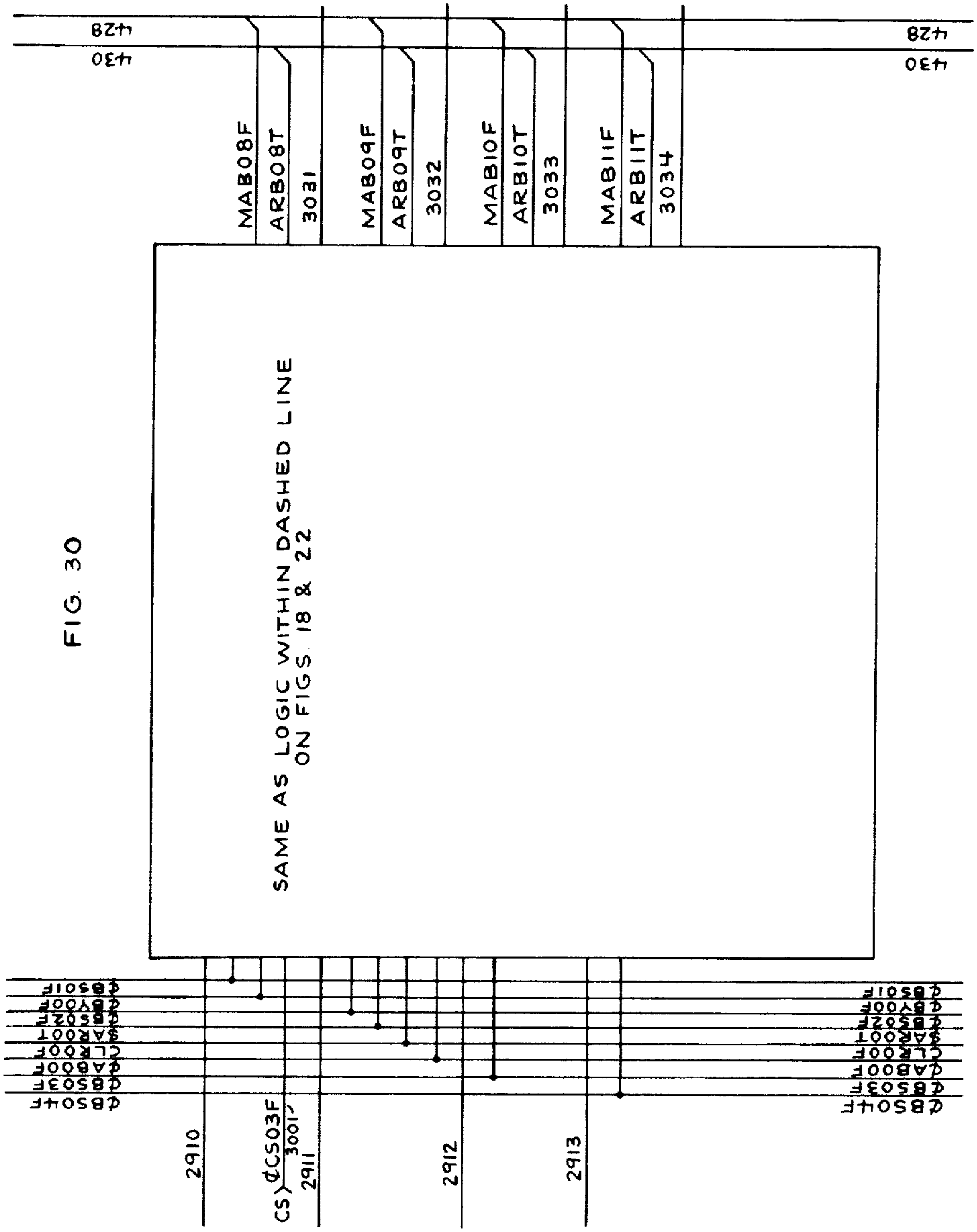
Figure 31:
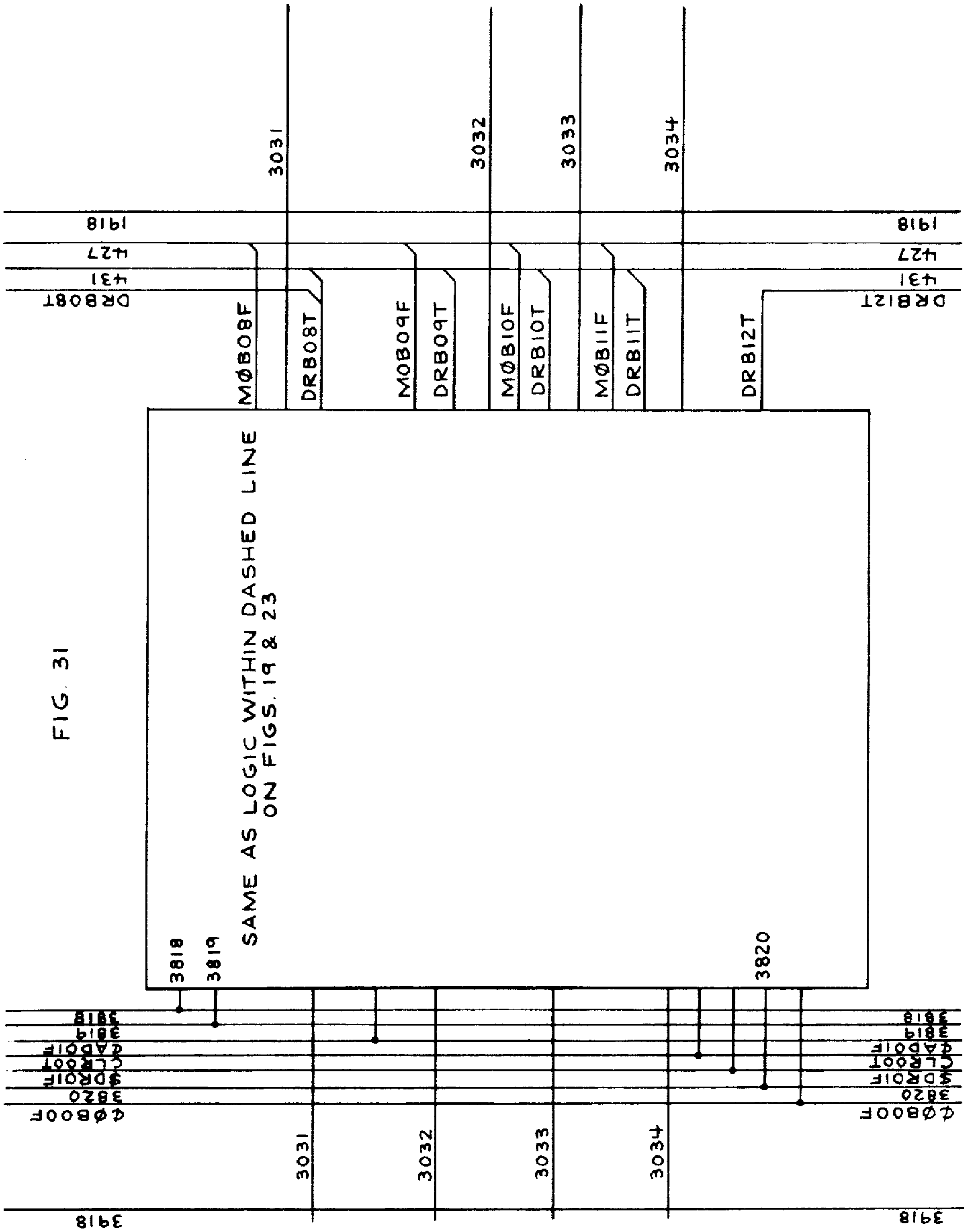
Figure 32:
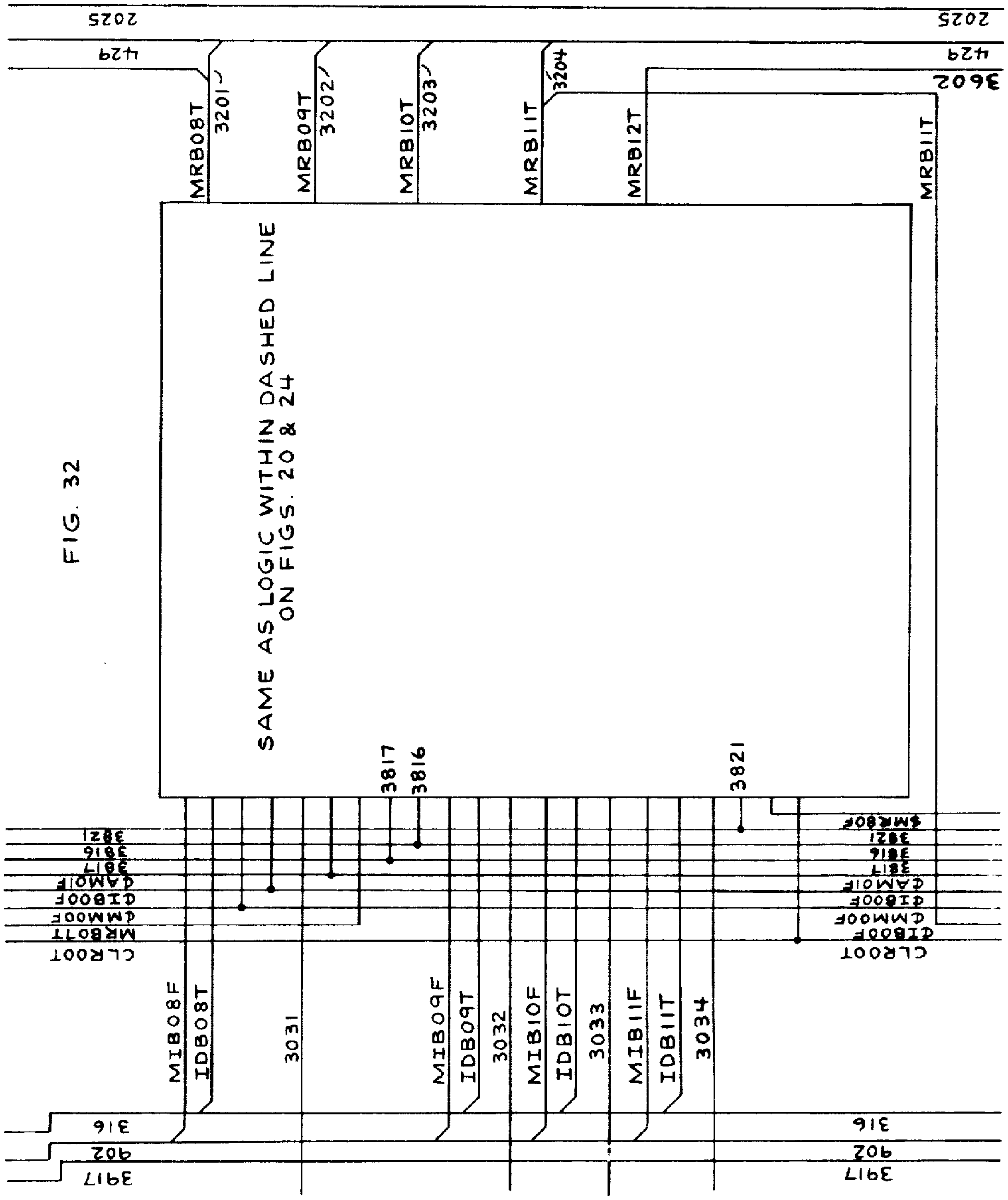
Figure 34:
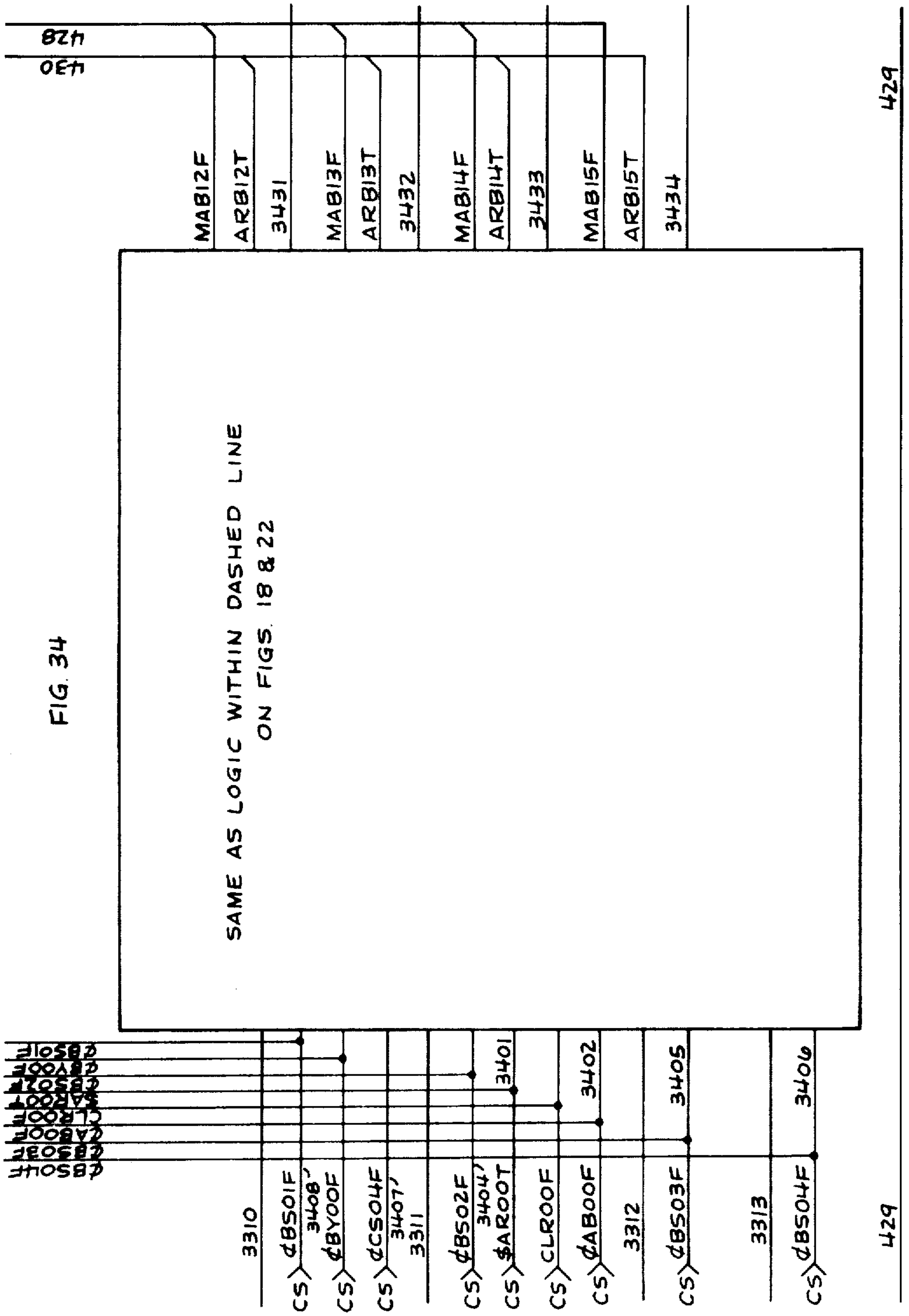
Figure 35:
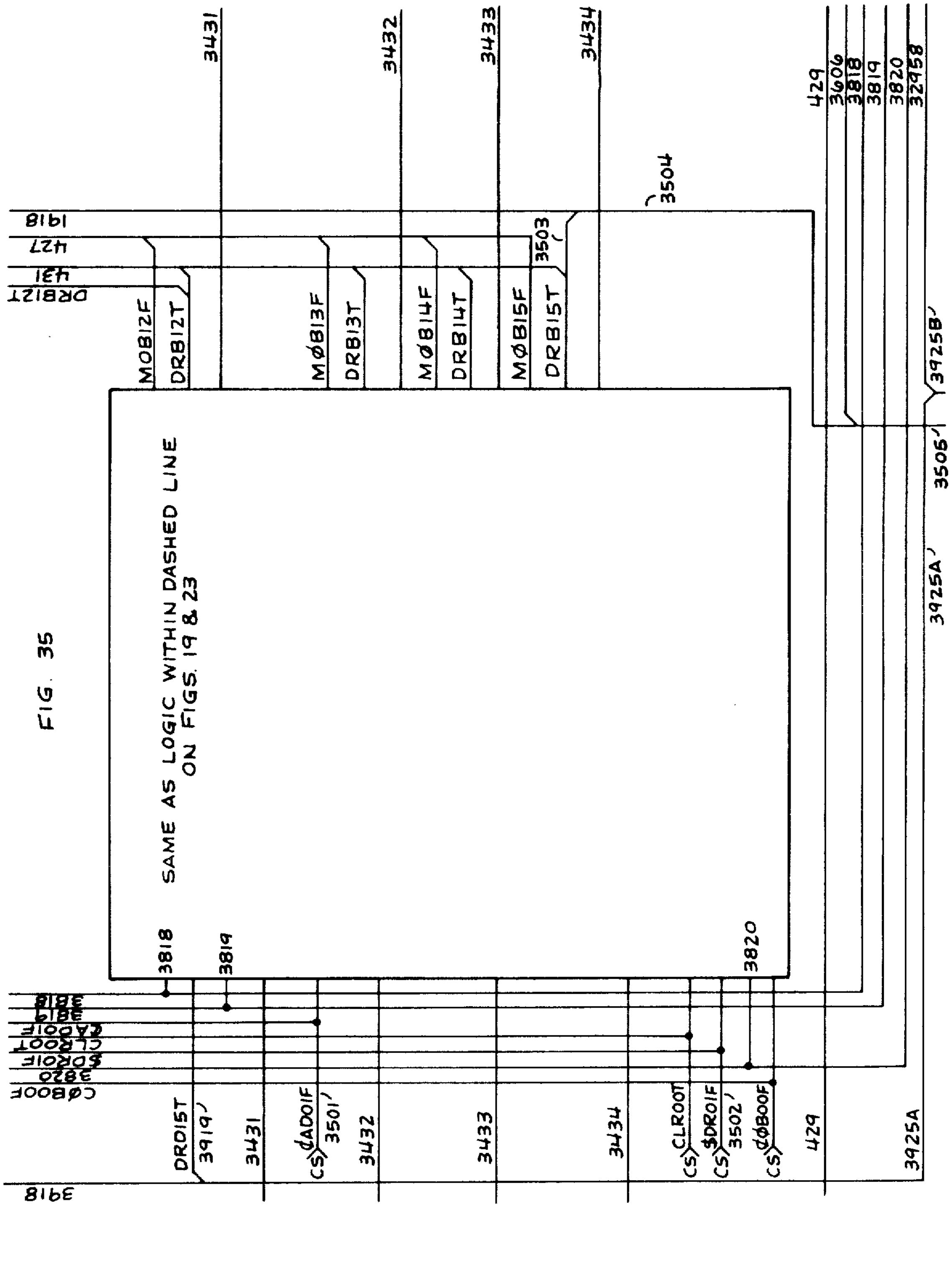
Figure 36:
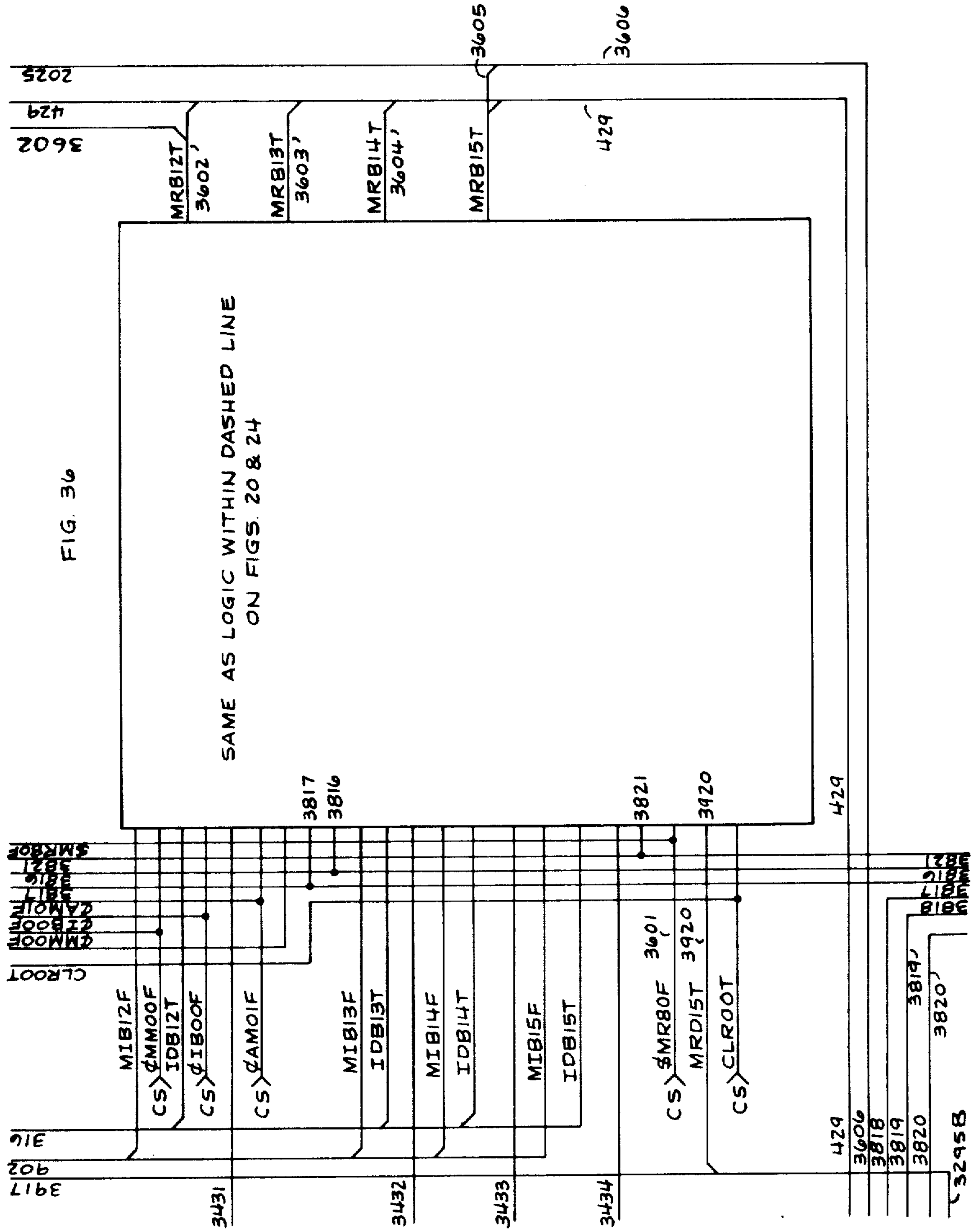
Figure 37:
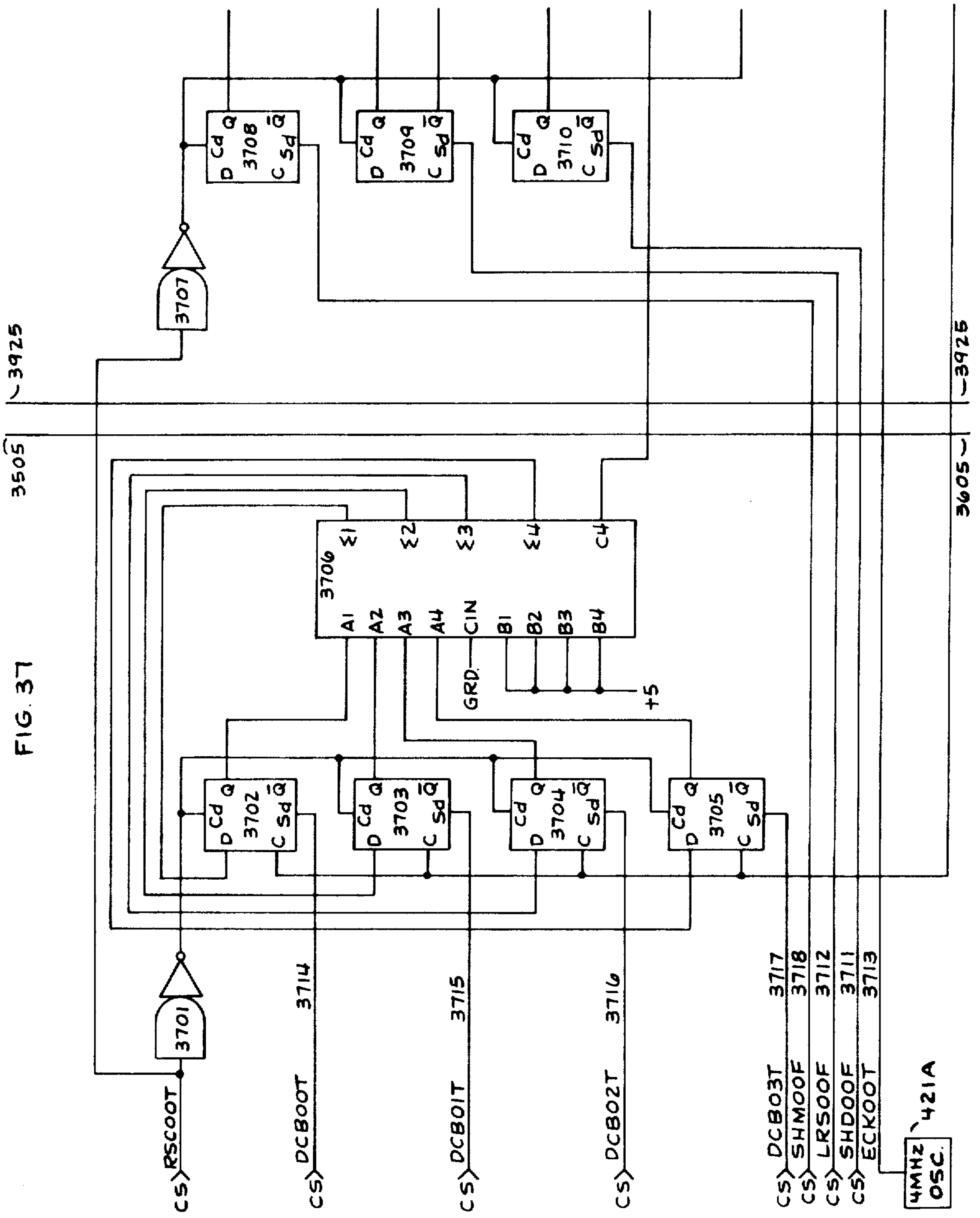
Figure 38:
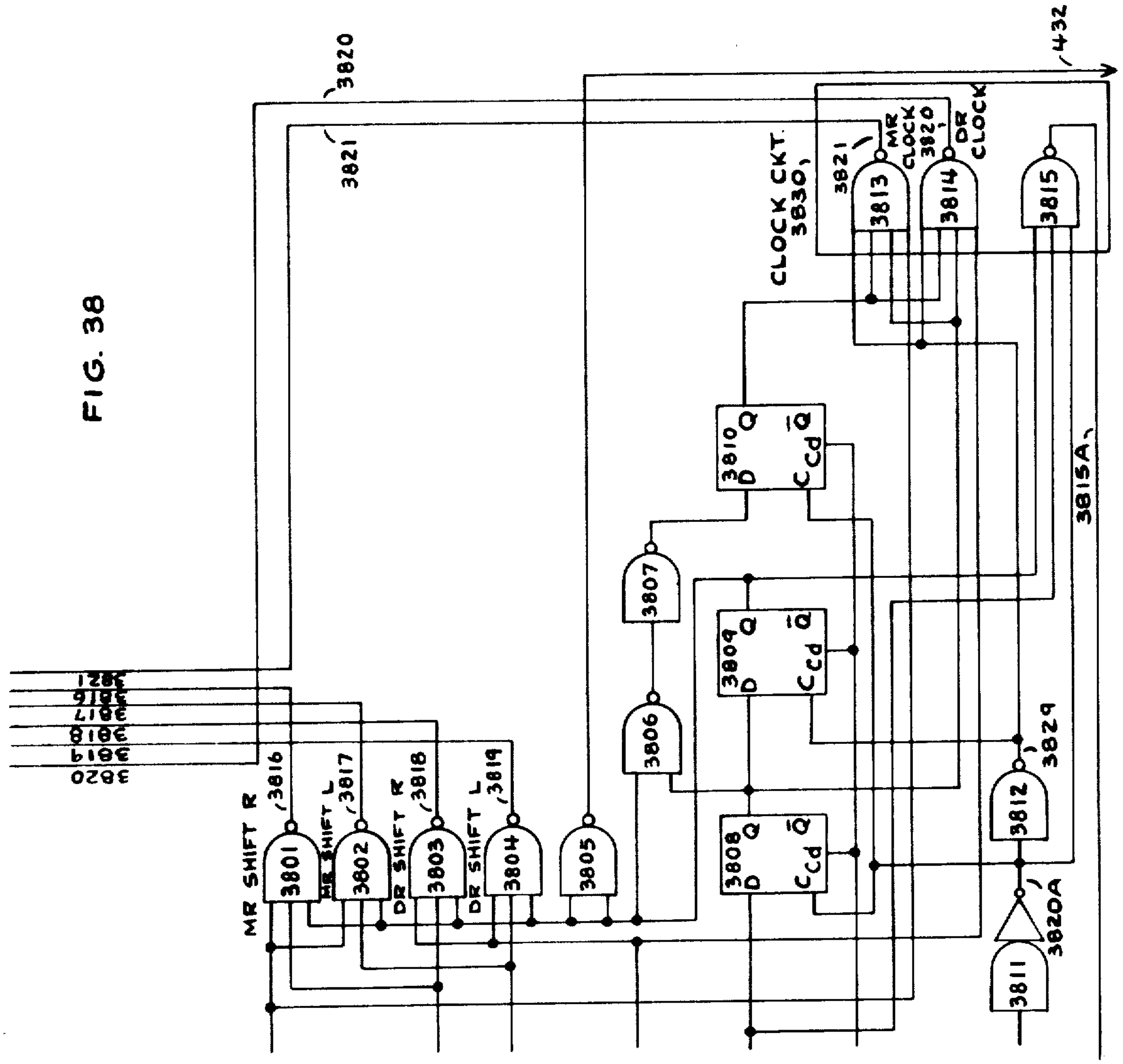
Figure 39:
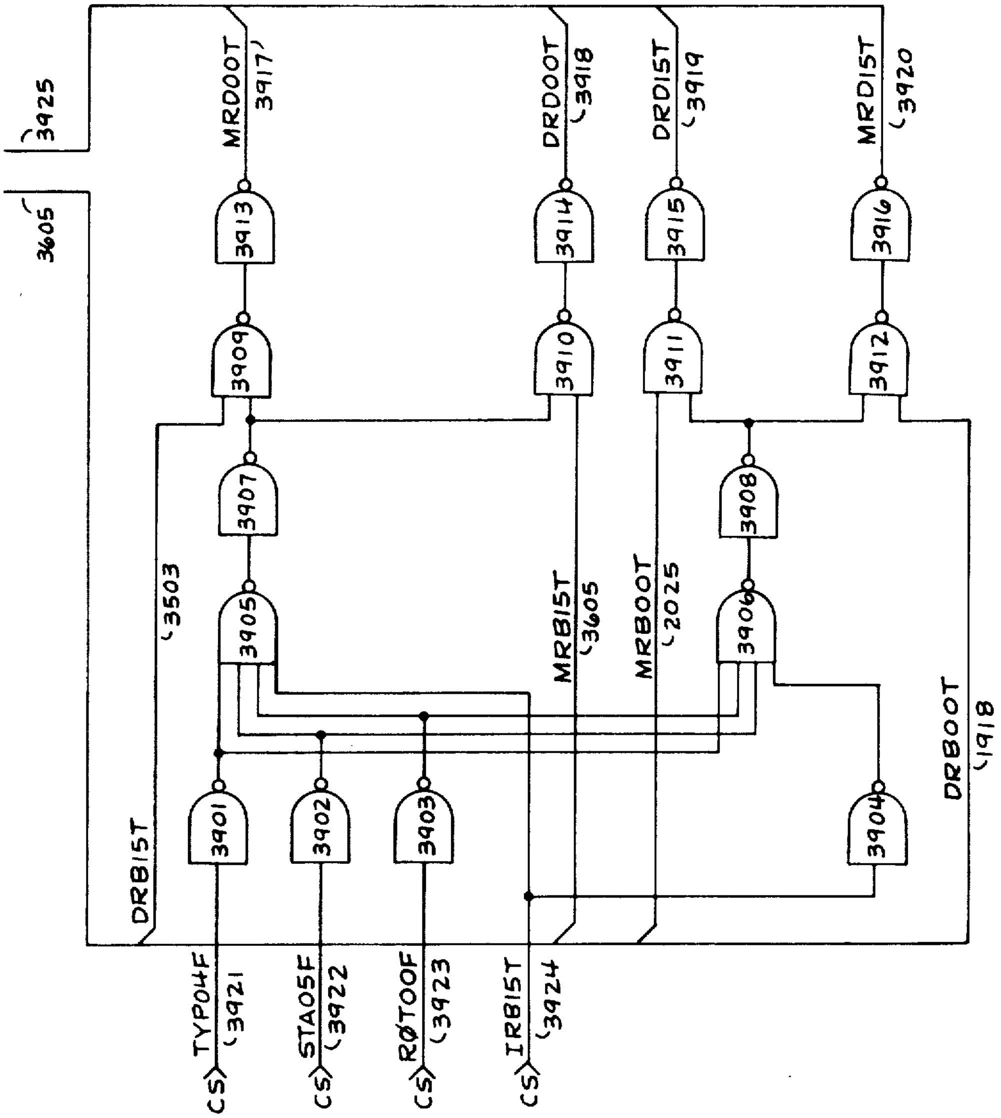

The Address Register AR (FIG. 1) is composed of flip-flops 1805 and 1806 of FIG. 18 and 2205 and 2206 of FIG. 22 and identical sets of flip-flops in FIGS. 26, 30 and 34. The Data Register DR (FIG. 1) is composed of flip-flops 1912 and 1913 of FIG. 19 and 2312 and 2313 of FIG. 23 and identical sets of flip-flops in FIGS. 27, 31 and 35. The Memory Register MR (FIG. 1) is composed of flip-flops 2021 and 2022 of FIG. 20 and 2417 and 2418 of FIG. 24 and identical sets of flip-flops in FIGS. 28, 32 and 36.

Data can be inputted by the DHU from the MUX, FIG. 3, via the IDB path 316 from the PCU, FIG. 8, via the DBI path 810 and from the SMU, FIG. 5, or PRL, FIG. 6, via the PCU OR gates 901 and the MIB path 902.

Data is inputted from the DHU to the MUX via the DRB path 431 and the ARB path 430 to the SMU via the MAB path 428 and the MOB path 427 to the PRL via the ARB path 430 and to the PCU via the path 432.

In addition, the output of the Memory Register MR is tied back to the input of the Arithmetic and Logic Unit 404 over path 429; as is also the output of the Data Register DR over path 431. This arrangement provides an internal input-output loop.

The Shift Control 421 provides capability for shifting any Array Register 405–420 either right or left, and rotating any Array Register 405–420 with the A Register 406 either left or right.

Detailed Description of DHU

Within the DHU, a 16-bit word is handled as four simultaneous 4-bit groups called characters. Each character is independent of the other three and the interconnection of the characters with the PCU determines the functional ability of the DHU. The extent of the software instructions will, then, determine how the DTU is to be interconnected.

Figure 10:
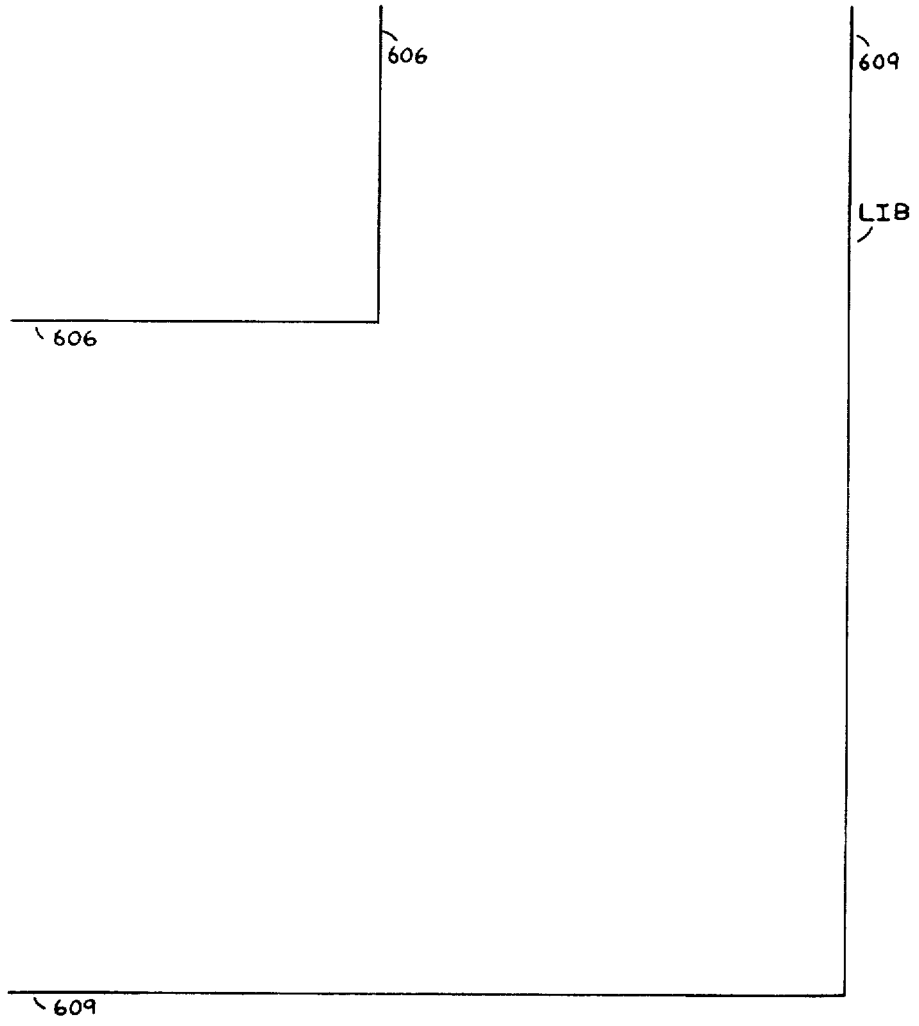

To see how this is facilitated, the mode of use of the DHU in conjunction with the PCU of FIGS. 8, 9, and 10 (i.e., the PCU of processor APZ–142) is now described.

Since addressing one of the Array Registers 405–420 is the most often occurring process in the DHU, such operating mode is first set forth.

Addressing

Figure 47:
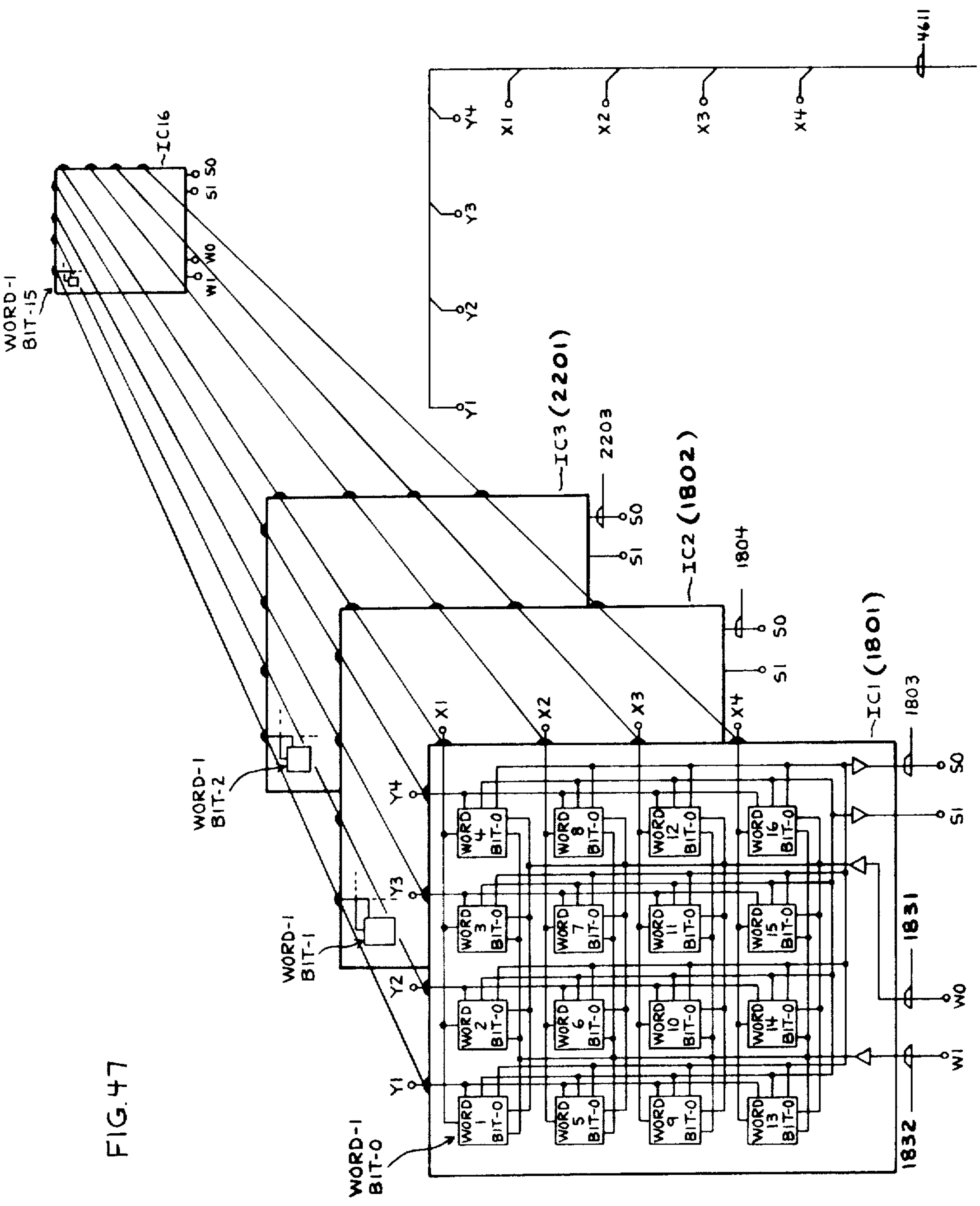
Figure 48:
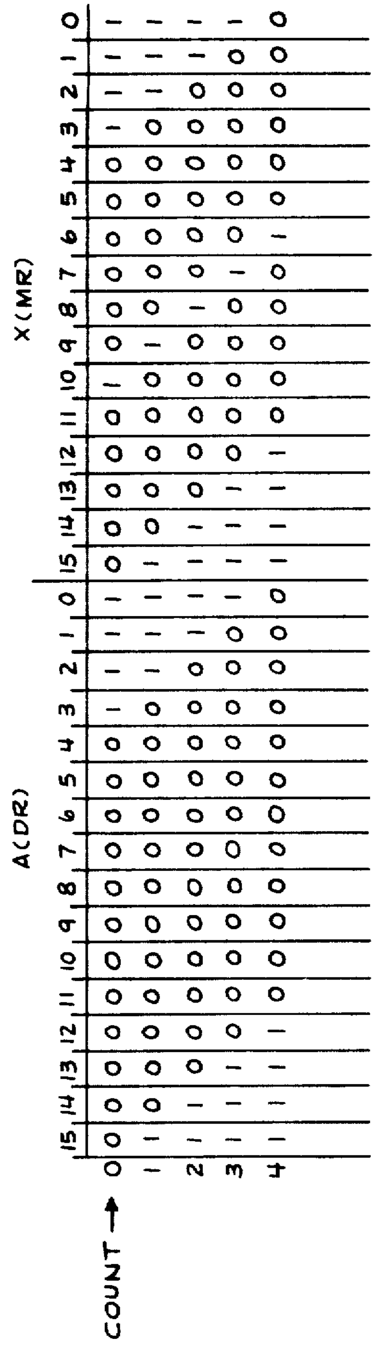
FIG. 48 is a chart of bit representation during rotation in the data handling unit.

The Memory Array Registers 405–420 of FIG. 4 are made up of integrated circuits, the organization and addressing of which is illustrated in FIGS. 47 and 48. Referring to FIGS. 47 and 48, we find 16 integrated circuits IC1–IC16, all of which are the same. Each integrated circuit is North Electric Company part number 558886 and can be found in ITT 1970 catalog designated Product Guide Vol. I Integrated Circuits as part MIC5033. Referring to IC1, 16 areas thereon are designated Word 1-Bit 0 to Word 16-Bit 0 as shown. The corresponding areas on IC2 are designated Word 1-Bit 1 to Word 16-Bit 1. The corresponding areas on IC3 are designated Word 1-Bit 2 to Word 16-Bit 2. Similarly for IC4–IC16.

The relationship of these 16 words shown in FIG. 47 to the 16 registers shown in FIG. 4 is as follows:

| FIG. 47 | FIG. 4 |
|---|---|
| Word 1 | Register W |
| Word 2 | Register A |
| Word 3 | Register Q |
| Word 4 | Register X |
| Word 5 | Register I |
| Word 6 | Register BG |
| Word 7 | Register BH |
| Word 8 | Register R |
| Word 9 | Register S |
| Word 10 | Register T |
| Word 11 | Register U |
| Word 12 | Register V |
| Word 13 | Register JR |
| Word 14 | Register PC |
| Word 15 | Register IA |
| Word 16 | Register WR |

The addressing of these registers is indicated in FIG. 4 as being done by CS signals over path 4611. Referring to FIG. 47, we find leads X1–X4 and Y1–Y4 emerging from path 4611. It is to be understood that these leads connect to terminals X1–X4 and Y1–Y4 multiplied to all 16 integrated circuits. Accordingly Word 1 will be addressed when lead X1 and Y1 both have high signals thereon, Word 2 when lead X1 and Y2 both have high signals thereon, etc., with word 16 being addressed when lead X4 and Y4 both have high signals thereon.

Figure 46:
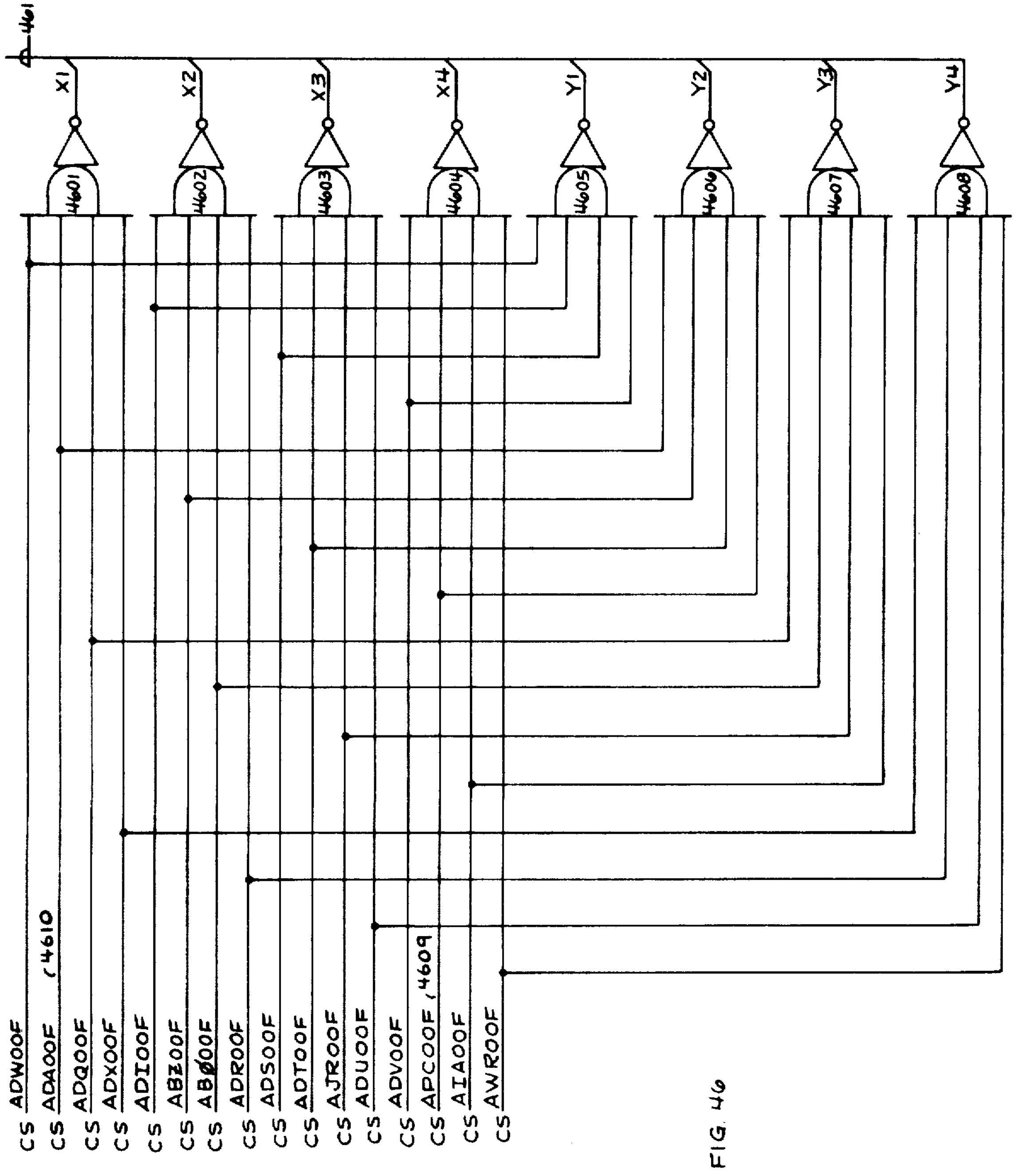
FIGS. 46 and 47 provide an illustration of the 16-register-array in the data handling unit and the addressing thereof.

Referring to FIG. 46 which represents circuitry in Control Logic 801, the leads X1–X4 and Y1–Y4 feeding into path 4611 are energized as follows. Sixteen control leads ADWOOF—AWROOF, corresponding respectively with the 16 registers W–WR of FIG. 4, are connected to gates 4601–4608 as shown. When signal lead ADWOOF goes low (i.e., logic 0), the output of gate 4601 will be low (logic 0) whereby the output of the inverting amplifier associated therewith will be high (i.e., logic 1), placing a high on address lead X1. Similarly the low on signal lead AWDOOF results in a high on address lead Y1. Accordingly, Word 1 (Register W) will be addressed.

When signal lead ADAOOF goes low, gates 4601 and 4606 will cause address leads X1 and Y1 to have highs thereon, addressing Word 2 (Register A). Similarly for addressing of the remaining memory array registers.

Referring now to FIGS. 18, 22, 26, 30, and 34, IC1 of FIG. 47 is 1801 of FIG. 18; IC2 is 1802; IC3 is 2201; IC4 is 2202; etc.; the addressing of these ICs being illustrated in FIGS. 46 and 47 but not in FIGS. 18, 22, 26, 30, and 34.

Writing

Referring now to FIG. 4, path 433 is a means of writing 1's or 0's in the various cells 0–15 of the various registers and path 434 is a means of sensing 1's and 0's in the various cells 0–15 of the various registers.

Referring now to FIG. 47, path 433 of FIG. 4 includes write "1" lead labeled W1 and write "0" lead labeled W0 for IC1; and similar leads W1 and W0 individually for each of the other ICs, IC2–IC16.

Sensing

Also referring to FIG. 47, path 434 of FIG. 4 includes sense "1" lead labeled S0 and sense "0" lead labeled S0 for IC1; and similar leads S1 and S0 individually for each of the other ICs, IC2–IC16.

In FIG. 18 for IC1 the W1 lead is 1832, the W2 lead 1831, and the S0 lead 1803. The S0 lead for IC2 is labeled 1804.

It is first assumed that it is desired to read out the contents of the PC (Program Counter) Register 418. The PCU first causes the lead APCOOF 4609 (FIG. 46) to go low which, in turn, causes the outputs of gates 4604 and 4606 to go high. This causes storage cell 14 on IC1 through IC16 of FIG. 47 to be addressed with the result that the content of cell 14 in IC1 will be placed on lead 1803 of FIG. 47, the content of cell 14 in IC2 will be placed on lead 1804 of FIG. 47 and so on for all 16 ICs. It is now evident that each IC in FIG. 47 contains 1 bit from each of the 16 words.

To write into a storage cell, the above procedure is repeated to address the cell; then line 1832 is made high if it is desired to write a "1" or line 1831 is made high if it is desired to write a "0." The corresponding write lines are used to write a "1" or "0" in each of the 15 remaining cells.

Retrieving Instruction From SMU

To see how the DHU facilitates the handling of a 16-bit word, let us assume that an instruction has just been completed and the State Counter 802 has been reset to State 1 so that the system is now ready to retrieve the next instruction from the SMU. It should be noted here that only those functions directly connected with the DHU will be mentioned.

The first step is to address the PC Register 418 and read out the contents which correspond to the address of the next instruction word stored in the SMU. Because of the identical nature of the four characters of the word, only the description relative to the first character will be detailed unless otherwise specified, the description relative to the other three characters of the word being deducible therefrom. It can be assumed that similar or identical operations occur simultaneously in each of the three remaining characters.

Next, the $AROOT lead 3401 is pulsed. It should be understood that leads such as $AROOT which have a designation CS are from the Control Logic 801 of Processor Control Unit 103, the designation CS meaning "Control Signal." This pulse is inverted by gate 1816 and is applied to the clock leads of flip-flops 1805, 1806, 2205 and 2206. As a result, these address register AR flip-flops store the contents of the PC Register 418 which is presented to them via leads 1803, 1804, 2203 and 2204 respectively. At the same time, the ¢ ADO1F lead 3501 goes to a low which is inverted by gate 1903. The high output of gate 1903 enables gates 1906, 1909, 2303 and 2306 to pass on the data from leads 1803, 1804, 2203 and 2204 respectively. This data, which is inverted by gates 1906, 1909, 2303 and 2306, is passed through gates 1910, 1911, 2310 and 2311 respectively where it is again inverted and applied to the inputs of data register DR flip-flops 1912, 1913, 2312, and 2313 respectively.

Now, the $DRO1F lead 3502 is pulsed. This pulse is inverted at gate 2308 and in turn clocks the flip-flops 1912, 1913, 2312 and 2313 causing them to store the data present at the outputs of gates 1910, 1911, 2310 and 2311 respectively.

At this time, both the AR Register of 401 and the DR Register of 402 contain the same data; that is, the contents of the PC Register 418.

Next, the ¢ABOOF lead 3402 goes low, which causes the output of gate 1818 to go high. This high output enables gates 1807, 1809, 2207 and 2209 to invert the data contained in the AR Register of 401 and pass it on to the SMU via path 428. The SMU, however, cannot act on this data until the proper command is given.

At the same time that this occurs, the PCU places a high on the ¢CIOOT lead 1738 which appears as a carry 1 at the input of the 4-bit binary full adder 1723. The ¢DRO7F lead 2501, ¢DR8OF lead 3301, and ¢SUOOF lead 3302 all go low. The low on the ¢DRO7F lead 2501 is inverted by gate 2106. The high output of gate 2106 enables gates 2107, 2109, 2111 and 2113 to pass the data from the DR Register 402 through the inverters 1915, 1917, 2315 and 2317 and path 431 through the inverters 2101, 2103, 2104 and 2105, gates 2107, 2109, 2111, 2113, 2120, 2121, 2122, and 2123 via leads 2120A, 2121A, 2122A, and 2123A to the B1, B2, B3, and B4 inputs of the adder 1723. The adder 1723 now adds the input data on leads A1 through A4 to the input data on leads B1 through B4. However, in this case the data on leads A1 through A4 are zero, with the result that the sum is merely the data present on leads B1 through B4. To this sum is added the 1 from the input lead 1738. In effect, what is now present at the Σ1 through Σ4 and C4 outputs of the 1723 adder is the previous contents of the PC Register 418 plus 1. In this manner the program count is incremented. The low on the ¢SUOFF lead 3302 becomes a high at the output of the Inverter 2119 to enable gates 1729, 1735, 2133 and 2139. These gates enable the sum data to be passed through gates 1736, 1737, 2140 and 2141. By this time, however, the APCOOF lead 4609 has returned to a high to disable the PC Register 418. No further action is possible at this time with the data at the outputs of gates 1736, 1737, 2140 and 2141.

Next, the PCU sends a read-restore command to the SMU. This command causes the SMU to accept the data present on the MAB path 428 and to read out the data stored at the address specified by the MAB data. The SMU outputs this data word to the OR gates 901 and via the MIB path 902 to the inputs of the MR Register of 403.

At this point the leads APCOOF 4609; ¢BSO1F 3403; ¢BSO2F3404; ¢B303F 3405; ¢BSO4F 3406;¢CSO1F 1830; ¢CSO2F 2601; ¢CSO3F 3001; and ¢CSO4F 3407; all go low. The lead APCOOF 4609 addresses the PC Register as before. The low on ¢CSO1F lead 1830 becomes a high at the output of the inverter 1813. The high output provides part of the enable signals for gates 1819, 1820, 1821, 1822, 2215, 2216, 2217 and 2218. Gates 1819 and 1820 are now fully enabled by the high output of inverter 1812 whose low input is supplied from the ¢BSO1F 3403 lead. In the same manner, the line ¢BSO2F 3404 enables the gates 1821 and 1822, the line ¢BSO3F 3405 enables the gates 2215 and 2216 and the line ¢BSO4F 3406 enables the gates 2217 and 2218.

Assume, now, that the datum bit at the output of gate 1736 is a "0." This low over path 1736A becomes a high at the output of inverter 1811 and at the output of gate 1820. The high at the output of 1811 becomes a low at the output of gate 1819. The outputs of gates 1819 and 1820 are inverted by gates 1823 and 1824 which results in a high at input W0 and a low input at the W1 input of storage element 1801.

The net result of this operation is that a "0" will be written in storage element 1801 at the bit location assigned to the PC Register 418. An identical process will occur for each of the remaining 3 bits of character 1. This same procedure also occurs in the other three characters with the important exceptions that character 2 is enabled by the ¢CSO2F lead 2601, character 3 is enabled by the ¢CSO3F lead 3001, and character 4 is enabled by the ¢CSO4F lead 3407. The exact importance of the separation of the character gating leads will be shown at a later time.

For the sake of clarity, the entire procedure is now summarized. The procedure was first started by addressing the PC Register 418 and strobing the contents of this register into both the AR Register of 401 and the DR Register of 402. The contents of the AR Register were gated out to the SMU where, upon reception of the read command from the PCU, the SMU read out the contents stored at the address specified by the contents of the AR Register. This SMU output was then gated to the input of the MR Register 403 via the OR gates 901 and the MIB path 902. At the same time, the contents of the DR Register were gated into the Arithmetic and Logic Unit 404, and here the word was incremented by one and the sum was finally gated back into the PC Register 418.

In the next step the $MR07F 2801 and $MR80F 3601 leads are pulsed by the PCU. The pulse on lead 2801 is passed through gate 2413 and inverter 2416 and serves to clock the data from the OR Gates 901 to the Instruction Register 805 and via the MIB lines 902 into the Memory Register of 403 which is incidental at this time. The Instruction Register now contains the next instruction and with this, State 1 is complete. The next step is to determine which state should be done next.

Shift Control

Since the state sequence is dependent upon the instruction, let us assume that the instruction contained in the Instruction Memory 805 is SHR 4, A. This instruction means that the contents of the A Register 406 are to be shifted four places to the right. Let us assume, further, that the A Register 406 contains data as shown for Clock 0 in FIG. 45A. The shift instruction also indicates that the next state will be State 5B. The shift command is structured such that the contents of any Array Register 405 to 420 can be shifted by any amount up to 15 positions.

The operation of the DHU for State 5B of the shift instruction is now examined in detail.

The first step is to address the A Register 406. The ADAOOF lead 4610 goes low and the A Register 406 is addressed in the same manner as the PC Register 418 was in State 1.

The next step is to gate the data from the storage cells 1801, 1802, 2201 and 2202 to the DR Register 402 and strobe the data into the DR Register of 402 in the same manner as for State 1.

The PCU now causes the SHDOOF lead 3711 to go low. This low causes the Q output of flip-flop 3710 to go high to enable the Data Register Gates 3803 and 3804.

The LRSOOF lead 3712 now goes low which causes the Q output of flip-flop 3709 to go high which enables gate 3803, providing for a right shift and disables gate 3804, negating a left shift.

It should be noted at this time that the output of the continuously running shift control oscillator 421A, which serves as a clock source, is applied to lead ECKOOT 3713. The shift timing chain, consisting of flip-flops 3808, 3809, and 3810 and gates 3806 and 3807 cannot function, however, until one or more of the count length flip-flops 3702, 3703, 3704, 3705 are set.

The next step is for the PCU to set the DCBO2T lead 3716 to a low. This low causes the Q output of count length flip-flop 3704 to go high. The resulting condition of the full adder 3706 in the down counter arrangement, comprising flip-flops 3702, 3703, 3704, 3705, and integrated circuit full adder 3706 and associated circuitry is shown as Clock No. 0 (i.e., count 0) in FIG. 45B. Such setting results in a down count of 4 (with a different pattern of 1's in positions A1, A2, A3, and A4, the down counter would have been set for a different down count).

Figures 45A, 45B, 45C:
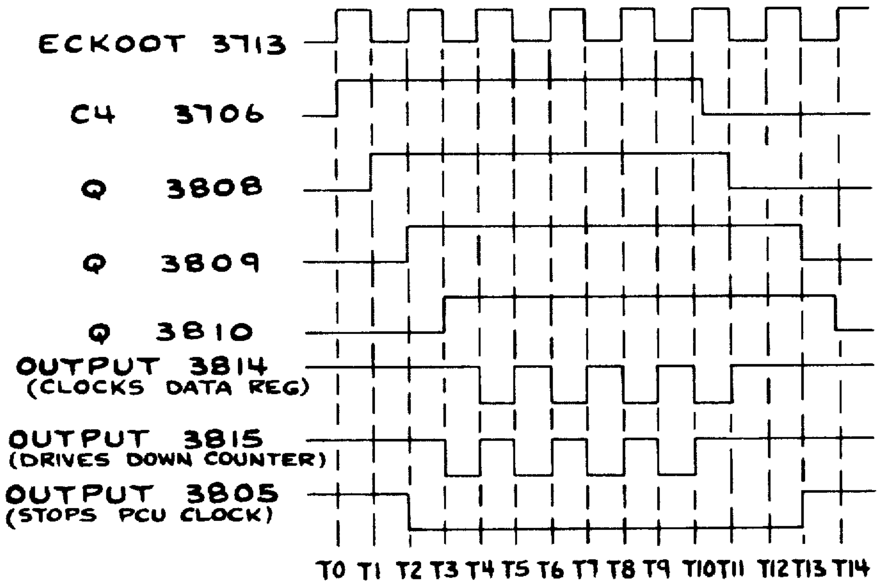
FIG. 45A is a chart of bit representation during shift in the data handling unit.
FIG. 45B is a chart of the adder condition during shift in the data handling unit.
FIG. 45C is a timing sequence chart for a shift timing chain used in the system.

Notice that the C4 lead of the adder 3706 is now a high as shown on count 0 of FIG. 45B. This high provides one enable signal to gate 3815 and also provides a high input to flip-flop 3808. The next time clock lead 3713 goes low at time T1 as illustrated in FIGS. 45C, the output of inverter 3811 goes high and clocks the high on the C4 output of 3706 into the flip-flop 3808 as shown in FIG. 45C. The high at the Q output of flip-flop 3808 provides an enable signal to gates 3806, 3813 and 3814. Digressing briefly, clock circuit 3830 in the shift control circuit 421 is shown to include gates 3813, 3814 and 3815. When such gates are enabled clock pulses on conductors 3828 or 3829 are passed over such gates to their respective outputs. When clock lead 3713 goes high, at time T2 in FIG. 45C, the output of inverter 3812 also goes high which clocks the high Q output of flip-flop 3808 into flip-flop 3809. The high on the Q output of flip-flop 3809 causes the output of gate 3806 to go low which becomes a high output at inverter 3807. The high on the Q output of flip-flop 3809 also causes the output 3818 of gate 3803 to become low which is the conditioning signal to the data register and logic 402 for shifting to the right. The output of flip-flop 3809 also enables gate 3815 to begin passing clock pulses and causes the output of gate 3805 to go low. The low output on gate 3805 signals the PCU over path 432 to stop its clock 804 until the shifting is completed.

On the next clock pulse, T3 in FIG. 45C, the clock lead 3713 again goes low which again causes the output of inverter 3811 to go high and this time clock the high output of inverter 3807 into flip-flop 3810. The high output at Q of flip-flop 3810 enables gate 3814 to begin passing clock pulses over lead 3820 to the Data Register DR of 402. This same high output of inverter 3811 also causes the output of gate 3815 to go low.

When clock lead 3713 next goes high at T4 in FIG. 45C, the output of gate 3815 also goes high and clocks flip-flops 3702, 3703, 3704, and 3705. The resulting condition on the full adder 3706 is shown at count 1 of FIG. 45B. The A1 through A4 inputs to the adder 3706 will have the BCD encoded count present on them from the Q outputs of these flip-flops. As shown in FIG. 45B at count 0, we see that the count length of 4 is displayed on the adder 3706 input leads. After the first clock pulse to the flip-flops 3702, 3703, 3704, and 3705, we can see that the count length has been decremented by one even though the first shift pulse has not yet been sent.

When clock lead 3713 goes low, the output of gate 3814 goes high to supply a clock pulse to the Data Register and Logic 402. Since the output of gate 3803 is low, the inverter 1901 provides the enable signal to gates 1904, 1907, 2301, and 2304. The other input to gate 1904 is the Q output of flip-flop 1913. In addition, the output of gate 1904 is inverted by gate 1910 and applied to the D input of flip-flop 1912. The net result is that before the shift pulse, the output of flip-flop 1913 is applied to the input of flip-flop 1912. After the shift pulse, therefore, flip-flop 1912 will contain the data previously contained in flip-flop 1913. This same procedure is repeated for the other 15 flip-flops with the result that the data contained in the Data Register of 402, has been shifted one place toward the least significant bit position.

Referring to FIG. 45A, we can see that at Clock 0 there were "1's" in bit positions 7, 6, 5, and 4. By reason of the above statements, we also know that this data was present at the inputs of the flip-flops in the next, less significant, bit positions. After the first shift pulse, clock 1 in FIG. 45A, we can see that all data bits are shifted one place toward the least significant bit position.

This procedure will be repeated for the three remaining shift pulses with the resulting data shift shown in FIG. 45A. Notice that in FIG. 45B at count 4, the input leads A1–A4 of adder 3706 are low and that the C4 output of 3706 is also low. This low output on C4 of 3706 disables gate 3815 to prevent further clocking of the flip-flops 3702, 3703, 3704, and 3705. This action occurs at T10 of FIG. 45C.

When clock lead 3713 next goes low, at T11 of FIG. 45C, the flip-flop 3808 Q output goes low which disables gates 3806 and 3814. Disabling gate 3806 removes the high input from flip-flop 3810 and disabling gate 3814 prevents any further shift pulses from being sent.

At T13 of FIG. 45C, the Q output of flip-flop 3909 goes low which causes the output of gate 3805 to go high. The high output of gate 3805 over path 432 restarts the PCU Clock 804 and restores system control to the PCU.

Once the shifting has been completed and the PCU Clock 804 has been restarted, the PCU causes the leads ¢ ØROOF 3303; ¢DRO7F 2501; and ¢DR80F 3301 to go low.

The data contained in the Data Register DR of 402 is inverted by gates 1915, 1917, 2315 and 2317 and sent via the DRB path 431 to the inverters 2101, 2103, 2104 and 2105. The low on lead 2501 becomes a high at the output of the inverter 2106 which enables the data to pass from the outputs of the inverters 2101, 2103, 2104, and 2105 through the gates 2107, 2109, 2111, 2113, 2120, 2121, 2122, and 2123. The low on lead 3303 becomes a high at the output of inverter 2116 which enables gates 1724, 1725, 1730, 1731, 2128, 2129, 2134, and 2135. These gates cause the outputs of gates 1715, 1716, 1717, and 1718 to be OR'ed with the outputs of gates 2120, 2121, 2122, and 2123. However, gates 1707 through 1714 are disabled, causing the outputs of gates 1715, 1716, 1717, and 1718 to be low. This means that the data at the outputs of gates 1736, 1737, 2140 and 2141 will be the same as the contents of the Data Register DR of 402. From this point, the data is stored in the Array Registers 1801, 1802, 2201, and 2202 in the same manner as in State 1.

The length of the shift is determined by the binary number present on leads DCBOOT 3714, DCB01T 3715, DCBO2T 3716, and DCB03T 3717. The DCBOOT 3714 lead contains the least significant bit and the lead DCB03T 3717 contains the most significant bit.

The two above functional descriptions can be performed by the DHU when it is used with either the processor control equipment disclosed herein which is identified, and commercially available, as APZ-142, manufactured by North Electric Company, Galion, Ohio, assignee of the present invention or with other known processors, one of which is referred to as APZ-130 for purposes of convenience. In the APZ-130 PCU there are several commands which are not used in the APZ-142 PCU. By way of example, in the APZ-130 PCU the data word from memory can be dealt with on a 1-bit, 2-bit, 4-bit, 8-bit or 16-bit basis while the APZ-142 PCU deals with this data word on a 1-bit or 16-bit basis only.

Versatility

The versatility of the DHU is now shown by demonstrating its ability to handle the instructions of other processors such as the APZ-130 (which has additional commands) with no hardware modifications in the DHU. As will be shown, only the interconnections between the segments of the DHU and the instruction capability of the PCU limit the functional ability of the DHU.

It is first assumed that the Memory Register MR of 403 contains a data word which was obtained from the SMU. It is further assumed that character 2, bits 4, 5, 6 and 7 of this word are to be stored in the A Register 406 while leaving the rest of the bits stored in the A Register 406 intact.

Note first that to gate the first character of the Memory Register MR of 403 into the Arithmetic and Logic Unit 404 it is necessary that the lead ¢MR03F 1739 go low. This causes the output of Inverter 1704 to go high to enable gates 1708, 1710, 1712 and 1714 to pass on the data on the leads MRBOOT 2025, MRB01T 2026, MRB02T 2421, and MRB03T 2422. To perform this same operation with only the second character, it is necessary to cause the ¢ MR47F 2502 lead only to go low.

Figure 29:
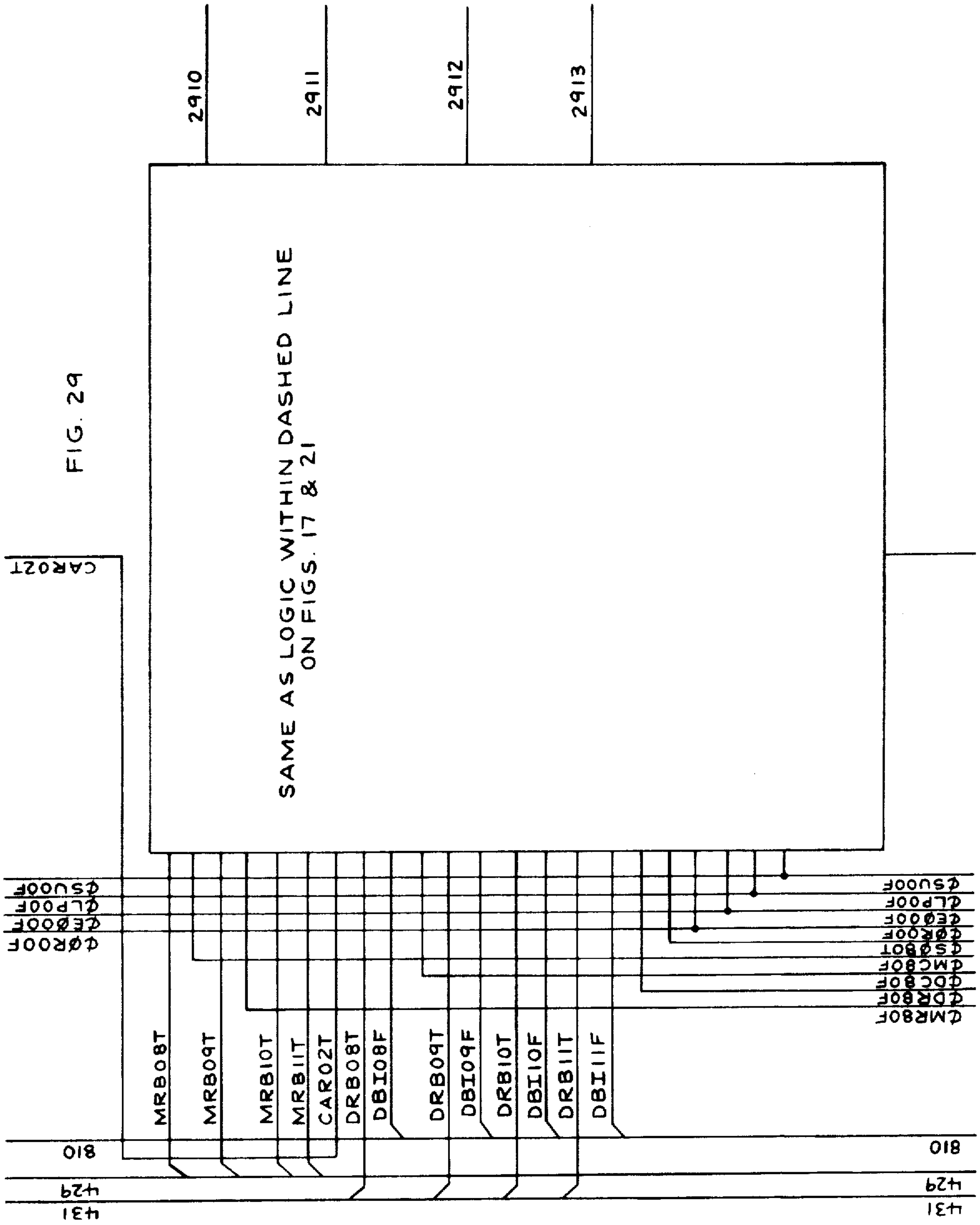
Figure 33:
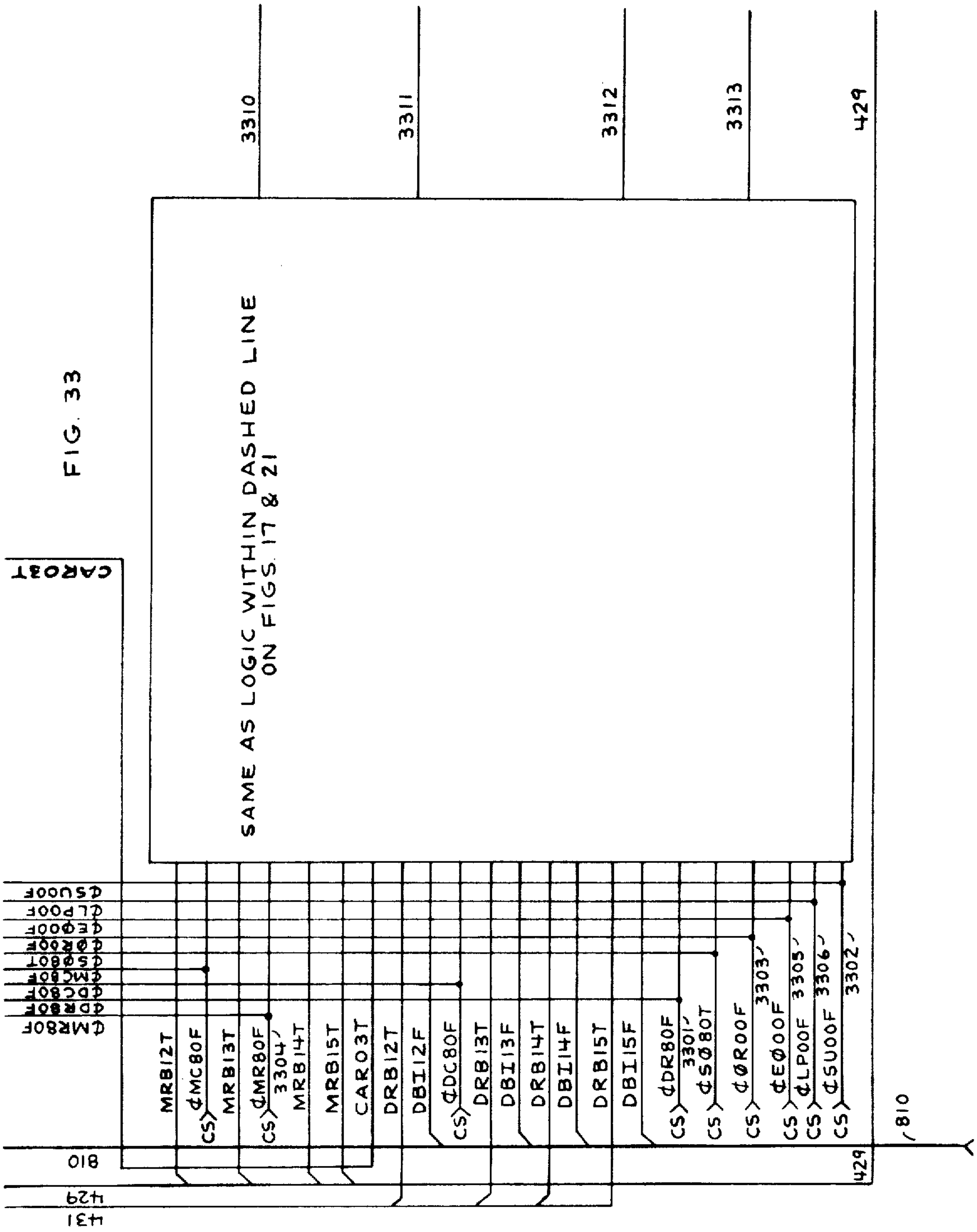

Notice, however, that character 3 cannot be gated by itself since its gating lead ¢ MR80F 3304 is common to both character 3, FIG. 29, and character 4, FIG. 33. This is a consequence of operation with the APZ-130 PCU, this lead will be split; that is, FIG. 29 and FIG. 33 will have separate and independent leads for gating the contents of the Memory Register of 403 into the Arithmetic and Logic Unit 404.

Continuing with the example at hand, in order to gate the first character through the Arithmetic and Logic Unit it is necessary to first enable one of the inverters 2116, 2117, 2118, or 2119. The inputs to these inverters correspond to the four permissible arithmetic functions OR, Exclusive OR, Logical Product and Sum. Lead ¢ØROOF 3303 specifies the OR function; lead ¢ EØOOF 3305 specifies the Exclusive OR function; lead¢ LPOOF 3306 specifies the Logical Product function and the ¢ SUOOF 3302 lead specifies the SUM function. Since each of these signals is paralleled to all four characters, it is logical to assume that any one of these signals will gate data through the Arithmetic and Logic Unit 404 for all four characters.

Thus far it has been shown that character 2, which is composed of bits MRB04T 2802, MRB05T 2803, MRB06T 2804, and MRB07T 2805 from the Memory Register MR over path 429 can be gated into the Arithmetic and Logic Unit 404 by itself through the use of one of the arithmetic functions. In the postulated case, the applicable arithmetic function is the OR function since there is no input from the Data Register 402 via the path DRB 431. This is true since neither lead ¢ DRO7F 2501 nor lead ¢DCO7F 2503 is enabled. These are the leads which gate the data from the Data Register DR of 402 into characters 1 and 2 of the Arithmetic and Logic Unit 404.

The desired data must now be placed into the A Register 406 without disturbing any other data already present. With reference to FIGS. 18 and 22, it can be seen that data can be gated into the Addressed Array Register contained in 1801, 1802, 2201 and 2202 by the enabling of signals ¢CS01F 1830, ¢BS01F 3403;¢ BS02F 3404; ¢ BS03F 3405; and ¢BS04F 3406. The signal ¢CS01F means gate character 1 and the signals¢ BS01F, ¢BS02F, ¢BS03F, and ¢BS03F, and ¢ BS04F mean gate bits 1, 2, 3, and 4 respectively. Thus we can see that these signals enable all 4 bits of character 1 only to be gated into the designated register. It is obvious that characters 2, 3, and 4 cannot be gated since their character gating leads ¢CS02F 2601;¢ CS03F 3001; and ¢CSO4F 3407 respectively are not enabled. This means that only the data in the addressed register in 1801, 1802, 2201 and 2202 will be altered.

The same statement can also be made about character 2 assuming that lead ¢CS02F 2601 is enabled instead of ¢CS01F 1830. Thus, by enabling leads¢ CS02F 2601; ¢ BS01F 3403; ¢BS02F 3404; ¢BS03F 3405; and ¢BS04F 3406; it is possible to write character 2 only into the A Register 406 without disturbing any other bit positions within the register.

The same method is used to handle the data on a 1-bit or 2-bit basis also. To store 1 bit of data in the A Register 406, for example bit 3, which corresponds to the data on lead MRB02T 2421, the process is repeated, as before, up to the point where the data is actually gated into the register. At this point, to store only bit 3, it is necessary to gate only character 1 and bit 3. That is, the signals ¢CS01F 1830 and ¢BS03F 3405 only are to be enabled.

At this time, by way of further example, it is assumed that character 3 of the Memory Register MR of 403 is to be transferred to character 2 of the A Register 406.

The first step in such operation is to shift the contents of the Memory Register of 403 four positions to the right, that is, toward the least significant bit position. This shift will proceed as previously described except that this time the SHMOOF 3718 lead will go low to set the flip-flop 3708. The high output at Q of 3708 together with the high output at Q of flip-flop 3709 as before will enable gate 3801. This gate defines that the Memory Register MR of 403 will be shifted to the right. In FIG. 45C, the output of gate 3814 will be replaced by the output of gate 3813 since gate 3814 provides the shift pulses for the Memory Register MR of 403.

When the shifting has been completed we will find that the data on leads MRB08T 3201; MRB09T 3202; MRB10T 3203; and MRB11T 3204; has been transferred to leads MRB04T 2802; MRB05T 2803; MRB06T 2804; and MRB07T 2805; respectively. In effect, the data in character 3 has been transferred to character 2.

From this point, the data is stored in the A Register 406 in precisely the same manner as was described before.

Rotation Control

The ROTATE instruction has been disregarded up to this point since it is essentially the same as the SHIFT instruction. In this instruction, the contents of the Designated Array Register 405 to 420 are rotated with the contents of the A Register 406.

The only differences between thw ROTATE and SHIFT instructions are that in the ROTATE instruction, both the Memory Register of 403 and the Data Register DR of 402 are clocked simultaneously and the data that is shifted out of one register is shifted into the other register.

Let us assume that State 1 has been completed and that the instruction contained in the Memory Register of 403 is RTR, 4, X. This means that the contents of the X Register is to be rotated 4 bit positions with the contents of the A Register. The next state for this instruction is State 5A. The contents of the X Register 408 and the A Register 406 are shown at count 0 in FIG. 48.

In State 5A, the contents of the A Register 406 are placed in the Data Register of 402 and the contents of the X Register are placed in the Memory Register of 403. The shift now proceeds as before except that both the SHDOOF lead 3711 and the SHMOOF lead 3718 go low to set flip-flops 3708 and 3710. When lead LRSOOF 3712 goes low, the flip-flop 3709 sets and enables gates 3801 and 3803. These gates over leads 3816 and 3818 enable data to be shifted right in both the Memory Register 403 and the Data Register 402. Flip-flops 3708 and 3710 also provide enable signals to gates 3813 and 3814. The gates enable both the Memory Register 403 and the Data Register 402 to be clocked simultaneously over leads 3821 and 3820 respectively.

At this time, the leads TYP04F 3921; STA05F 3922; and ROTOOF 3923 are all low to enable the data transfer. The IRB15T lead 3924, which is also low, determines the direction of the transfer. In this case, the low on the IRB15T lead 3924 is inverted by gate 3904 and causes the output of gate 3906 to go low. This causes a high output from inverter 3908 to enable gates 3911 and 3912. Since the least significant bit in the Memory Register of 403, which is lead MRBOOT 2025, is high, the output of gate 3911 is a low. This becomes a high at the output of inverter 3915 and becomes the input to the most significant bit in the Data Register of 402, which is the DRD15T lead 3919. Similarly, if the MRBOOT lead 2025 had been low, the output of gate 3915 would also have been low.

In the same manner, the least significant bit of the Data Register of 402, which is on lead DRBOOT 1918, is gated to the most significant bit position of the Memory Register of 403 which is the MRD15T lead 3920.

The bit positions after the first clock pulse, as shown at count 1 in FIG. 48, demonstrate this rotation process. Both registers have been shifted one position toward the least significant bit and the data bit shifted out of the least significant bit position of either register is shifted into the most significant bit position of the opposite register. The result of the four clock pulses is shown at count 4 of FIG. 48.

Had the instruction been RTL, 4, X, the only difference would have been the direction of the shifting. A shift left, therefore, means toward the most significant bit position.

Figure 20:
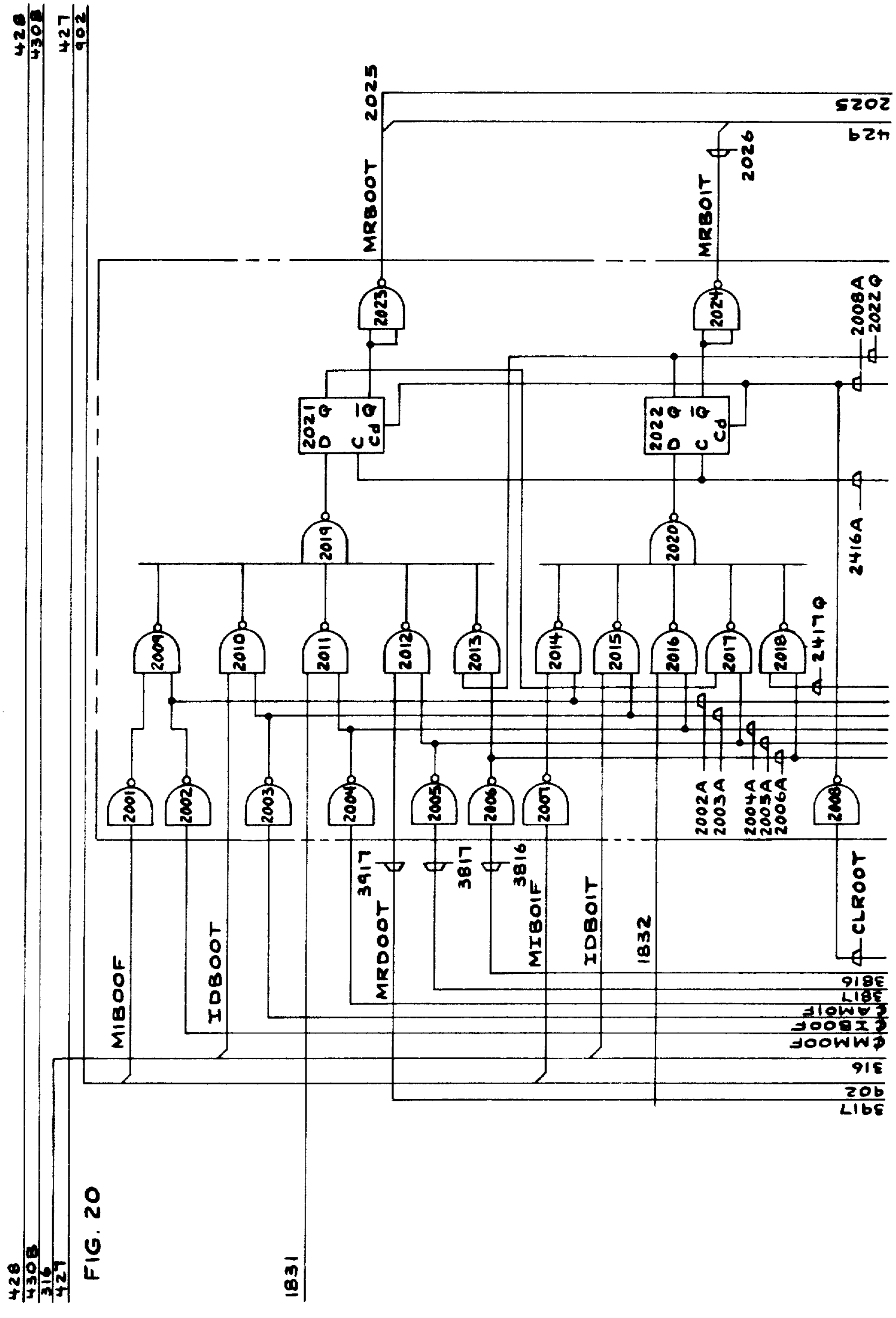
Figure 21:
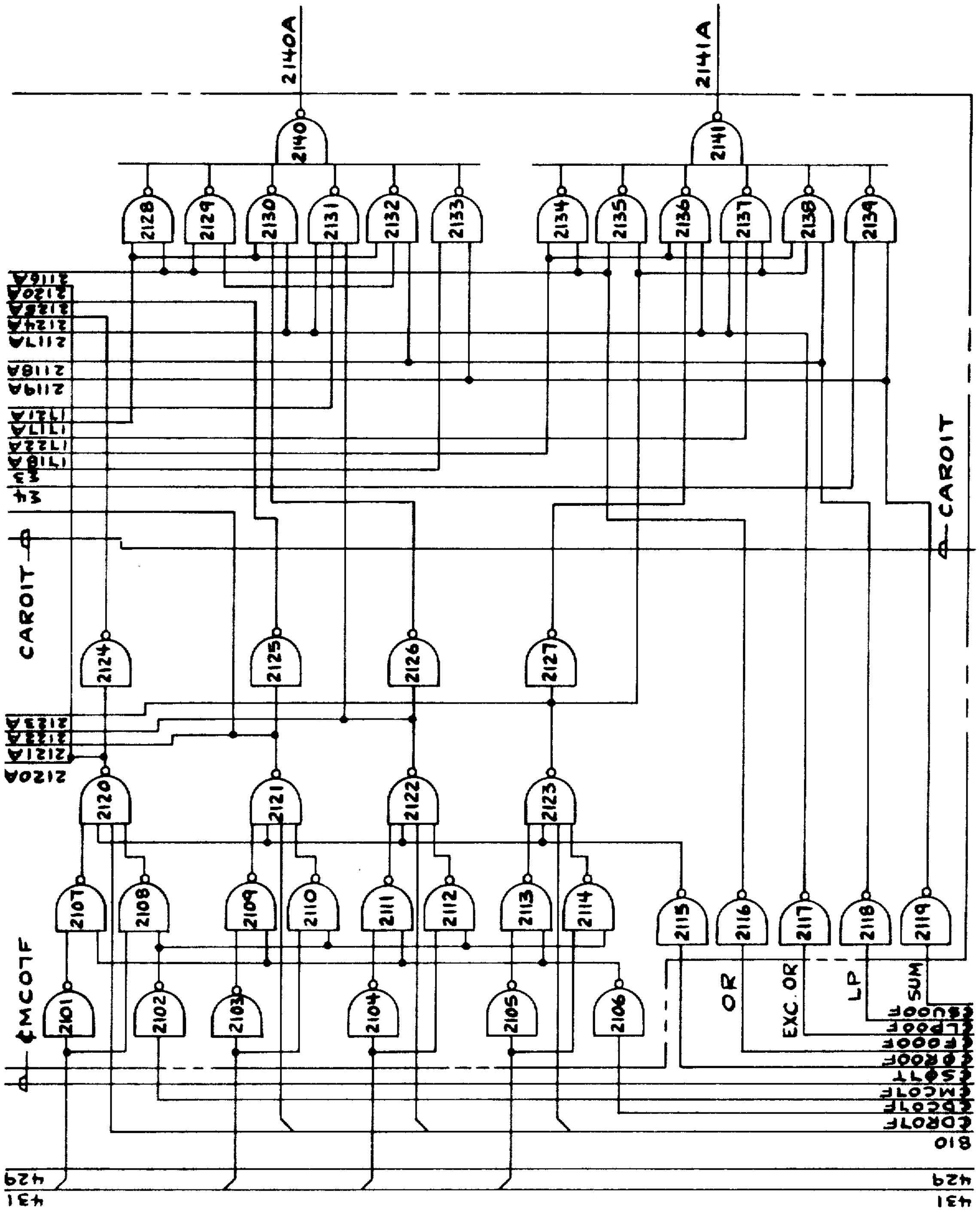

In the case of Rotate Left, the IRB15T lead 3924 would be a high. This high would enable gates 3905, 3909, and 3910 and disable gates 3906, 3911 and 3912. The result of this action is that the bit shifted out of the most significant bit position of either register is shifted into the least significant bit position of the opposite register. The net result is, however, the same in that a bit shifted out of either register is shifted into the complementary position in the opposite register. In other words, the bit shifted out of MRB15T, FIG. 36, will, via gate 3910, inverter 3914 and lead 3918, be shifted into DRDOOT (FIG. 19); and the bit shifted out of DRB15T (FIG. 35) will, via gate 3909, inverter 3913 and lead 3917, be shifted into MRDOOT (FIG. 20).

It should be kept in mind that for shifting only, the data register is shifted; but that for rotating, both data and memory registers are shifted. The following chart may help in this respect.

SHIFT

| Data Register | Gate | Lead |
|---|---|---|
| Shift Right | 3803 | 3818 |
| Shift Left | 3804 | 3819 |
| Clock | 3814 | 3820 |

| Memory Register | Gate | Lead |
|---|---|---|
| Shift Right | 3801 | 3816 |
| Shift Left | 3802 | 3817 |
| Clock | 3813 | 3821 |

Following is a convenient outline of shift right, shift left, rotate right, and rotate left assuming a four-step shift or rotate.

Shift Control Outline and Resume

Shift Right

1. Gate the shift right instruction SHR, 4, A into the Instruction Register IR.
2. Transfer the contents of the A Register 406 into the Data Register 402.
3. Provide signals from PCU to Shift Control 421 over CS Path 421B as follows:
   SHDOOF to condition shift control for data register parallel shift.
   LRSOOF to condition shift control for a right shift
   DCB02T to set down-counter for downcount of 4.
   This enables the shift control to:
   Signal PCU over path 432 to stop its Clock 804.
   Condition data register over lead 3818 for shifting to right.
   Pass clock pulses over lead 3820 to the data register for shifting.
4. At the end of four shifts, the shift control 421 blocks the pulses from the oscillator 421A and restarts the PCU clock.
5. The PCU gates the contents of the data register 402 into the Arithmetic and Logic Unit 401.
6. The PCU gates the contents of the Arithmetic and Logic Unit into the A Register 406.
7. It should be observed that there is no path established in shift control 421 for the contents bit 0 to be forwarded whereby this bit is thrown away. Also when the contents of bit 15 is transferred to bit 14, the contents of bit 15 become 0.

Shift Left

1. Gate the shift left instruction SHL, 4, A into the Instruction Register IR.
2. Transfer the contents of the A Register 406 into the Data Register 402.
3. Provide signals from PCU to Shift Control 421 over CS path 421B as follows:
   SHDOOF to condition shift control for data register parallel shift.
   LRSOOF (not sent) whereby shift control is conditioned for left shift.
   DEB02T to set down-counter for down count of 4.
   This enables the shift control to:
   Signal PCU 432 to stop its Clock 804.
   Condition data register over lead 3819 for shifting to left.
   For example, this conditions gates 1902, 1908, and 1911 whereby bit 1 from the flip-flop 1912 Q output via 1908 and 1911 to the D input of 1913 effects the transfer into flip-flop 1913 constituting a shift left.
   Pass clock pulses over lead 3820 to the data register for shifting.
4. At the end of four shifts, the shift control 421 blocks the pulses from the oscillator 421A and restarts the PCU clock.
5. The PCU gates the contents of the data register into the Arithmetic and Logic Unit.
6. The PCU gates the contents of the Arithmetic and Logic Unit into the A Register 406.
7. It should be observed that there is no path established in shift control 421 for the contents of bit 15 to be forwarded whereby this bit is thrown away. Also that when the contents of bit 0 is transferred to bit 1, the contents of bit 0 become 0.

Rotate Control Outline and Resume

Rotate Right

1. Gate the rotate right instruction RTR, 4, X into the Instruction Register IR.
2. Transfer the contents of the A Register 406 into the Data Register of 402; and the contents of the X Register into the Memory Register of 403.
3. Provide signals from PCU to Shift Control 421 over CS path 421B as follows:
   SHDOOF to condition shift control for data register parallel shift.
   SHMOOF to condition shift control for memory register parallel shift.
   LRSOOF to condition shift control for a right shift.
   DCB02T to set down counter for a down count of 4. This enables the shift control to:
   Signal PCU over path 432 to stop its clock 804.
   Condition data register over lead 3818 and memory register over lead 3816 for shifting to right.
   Pass clock pulses over leads 3820 and 3821 to the data register and memory register for shifting.
   TYPO4F, STAO5F, and R0TOOF (FIG. 39) to enable data transfer between data register and memory register.
   IRB15T to determine direction of transfer, i.e., right.
4. At the end of four shifts, the shift control 421 blocks the pulses from the oscillator 421A and restarts the PCU clock.
5. The PCU gates the contents of the data register into the Arithmetic and Logic Unit and from thence into the X Register of the Memory Array.

Rotate Left

1. Gate the rotate left instruction RTL, 4, X into the Instruction Register IR.
2. Transfer the contents of the A Register 406 into the Data Register 402; and the contents of the X Register into the Memory Register 403.
3. Provide Signals from PCU to Shift Control 421 over CS path 421B as follows:
   SHDOOF to condition shift control for the data register parallel shift.
   SHMOOF to condition shift control for memory register parallel shift.
   DCB02T to set down counter for a down count of 4.
   This enables the shift control to: Signal PCU over path 432 to stop its Clock 804.
   Condition data register over lead 3819 and memory register over lead 3817 for shifting to left.
   Pass clock pulses over leads 3820 and 3821 to the data register and memory register for shifting.
   TYPO4F, STAO5F, and R0TOOF (FIG. 39) to enable data transfer between data register and memory register.
   IRB157 (not sent) to determine direction of transfer, i.e., left.
4. At the end of four shifts, the shift control 421 blocks the pulses from the oscillator 421A and restarts the PCU clock.
5. The PCU gates the contents of the data register into the Arithmetic and Logic Unit and from thence into the X Register of the Memory Array.

A resume of the control leads from PCU to the shift control circuit follows, noting that lead ECKOOT can be activated from the PCU oscillator or by an oscillator local to the shift control.

| | |
|---|---|
| RSCOOT | Reset clear — resets the shift circuit to the clear condition. |
| DCBOOT, DCBO1T, DCBO2T, DCBO3T | Binary coded shift length |
| SHMOOF | Shift MR (shift memory register) |
| LRSOOF | Left-right shift. Only activated when it is desired to shift or rotate right. Conditions register DR and MR as required. |
| SHDOOF | Shift DR (shift data register) |
| ECKOOT | Clock lead which can be activated by local oscillator or alternatively by PCU oscillator. |
| TYPO4F | Type 4 instruction activates this lead: designates shift or rotate. |
| STAO5F | State 5A activates this lead. |
| ROTOOF | Rotate instruction activates this lead |
| IRB15T | Instruction Reg. Bit 15 used to determine direction of rotate. If bit is 0 direction left is determined. If bit is 1, direction right is determined. Conditions of rotate circuitry. |

Following are certain observations relative to the DHU.

1. All 16 bits are fetched from the preloader PRL or memory SMU.
   a. Instruction words are stored in instruction register IR OF PCU and in memory register MR of DHU.
      I. PCU uses all 16 bits.
      II. DHU uses either none or the lower 8 bits. The lower 8 bits may be used per se for addressing the memory array 1801 or SMU; or as data for use in DHU; or the contents of register BG or BH may be inserted in the upper half of the memory register (concatenation) to form a 16 bit address for extracting an instruction or data from SMU.
   b. Data words are normally stored in the memory register MR of DHU. However, the following clock leads from PCU enable storage selectively on a half word basis: first half word $MRO7F; second half word $MR8OF.
2. From the memory register MR, gating without inversion into arithmetic and logic unit shown in the FIGS. 17, 21, 25, 29, and 33, when required, is as follows:

1st character — by means of gating lead ¢MRO3F from PCU.
2nd character — by means of gating lead ¢MR47F from PCU.
3rd character) — by means of gating lead ¢MR80F
4th character) from PCU.

NOTE: Characters 3rd and 4th could be selectively gated if separate gating leads are provided from PCU. Such leads might be designated as follows:

3rd character — ¢MR81F
4th character — ¢MR25F

3. From the memory register MR, gating with inversion into the arithmetic and logic unit, when required, is as follows:

1st character) by means of gating lead ¢MC07F
2nd character) from PCU
3rd character) by means of gating lead ¢MC80F
4th character) from PCU NOTE: All four characters could be selectively gated if separate gating leads are provided from PCU. Such leads might be designated as follows:

1st character — ¢MC03F
2nd character — ¢MC47F
3rd character — ¢MC81F
4th character — ¢MC25F

4. From the data register DR, gating without inversion into the arithmetic and logic unit shown in FIGS. 17, 21, 25, 29, and 33 when required is as follows:

1st character) — by means of gating lead ¢DR07F
2nd character) from PCU.
3rd character) — by means of gating lead ¢DR80F
4th character) from PCU.

NOTE: All four characters could be selectively gated if separate gating leads are provided from PCU. Such leads might be designated as follows:

1st character — ¢DR03F
2nd character — ¢DR47F
3rd character — ¢DR81F
4th character — ¢DR25F

5. From the data register DR, gating with inversion into the arithmetic and logic unit, when required, is as follows:

1st character) — by means of gating lead ¢DC07F
2nd character) from PCU.
3rd character) — by means of gating lead ¢DC80F
4th character) from PCU NOTE: All four characters could be selectively gated if separate gating leads are provided from PCU. Such leads might be designated as follows:

1st character — ¢DC03F
2nd character — ¢DC47F
3rd character — ¢DC81F
4th character — ¢DC25F

6. Simultaneously with gating from the data register without inversion (DΓ leads) or with inversion (DC leads), the following control leads from PCU can be activated to force specified bits within the arithmetic and logic unit to 1's.

1st character) — ¢SØO7T
2nd character)
3rd character) — ¢SØ8OT
4th character)

NOTE: All four characters could be selectively so treated if separate gating leads are provided from PCU. Such leads might be designated:

1st character — ¢SØO3T
2nd character — ¢SØ47T
3rd character — ¢SØ81T
4th character — ¢SØ25T

7. From the arithmetic and logic unit, gating into the memory array registers can be on a 1, 2, 4, 8, or 16-bit basis with the provision that, if it is on a 2-bit basis, both bits must be in the same character. This gating means is as follows:

character 1 — lead ¢CS01F
character 2 — lead ¢CS02F
character 3 — lead ¢CS03F
character 4 — lead ¢CS04F
bit 1 — lead ¢BS01F bit 2 — lead ¢BS02F
bit 3 — lead ¢BS03F
bit 4 — lead ¢BS04F

To gate on a 16-bit basis, all character leads and all bit leads would be activated by PCU.

To gate on an 8-bit basis any two of the character leads and all bit leads would be activated by PCU. APZ-142 activates character leads 1 and 2 or 3 and 4.

To gate on a 4-bit basis, one of the character leads and all bit leads would be activated.

To gate on a 2-bit basis, any one character lead and any 2-bit leads would be activated. Normally 2 consecutive bit leads would be activated; and normally these would be either bit leads 1 and 2 or 3 and 4.

To gate on a 1-bit basis, any one character lead and any 1 bit lead would be activated.

APZ-142 uses 1-, 4-, 8-, 16-bit or word gating; whereas APZ-130 would use 1-, 2-, 4-, 8-, 16- bit or word gating.

8. a. From memory array registers gating into the address register AR is on a 16-bit or word basis by means of clock lead $AR00T from PCU.
   b. From memory array registers gating into the data register DR is on a 16-bit or word basis by means of a clock lead DR01F and a control lead ¢AD01F, both from PCU.
   c. From the memory array registers gating into the memory register MR is on an 8-bit or half-word basis by means of clock leads $MR07F and $MR80F from PCU for 1st and 2nd half words respectively and also control lead ¢AM01F, common to both half words. During the concatenation operation in forming addresses for SMU, the bits of the upper half of the memory array register BG or BH becomes gated into the upper half of the memory register MR. Gating on a word basis would be accomplished by actuating both clock leads and the control lead.
9. a. From the address register AR, gating to SMU via leads MAB00F–MAB15F is on a 16-bit or whole word basis by means of control lead ¢AB00F from PCU; whereas, via leads ARB01T–ARB15T, information is available over paths 430, 430A, and 430B to MUX and PRL without the necessity of out-gating as soon as it has been stored into the address register AR.
   b. From the data register DR, gating to SMU via leads M0BOOF – M0B15F is on a 16-bit or whole word basis by means of control lead ¢ØBOOF from PCU; whereas, via leads DRBooT – DRB15T, information is available over path 431 to the MUX and to the input logic of the arithmetic and logic unit without the necessity of out-gating although it must be gated into the arithmetic and logic unit by the character and bit gating output signals.
   c. Without the necessity of outgating control means from the memory register "MR," information is available to the input logic of the arithmetic and logic unit via leads MRB00T–MRB15T over path 429.
10. All 16 bits of the Interrupt Address via leads DBI through DB15 of path 810 are gated into the arithmetic and logic unit and all bits thereof by use of the logical OR or SUM with zeros are gated from the arithmetic and logic unit into the IA register 419.
11. The OR function is effected by activating lead ¢ØROOF from PCU and simultaneously gating into the arithmetic and logic unit as follows:
   Other than N-Mode 0–15 bits from MR and 0–15 bits from DR.
   N Mode 0–7 bits from MR and 0–15 bits from DR.
12. The Exclusive OR function is effected by activating lead ¢EØOOF from PCU and simultaneously gating into the arithmetic and logic unit as for 11.
13. The logical product function is effected by activating lead ¢LP00F from PCU and simultaneously gating into the arithmetic and logic unit (as for 11).
14. The sum function is effected by activating lead ¢SU00F from PCU and simultaneously gating into the arithmetic and logic unit (as for 11).
15. The subtraction instruction SBA, N, $4_8$, for example, which means subtract from the contents of register A, octal 4, which in the N mode, is the data contained in the lower 8 bits (i.e. bits 0–7) of the instruction word which is stored in register MR, whereby the memory register MR contains

| Instruction | Octal 4 |
|---|---|
| 01100000 | 00000100 |

Assume that the register A contains octal 15. The problem becomes

| | |
|---|---|
| 0000000000001101 | minuend in register A |
| 0000000000000100 | subtrahend in bits 0–7 of register MR |

Logically what happens to the pertinent information is as follows.

1st Step

Bring the contents of register A into data register DR; and also bring the contents of bits 8–15 of register A into bit positions 8–15 of the memory register MR, resulting as follows:

| | |
|---|---|
| 0000000000001101 | minuend in register DR |
| 0000000000000100 | subtrahend in memory register MR |

2nd Step

Bring the contents of the data register DR into the arithmetic and logic unit using DR gating (the upper 8 bits 8–15 forced to logic "1s" because lead ¢SØ8OT is activated); and the contents of bits 0–7 of memory register MR into the arithmetic and logic unit using MC gating; and the bits 8–15 of the register MR into the arithmetic and logic unit using MR gating resulting as follows:

1111111110001101

0000000001111011

3rd Step

Perform the sum operation by activating lead ¢SU00F from PCU giving

0000000000001000

4th Step

Add 1 by activating lead ¢CI00T from PCU, giving

0000000000001001

5th Step

Store the result in the A register via the ¢CS01F- ¢CS04F and ¢BS01F- ¢BS04F leads. The A register was addressed in order to store the contents in DR. It has remained addressed which enables the result to be stored therein. With respect to PCU clock times the chronological sequence is as follows:

Clock A

Upper 8 bits from data register input to arithmetic and logic unit are forced to "1's."
Lead ¢SU00F, indicating logical sum, is energized.
Lead ¢CI00T, indicating add "1" is energized.
Register A is addressed.
Leads ¢DR07F and ¢DR80F are activated causing information from data register to be gated into the arithmetic and logic unit.
Lead ¢AD01F is energized causing data from register array to be gated to the data register.
Lead ¢AM01F is activated causing data from register array to be gated to the memory register.
Lead ¢MR80F is activated causing the data in bits 8–15 of the memory register to be gated into the arithmetic and logic unit.
Lead ¢MC07F is activated causing the complement of the data contained in bits 0–7 of the memory register to be gated into the arithmetic and logic unit.

Clock B

Lead $DR01F is pulsed causing the data in the addressed A register to be stored in the data register.
Lead $MR80F is pulsed causing the data in bits 8–15 of the addressed A register to be stored in bits 8–15 of the memory register.

Clock C - Clock $\bar{A}$

No occurrence.

Clock $\bar{B}$

Leads ¢CS01F- ¢CS04F and ¢BS01F- ¢BS04F are activated causing the data present at the inputs of the register array to be stored in the A register.

CLOCK $\bar{C}$ — CLOCK $\bar{H}$

No occurrence.

Storage Memory Unit Description

The Storage Memory Unit SMU is a 16,384 word ferrite core memory unit. Each storage word contains 16 bits of information. The PCU via DHU is capable of randomly addressing storage locations by identifying a permanently assigned binary number address. The SMU functions with the with the DHU and PRL to store and recover system data and processor instructions.

The 16K SMU is made up of four 4K (64 × 64) 4K section 501 to 504 with 16-bit planes in each. There are 64Y leads that are threaded through all the cores in a 4K section. There are 64X leads that are threaded through all the cores in the upper and lower 4K sections of an 8K configuration. There are 16 individual third leads that thread all 4K cores in each of the 16 bit planes of each 4K section. This third wire is a sense/inhibit wire and serves a dual purpose.

When magnetizing 16 cores of any 4K section to the ZERO state, coincident "read" half-currents will have to flow in one X and one Y lead in the same direction through the cores. If any of the 16 cores were previously in the ONE state, a current flow will be induced into the sense wire of that bit plane due to the magnetic lines of forge cutting the sense wire.

When magnetizing the 16 cores of any 4K section to the ONE state, coincident "write" half currents will have to flow in one X and one Y lead in the same direction through the cores but in opposite direction to the "read" half currents. If any of the 16 cores are to remain in the ZERO state, an inhibit current is generated of sufficient magnitude to oppose and cancel the effect of the Y "write" half current.

There are 16 individual sense amplifiers in each one of the four SA groups 521 to 524. Each one of these individual sense amplifiers is connected to the sense wire that is threaded through each bit plane within a 4K section. Each SA group 521–524 is enabled by its respective Sense Amplifier Enable SAE 1, 2, 3, and 4 during the time X and Y "read" half-currents are generated to select a particular 16 cores in a 4K section. If any of the selected cores induce a current flow in the sense wire, a logical "1" will be at the output of the respective sense amplifier.

There are 16 individual inhibit circuits in each one of the four INH groups 517–520. Each one of the individual inhibit circuits is connected to the electrical center of the sense wire and terminated at the input of the respective sense amplifier, through two diodes connected to ground. The INH groups 517–520 are strobed by the respective Inhibit Strobe ZS 1, 2, 3, and 4 during the time X and Y "write" half-currents are generated to select a particular sixteen cores in a 4K section. The X and Y "write" half-currents will attempt to switch all the cores to the ONE state. If any of the 16 inhibit circuit within a INH group receives a logical "0" from its respective Data Register 531 or 532 and a ZS enable from the Timing and Control circuit 530, that inhibit circuit output will generate a current pulse to oppose the effect of the Y "write" half-current to maintain a ZERO state in that core.

The 16 bit Data Registers 531 and 532 are reset by Data Register Reset DRR. Data is received from the MOB 427 leads and stored in the data registers after Data Register Strobe DRS. Data is also received from any SA group 521 to 524 sense amplifier and presents this information to the data register output leads MID 902 and to the respective INH group 517 to 520 inputs after a Data Output Strobe DOS enable.

Y Read/Write Bus Drivers 513 to 516 contain eight read and eight write current drivers each. The output from each read and write current driver is connected to a bus which is connected to eight Y4K section core memory leads.

Y Read/Write Return Drivers 509 to 512 contain eight read and eight write drivers each. The output from each read and write current driver is connected to one lead of eight buses of the Y Read/Write Bus Drivers 513 to 516 in a common 4K section.

X Read/Write Bus Drivers 505 and 506 contain eight read and eight write current drivers each. The outputs of each driver is connected to a bus that is connected to eight X upper or lower 4K section core memory leads.

X Read-Write Return Drivers 507 and 508 contain eight read and eight write current drivers each. The output from each read and write current driver is connected to one lead of each eight buses of the X Read/Write Bus Driver 505 or 506 in a common 8K configuration.

The Read Strobe RS and Write Strobe WS leads are connected to all Read/Write Drivers 509 to 516. The RS will enable the read current drivers and the WS will enable the write current drivers for the 4K section that is addressed.

Address Register 525 contains 14 edge triggered flip-flop circuits that are triggered by an Address Register Strobe ARS, according to the individual MAB 428 input leads.

Decoder circuit 526 decodes address bits 0, 1, and 2 to select one of the eight possible Y read/write circuits in each Y read/write return 509 to 512.

Decoder circuit 527 decodes address bits 3, 4, and 5 to select one of the eight possible Y read/write circuits in each Y Read/Write Bus Driver 513 to 516. Decoder 528 decodes address bits 6, 7, and 8 to select one of the eight possible X read/write circuits in each X Read/Write Bus Driver 505 and 506. Decoder 529 decodes address bits 9, 10, and 11 to select one of the eight possible X read/write circuits in each X Read/Write Return Driver 507 and 508.

Address bits 12 and 13 are used in the Timing and Control Circuit 530 to select one of the four possible SAE 1 to 4 and ZS 1 to 4 enables; and also, to select one of the four possible sets of Y Read/Write Return or Bus Drivers 509 to 516. Most significant address bit 13 selects either the upper or lower 8K Read/Write Bus or Return Driver 505 and 507 or 506 and 508.

Timing and Control Circuit 530 accepts command signals CSs from the PCU control Logic 801, which indicates the operating mode; Clear/Write C/W, Read/Restore R/R, and Read/Modify/Write R/M/W. When a command signal is received, the Timing and Control Circuit 530 provides the necessary logic level to perform the command function and also includes output status signals; Memory Busy MBZ, End of Cycle EOC, and Data Ready RDY to the PRL.

Assuming that a Clear/Write command signal has been received from the PCU, the general sequence of signals produced by the Timing and Control Circuit 530 will be as follows:

1. Address Register 525 is loaded with the address information received by the MAB 428 leads by enable ARS.
2. Address Register 525 is decoded by Decoders 526 to 529 to select an unique location in one of the 4K sections 501 to 504, and Data Registers 531 and 532 are reset by DRR.
3. Data Registers 531 and 532 are loaded from from input MOB 427 leads by enable DRS.
4. The X and Y "read" half-currents in the addressed X and Y Read/Write Driver Circuits 509 to 516 are gated by means of logic level RS, this switches all 16 addressed cores to the ZERO state.
5. The respective Inhibit Strobe ZS is brought up.
6. The X and Y "write" half-currents are gated by enable WS to write the information that was loaded in Data Register 531 or 530 into the addressed memory location.
7. A signal is generated to the PRL indicating that the cycle is complete EOC.

In the Read/Restore R/R mode of operation, the general sequence is the same but with four major differences affecting Data Registers 531 and 532.

1. Data Registers 531 and 532 are not loaded from the MOB 427 leads.
2. The respective SA groups 521 and 524 are gated during the Read Strobe RS by the respective SAE strobe to store the information from the addressed 4K section memory location into the Data Register 531 or 532 after DOS.
3. Data is presented to OR gate 901 via Data Register 531 and 532 output leads MID 509.
4. The data information in the Data Register 531 or 532 is "restore" into the addressed 4K section memory location via the respective INH 517 to 520 circuit after the respective ZS enable.

The Read/Modify/Write R/M/W mode of operation is a combination of the R/R and C/W modes. In producing a R/M/W operation, it is only necessary to inhibit the EOC, while executing the R/R operation.

With EOC command inhibited, data information still in Data Register 531 or 532 is available to the external circuit leads MID 509.

During the C/W cycle, data information from MOD 427 leads will be written into the addressed 4K section via Data Register 531 or 532 and one of the INH groups 517 to 520 in place of the original data information.

PRELOADER BOX DIAGRAM DESCRIPTION

Figure 15:
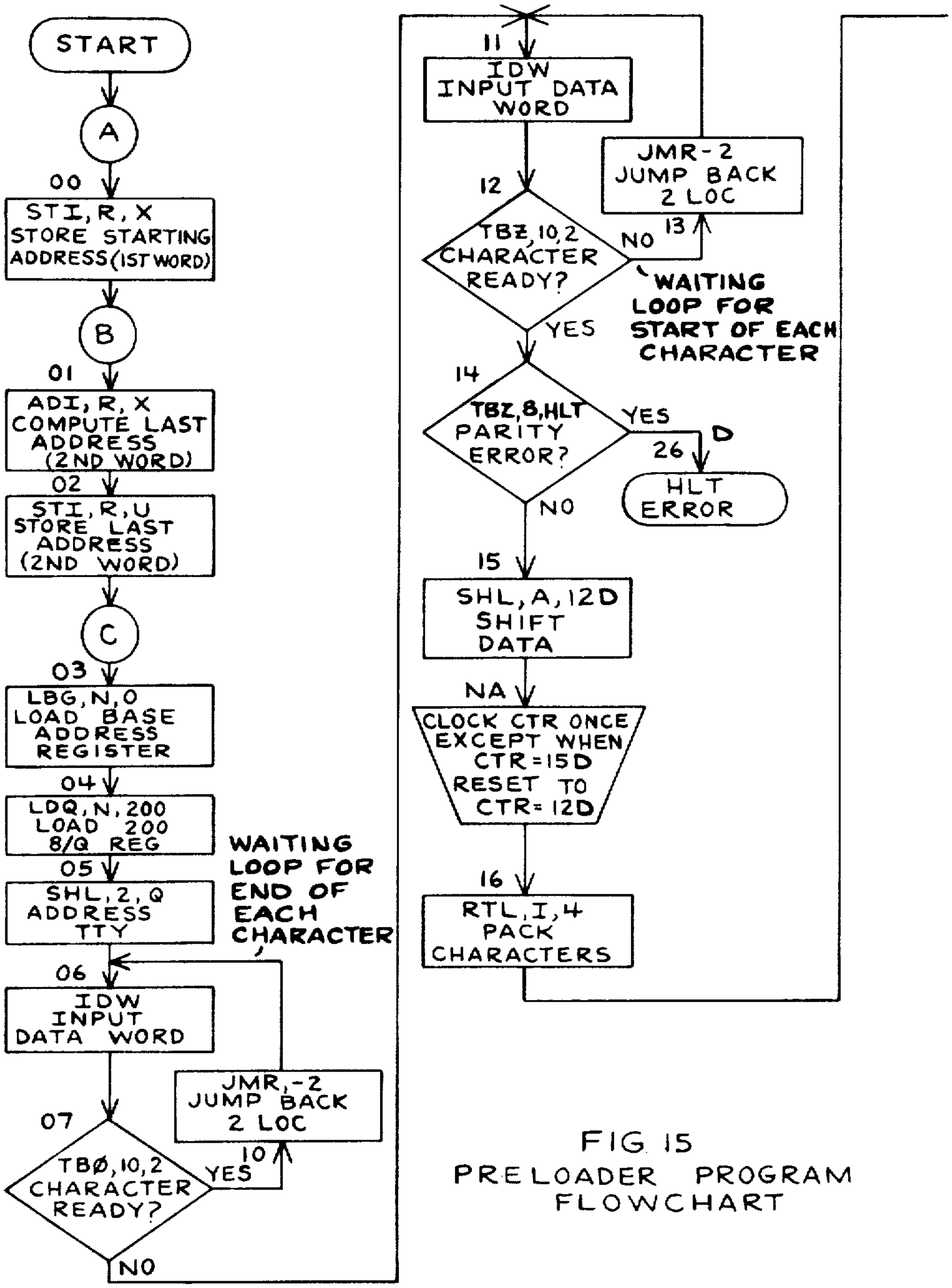
FIGS. 15–16 assembled as shown in FIG. 49C comprise a flow chart of the preloader program.
Figure 16:
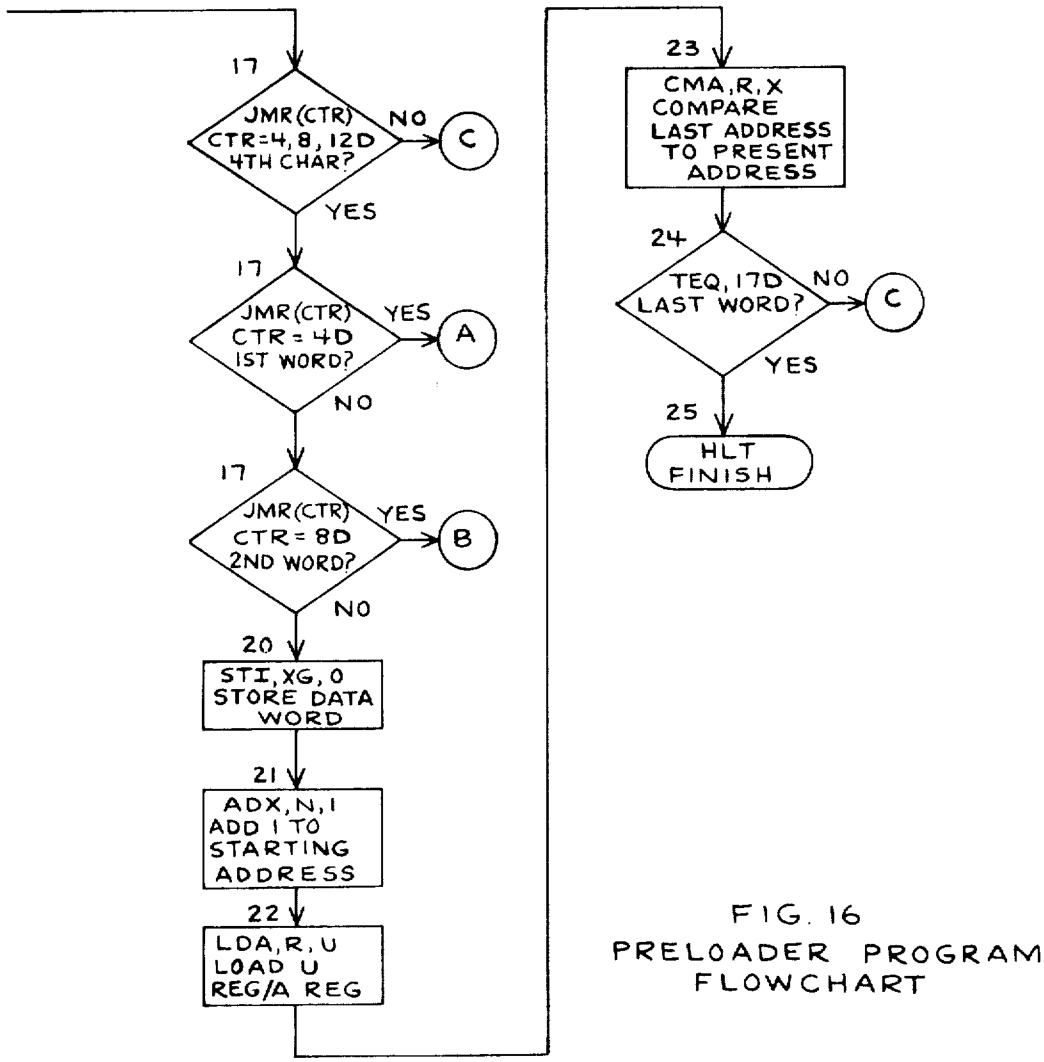
Figure 17:
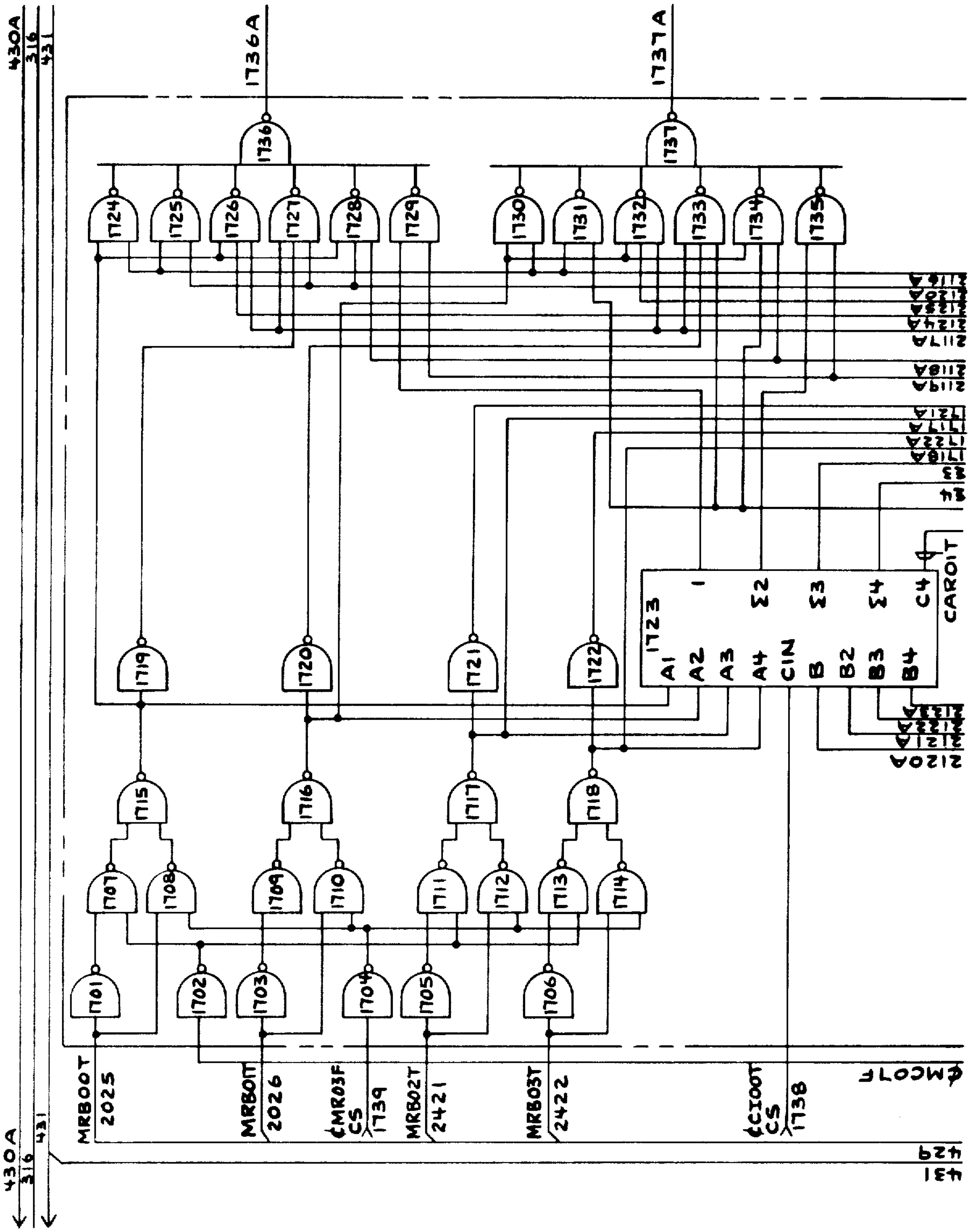
FIGS. 17–39 assembled as shown in FIG. 49D provide a logic diagram of the data handling unit found in FIGS. 1 and 4.

Reference is now made to the system block diagram of FIGS. 1, 2–10 and particularly to the preloader arrangement shown in FIG. 6, and to the preloader program flowchart of FIGS. 15–16.

The purpose of the Preloader is to load an initial program into the SMU memory from the teletype paper tape reader. The Preloader functions by substituting hardwired logic instructions for those normally received from the SMU memory. In State 1 with the Auto-Load button depressed and latched, the SMU core memory is "locked out" and instructions are obtained from the Preloader of FIG. 6. The program executed is shown in the flow-chart of FIGS. 15 and 16.

The execution of the Preloader program results in characters from a teletype paper tape being received in the DHU from the teletype auto-send-receive machine through the teletype auto-send-receive controller; packed into words; and stored in the SMU Core Memory. The parity error flag from the TTC is checked to determine that a valid character was received from the teletype. If, at any time, a parity error bit is received, the processor by a jump technique will cause the instruction at octal address 26 to be read out of the Preloader, halting the processor, lighting the STOP lamp on the MCP, and lighting the address register bit lamps thereon for octal address 26.

The least significant 4 bits of each four characters are packed into a 16 -bit word, with the first character forming the most significant 4 bits and the fourth character the least significant 4 bits. The first word received is the starting address for the program following. The second word received specifies the number of words which will be stored. The third and following words are stored in SMU as data in sequential addresses beginning with the starting address. When the number of words specified by the second word has been stored, the processor causes the instruction at octal address 25 to be read out of the Preloader, halting the Preloader, lighting the STOP lamp and lighting the address register bit lamps for octal 25. Thereupon, the attendant will again depress the Auto-Load Button unlatching the same.

A general description of the functions of the Memory Signal Control, the Address Decoder, the Instruction Logic, and the Jump Counter is now set forth.

Memory Signal Control

The Memory Signal Control 601: (1) detects whether or not a preload condition exists as a result of signals from Control Logic 801; (2) if a preload condition does not exist, the Memory Signal Controller 601 directs signals between the PCU and the timing control circuit of SMU and blocks signals between the PCU and other positions of the preloader; and (3) if a preload condition does exist, the Memory Signal Controller 601 directs signals between the PCU and the other portions of the Preloader and blocks signals between the PCU and Binary and Control Circuit of SMU.

Address Decoder

The Address Decoder receives bits 0–4 forwarded from the DHU Address Register and decodes these bits into 21 addresses numbered 00=24 octal of instruction by uniquely marking individual ones of 21 leads in path 608 which the Preloader is capable of generating. If none of the leads are uniquely marked, this constitutes "Address 25 or 26" inasmuch as the instruction sent to the Instruction Register 809 will have no uniquely marked bit. The attendant distinguishes by observation of the octal code 25 or 26 displayed in the DHU Address Register.

Instruction Logic

The instruction Logic as a result of receipt of an address from the Address Decoder because of a uniquely marked lead (or no uniquely marked lead) generates a 16-bit instruction word which is forwarded over path 609 via OR gates 901 to the Instruction Register 809.

Jump Counter

The Jump Counter keeps track of the characters being inputted from teletype paper tape.

Description of Operation

Preloader operation is started by depressing "SET PC 0000" pushbutton on MCP 101. This resets the PC Register 418 of DHU to zero condition via PCU Control Logic 801 CS signals. "Master-Clear" pushbutton on MCP 101 is then depressed, generating a master clear condition. "AUTO LOAD" pushbutton on MCP 803 is then depressed enabling the Preloader to begin operation. "RUN" pushbutton on MCP 101 is then depressed to start Clock 804 of PCU. The teletype tape reader is then started by setting Power Switch to "ON LINE," Mode Switch to "KT," loading the tape, and setting tape reader switch to "RUN."

Preloader 116 starts functioning as a result of CS signals, Auto Load and State 1 from Control Logic 801. As a result thereof and receipt of the CS read-restore signal RRZO1F from 801, Memory Signal Control Circuit 601 locks out core memory (FIG. 5) via Read-Restore lead RRZOOF and enables Preloader Address Decoder 603, via lead Enable, to begin decoding bits 0–4 received over path 430B from Address Register 401. As a result of the DHU PC Register 418 having previously been reset to zero, bits 0–4 in path 430B will also be zeros automatically whereby the first address decoded is 00. This address is sent to Instruction Logic 604 via 21 leads in path 608 by causing a particular lead to have logic 0 thereon (the other leads having logic 1s thereon). This enables 604 to generate an STI, R, X instruction as shown on flowchart FIG. 15 address 00. Following is a chart of the preloader program:

| Address | Label | Instruction | Operation code 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| 00 | Ⓐ | STI, R, X | 1 | | 1 | 1 | 1 | 1 | | | | | | | | | | |
| 01 | Ⓑ | ADI, R, X | 1 | 1 | | | 1 | 1 | | | | | | | | | 1 | 1 |
| 02 | | STI, R, U | 1 | | 1 | 1 | 1 | 1 | | | | | | | 1 | | 1 | 1 |
| 03 | Ⓒ | LBZ, N, O | | | | 1 | | | | | | | | | | | | |
| 04 | | LDQ, N, $200_8$ | | | 1 | | | 1 | | | 1 | | | | | | | |
| 05 | | SHL, 2, Q | 1 | | | 1 | | | | 1 | | | 1 | | | | 1 | |
| 06 | | IDW | | | | 1 | | 1 | 1 | | | | | | | | | |
| 07 | | TBO, 10, 2 | 1 | | | | 1 | 1 | 1 | | 1 | | 1 | | | | 1 | |
| 10 | | JMR, −2 | 1 | | | 1 | | | 1 | 1 | | | | | | | 1 | |
| 11 | | IDW | | | | 1 | | 1 | 1 | | | | | | | | | |
| 12 | | TBZ, 10, 2 | | | | | 1 | 1 | 1 | | 1 | | 1 | | | | 1 | |
| 13 | | JMR, −2 | 1 | | | 1 | | | 1 | 1 | | | | | | | 1 | |
| 14 | | TBZ, 8, Ⓓ | | | | | 1 | 1 | 1 | | 1 | | | | 1 | | 1 | |
| 15 | | SHL, A, 12D | 1 | | | 1 | | | | 1 | 1 | 1 | | | | | | |
| 16 | | RTL, I, 4D | 1 | | | 1 | | | 1 | | | 1 | | | | 1 | | |
| 17 | | JMR (CTR) Ⓐ, Ⓑ, or Ⓒ | C | | | 1 | | | | 1 | 1 | | | | C | C | C | C |
| 20 | | STI, XG, O | | | 1 | 1 | 1 | 1 | 1 | | | | | | | | | |
| 21 | | ADX, N, 1 | | 1 | | | 1 | | | | | | | | | | | 1 |
| 22 | | LDA, R, U | 1 | | 1 | | | | | | | | | | 1 | | 1 | 1 |
| 23 | | CMA, R, X | 1 | 1 | 1 | 1 | 1 | | | | | | | | | | 1 | 1 |
| 24 | | TEQ, Ⓒ | 1 | | | | 1 | | 1 | 1 | | | | 1 | | | | 1 |
| 25 | | HLT, (Finish) | | | | | | | | | | | | | | | | |
| 26 | Ⓓ | HLT, (Error) | | | | | | | | | | | | | | | | |

The aforementioned instruction, the address of which is 00, is sent over path 609 comprising conductors 0–15 and PCU OR Gates 901 to register IR of PCU 103. As a result, PCU Control Logic 801 causes the contents of DHU I Register 409 to be stored in DHU X Register 408. At the next CS State 1 signal, the DHU AR 401 bits incremented by 1 are decoded by Preloader Address Decoder 603 into address 01. Preloader Instruction Logic then generates the ADI, R, X instruction resulting in the contents of DHU X Register 408 being added to DHU I Register 409. Next decoded address 02 generates an STI, R, U instruction resulting in the contents of DHU I Register 409 being stored in DHU U Register 415. It should be observed that the initial execution of these addresses 00, 01, and 02 are not pertinent at this time except to arrive at Address 3. Next decoded address is 03, generating an LBG, N, O instruction, resulting in DHU BG Register 410 being loaded with zeros. Next decoded address is 04, generating an LDQ, N, 200 instruction, resulting in DHU Q Register 407 being loaded with $200_8$.

Next decoded address is 05, generating an SHL, 2, Q instruction, resulting in contents of DHU Q Register 407 ($200_8$) being shifted two positions left giving $1000_8$ as new contents of Q Register which is the address which will be required by the MUX in reaching the RT point of the teletype auto-send-receive controller, including word address, DTU address, and RT register bit. The storing of $200_8$ and shifting two places to the left was a device for arriving at $1000_8$ because $1000_8$ cannot be stored in bit positions 0–7 of a word in the N mode.

Next decoded address is 06, generating an IDW instruction, resulting in the RT word O of matrix 202 (which in this case is the first character read by the TTY tape reader) being loaded via path 201, DTU-1 RT Matrix 202, RT Data Drivers Circuit 203, MUX RT Data Sense Amplifier Circuit 301, Data Register 305; DHU MR 403 and Arithmetic and Logic Unit 404; into DHU A Register 406.

Next decoded address is 07, generating a TB0, 10, 2 instruction, resulting in testing if bit position 10 of DHU A Register 406 is equal to logic 1, which is checking whether or not TTC is sending control signal "character ready." At this point in the Preloader program the next address will be either 10 or 11 depending upon the status of the "character ready" bit as shown by the decision symbol at address 07 of flowchart FIG. 15. (The numbering of address is in octal). Since the seven preceding program instructions would be executed in microseconds versus the millisecond operating mode of the TTY, it is safe to assume that the "character ready" bit will be logic 0 at this time, making the next decoded address be 11, generating an IDW instruction, resulting in the same action as previously described for program address 06.

Next decoded address is 12, generating a TBZ, 10, 2 instruction, resulting in testing if bit position 10 of DHU A Register 406 is equal to logic 0 which is again checking for "character ready." Since "character ready" bit is a logic 0 at this time, the next decoded address is 13, generating a JMR, −2 instruction, resulting in an unconditional program jump backward 2 positions to address 11 inasmuch as jump direction bit 15 was a logic 1.

The Preloader program is now in the small loop labeled "Waiting Loop For Start of Each Character," and will only exit when "character ready" bit 10 of the A Register 406 becomes a logic 1. When this occurs, the next decoded address after 12 will be 14, rather than 13, generating a TBZ, 8, 10D instruction, resulting in testing whether bit position 8 of DHU A Register 406 is equal to logic 0, which is checking for parity error of the incoming character from TTY. If bit position 8 were a logic 1, indicating a parity error, the jump counter register JR of DHU would determine a jump so that the next decoded address would be 26, generating a HLT instruction, resulting in stopping of the processor with $26_8$ stored in the AR 401 of the DHU.

Assuming that there was not a parity error, the next decoded address after 14 will be 15, generating a SHL, A, 12D instruction, resulting in shifting the contents of the DHU A Register 406 12 positions to the left. The coded first character received from the TTY, is now contained in the four most significant bits (MSB) of the DHU A Register 406 as a result of the shifting process, in preparation for character packing at address 16.

The next sequential block after address 15 in the flowchart FIG. 15 has No Address (NA). This block is included in the flowchart to show that each time the Preloader Address Decoder 603 decodes address 15, the Jump Counter 602 is clocked over a lead in path 603 and the count thereof increased by one, except when count equals 15, in which case it is reset to count 12. The jump Counter signals the Instruction Logic over path 610 which signaling determines the number of program addresses to be jumped at the address 17 JMR instruction.

The next decoded address will be 16, generating a RTL, I, 4 instruction, resulting in the shifting of the 4 MSB of the DHU A Register 406 into the four least significant bits (LSB) of the DHU I Register 409, which is character packing.

The next decoded address is 17, generating a JMR (CRT) instruction, resulting in an unconditional program jump to address 03, 00, 01, or 20 depending upon the count of the Preloader Jump Counter 602. As the Jump Counter 602 (which counts characters received) started counting from a reset condition at the beginning of the Preloader program, and having executed address 15 once so far, the present count therein will be 1. This indicates that only the first character of the first word has been received thus far and results in an unconditional program jump to address 03, (via Ⓒ of FIGS. 15 and 16). Preloader program will then consecutively execute instructions of addresses 03, 04, 05, 06, and 07. However, since "character ready" bit is still a logic 1, (set to logic 1 level by TTC for approximately 4.5 milliseconds per character) the next decoded address will be 10, as opposed to 11 the first time through this sequence. Address 10 generates a JMR, −2 instruction, resulting in an unconditional program jump backward two positions to address 06. The Preloader program is now in another small loop "Waiting loop for each character to end," and will only exit when the control signal "character ready" for the first character returns to a logic 0 level. When this occurs, the Preloader program will advance to the second small loop labeled "-Waiting loop for starting each character" comprising addresses A11, A12, A13, A11, A12; and keeps running through this loop, exiting only when "character ready" for the second character becomes a logic 1 level as previously described for the first character.

Preloader program will continue to input and pack characters as described until the fourth character is received. At this time Preloader Jump Counter 602 will contain a count of 4, having been clocked once for each character received. As a result, when address 17 is reached for the fourth character, the sequence programs via Ⓐ of FIGS. 15 and 16 to the next decoded address 00 as opposed to 03 for the first three characters. The generated STI, R, X instruction results in the first word received, consisting of the first four received characters packed into the 16 bits of the DHU I Register 409, being stored in the DHU X Register 408. This first word is the "starting address" of the program being loaded by the Preloader, which for this description is assumed to be the TTY Loader program, having a starting address of $400_8$.

Preloader program now continues from address 00 and inputs and packs the next four characters as was done for word one. When address 17 of the fourth character of the second word is reached the sequence progresses via Ⓑ of FIGS. 15 and 16 to the next decoded address 01, as opposed to 00 for the first word, as Preloader Jump Counter 602 now contains a count of 8 having been clocked by eight received characters. The generated ADI, R, X instruction results in the addition of the first word received and the second word received. As the second word specifies the number of words to be stored, the result of the addition at address 01 is the "last address" of the program being loaded, which in the case of the TTY Loader program is $625_8$. This computed "last address" is stored in DHU U Register 415 by the next instruction STI, R, U at address 02.

Preloader program now continues from address 02 and inputs and packs the next four characters as previously explained for words one and two. When address 17 of the fourth character of the third word is reached, the next decoded address will be 20, as opposed to 01 for the second word, as Preloader Jump Counter 602 now contains a count of 12 having been clocked by 12 received characters. The generated STI, XG, 0 instruction results in the contents of the DHU I Register 409 (first data word of program being loaded) being stored in SMU Core Memory 501 via SHU DR 402 and MOB 427, Data Register 506, and Sense/Inhibit circuit 507 at the address specified by the contents of DHU X Register 408 (starting address of program being loaded). This address passes over path DHU AR 401, MAB 428, and SMU Registers 504 and 502, and Address Selector Decoders 505 and 503. At this point the first data word of program being loaded has been stored in memory.

The next decoded address is 21, generating an ADX, N, 1 instruction, resulting in the addition of 1 to the contents of the DHU X Register 408. This is incrementing the starting address in preparation for storing of following sequential data word brought in from the TTC. Next decoded address is 22, generating an LDA, R, U instruction, resulting in the contents of the DHU U Register 415 (i.e., the calculated address of the last word such as $624_8$) being loaded into the DHU A Register 406 in preparation for a comparison. Next decoded address is 23, generating a CMA, R, X instruction, resulting in the contents of the DHU A register 406 (calculated last address) being compared to the contents of the DHU X Register 408 (which is actual present address incremented by 1). Next decoded address is 24, generating a TEQ, Ⓒ instruction, resulting in testing if Equal Indicator in PCU Indicator Register 809 is on. Equal Indicator will only be on when last address of program being loaded equals next address to be accessed in Core Memory 501. As only first data word has been stored in memory at this time, equal indicator will not be on, resulting in a backward jump via Ⓒ on FIGS. 15 and 16 to address 03.

Preloader program will now continue on from address 03 and continue to input and pack characters and sequentially store resulting data words in memory as described, until last data word of program being loaded has been stored, and the equal indicator is turned on and detected at address 24. This causes next decoded address to be 25, as opposed to address 03 for previous data words, generating a HLT instruction, resulting in stopping of the processor with $25_8$ stored in the AR 401 of the DHU with bit lamps lit equivalent to $25_8$ and STOP lamp lit, indicating that entire program has been loaded into memory from TTY with no parity errors detected.

Preloader Logic Description

The following description will show how Preloader 116 generates the hardwired logic instruction at the logic level by referring to FIGS. 11–14. These four figures show all the logic of the Preloader 116 and all associated inputs and outputs.

Referring now to FIG. 11, CS input lead PLDOOF, also labeled $\overline{\text{AUTO LOAD}}$, will be at a logic 1 level before the "AUTO LOAD" button on MCP 101 is depressed. This results in a logic 0 out of power driver 1114 on lead labeled CLR which holds the latch flip-flop, NAND gates 1115 and 1116, and Jump Counter, flip-flops 1117–1120, in a cleared or reset condition. When the "AUTO LOAD" button on MCP 101 is depressed to begin operation, input lead PLDOOF becomes a logic 0, resulting in a logic 1 out of power driver 1114 removing the clear signal from the latch flip-flop and Jump Counter. The logic 0 on input lead PLDOOF also results in a logic 1 output from inverter 1107 which is one input to NAND gate 1108. The other input to NAND gate 1108 is input lead labeled STX-O1T which became a logic 1 when Master Clear Button on MCP 101 was depressed and State CTR 802 was cleared to a State 1 condition. With both inputs at logic 1 levels, the output of NAND gate 1108 is now a logic 0 which forces the output of power driver 1111 to be a logic 1. This is output Read-Restore lead labeled PR-ZOOF to the Timing and Control Circuit of FIG. 5 whereby the logic 1 level inhibits or "locks out" the SMU Timing and Control Circuit 508 which conditions SMU so that instructions from Core Memory 501 cannot be outputed to PCU IR 805.

The logic 0 output of NAND gate 1108 also forces the outputs of NAND gates 1101, 1103, and 1106 to logic 1 levels. The logic 1 output of NAND gate 1101 results in a logic 0 output from inverter 1102, which is output lead labeled RDY01F, indicating to PCU Control Logic 801 that Memory SMU is "ready." The logic 1 output of NAND gate 1103 results in a logic 0 output from inverter 1104, which is output lead labeled E0CO1F, indicating to PCU Control Logic 801 that Memory SMU is at an "end of cycle." The logic 1 output of NAND gate 1106 is output lead labeled MBZ01F indicating to PCU Control Logic 801 that Memory SMU is "not busy." These three output leads, path 606 (FIG. 6), allow PCU Control Logic 801 to condition DHU and SMU to store incoming data words in SMU Core Memory 501. The logic 0 output of NAND gate 1108 also forces output of inverter 1109 to be a logic 1 level over lead Enable 607 to Address Decoder 603, enabling one input each of NAND gates 1217–1220.

The arrival of the logic 1 level on lead Enable 607 allows Address Decoder 603 to decode an address as determined by the bits 0–4 content of DHU AR 401. The true outputs of the 5 LSB (least significant bits) of the DHU AR 401 are sent to Preloader 116 via path 430B (labeled Data Path 115 in FIG. 1) and are input leads labeled ARB00T–ARB04T of FIG. 12. At this time DHU AR 401 contains all zeros so all five inputs to inverters 1201–1205 are at logic 0 levels. The inverter outputs labeled $\bar{A}$, $\bar{B}$, $\bar{C}$, $\bar{D}$, and $\bar{E}$ are therefore each at logic 1 level, resulting in all inputs of NAND gates 1216 and 1220 being logic 1, forcing their outputs to logic 0. These two outputs are inverted by inverters 1227 and 1231 resulting in logic 1 levels on leads labeled Y1A and X1. These two leads are common inputs only to NAND gate 1253 resulting in a logic 0 output on lead labeled AOO and logic 1 outputs on all addresses (A01–A24). The logic 0 on lead A00 is a common input to NAND gates 1307, 1312, 1317, 1321, 1403, 1427 and 1431 of FIGS. 13 and 14 resulting in logic 1 levels at their outputs. These outputs are inverted by inverters 1308, 1313, 1318, 1322, 1404, 1428 and 1432 to logic 0 levels. The outputs of inverters 1310, 1408, 1411, 1414, 1416, 1418, 1420, 1422, and 1424 will be logic 1 levels at this time as a result of addressed A01–A24 and outputs of Jump Counter CTO, CT1, and CT235 being a logic 1 levels. It should be observed at this time that the outputs of the Jump Counter can only alter the generation of an instruction when address A17 is decoded, as the logic 0 output of inverter 1135 inhibits the NAND output gates 1131–1134 at all other addresses.

The outputs of inverters, labeled LIBOOF–LIB15F, are the 16 data bits of the hardwired logic instructions sent to PCU IR 805 via path 609 labeled LIB and PCU OR gates 901. Before being entered into the PCU IR 805, the 16 data bits are inverted by PCU logic, resulting in a first instruction, as a result of address A00, of | 1 | 0 1 1 1 1 | 0 0 | 0 0 0 0 | 0 0 1 1 | (bit 15 at left). This is recognized and acted upon by the PCU Control Logic 801 as the STI, R, X instruction at address 00 of Preloader Flowchart FIG. 15 as previously explained in the Preloader Box Diagram Description, During the actual execution of the STI, R, X instruction (State 5C) the input lead labeled STX01T will return to a logic 0 level, temporarily inhibiting Address Decoder 603. When State CTR 802 again reaches State 1 condition and input lead STX01T becomes logic 1 level, Address Decoder 603 is again enabled and will decode address A01 as a result of the DHU AR 401 having been incremented by 1. The Preloader Instruction Logic (FIGS. 13 and 14) now generates an ADI, R, X instruction in a similar manner as just described for the first instruction.

This process of decoding addresses and generating hardwired logic instruction for the remaining Preloader operation is accomplished in a similar manner as just described with the exception of decoded addresses A15–A–17 which clock, and are altered by, Jump Counter 602. Referring again to FIG. 11, the Jump Counter consists of four flip-flops 1117–1120 and associated output NAND gates 1121–1133. Jump Counter counts in binary when clocked; with flip-flops 1117–1120 binary weighted $2^0$ -$2^3$. The fact that flip-flop 1120 has its logic input (D) tied to logic 1 level and flip-flop 1119 has the output of feedback NAND gate 1121 as its logic input results in resetting to count 12, rather than count 0, when Jump Counter is clocked with count of 15. Clocking of Jump Counter is accomplished each time an address A15 is decoded and output of NAND gate 1240 goes to logic 0 level. The logic 0 is sent to input of inverter 1112 whose output is forced to logic 1 and is one input to NAND gate 1113. The other input to gate 1113 will be a logic 1 as will now be explained.

Address decoding, which is accomplished during State 1 as previously explained, results in input lead labeled RRZ01F from Control Logic 801 becoming a logic 0. This logic 0 is inverted to logic 1 by inverter 1110 and its output labeled RR is the other input to NAND gate 1113, resulting in a logic 0 output which goes to latch flip-flop NAND gate 115 causing latch flip-flop to set. The resulting change in logic level at the output of NAND gate 1115 from logic 0 to logic 1 is sent to the clock input (C) of flip-flop 1117, and, because it was previously reset by CLR lead, will cause it to set, resulting in count of 1 in Jump Counter. The resulting logic 0 from the $\bar{Q}$ output of flip-flop 1117 on lead labeled $\bar{F}$ is a common input to NAND gates 1122–1125 causing their outputs to become logic 1 levels. The logic 1 output of NAND gate 1125 is inverted to logic 0 by inverter 1126 and is an input to NAND gate 1129, resulting in the logic 1 level from its output which is an input to NAND gate 1133. As all inputs to NAND gates 1127 and 1128 are logic 1 level, coming from outputs of NAND gates 1122–1124, their outputs will be logic 0 levels and are one input each to NAND gates 1131 and 1132. As output of inverter 1135 is a logic 0 at this time the logic 1 inputs to NAND gates 1133 and 1134 are inhibited and all outputs of NAND gates 1131–1133 remain at logic 1 levels. Next address to be decoded is A16 resulting in a logic 0 output from NAND gate 1239 which is sent to latch flip-flop NAND gate 1116 causing latch flip-flop to reset, in preparation for the next decoded address A15. Next address to be decoded is A17 resulting in a logic 0 output from NAND gate 1238 which is sent to inverter 1135 whose output goes to logic 1 level and is a common input to NAND gates 1131–1133. Output of NAND gate 1133 labeled CT235 now becomes logic 0. The logic 0 output of NAND gate 1238 labeled A17 is a common input to NAND gates 1314, 1405, and 1409 resulting in logic 0 outputs from inverters 1318, 1408, and 1411. The logic 0 output of NAND gate 1133 labeled CT235 is a common input to NAND gates 1304, 1421, and 1423 resulting in logic 0 outputs from inverters 1308, 1422, and 1424. As outputs of inverters 1310, 1313, 1322, 1404, 1414, 1416, 1418, 1420, 1428, and 1432 are logic 1, the generated instruction from decoded address A17 with Jump Counter count of 1 after inversion by PCU logic will be 1 0 0 1 0 0 1 1 0 0 0 0 1 1 0 0. This is recognized and acted upon by the PCU Control Logic 801 as a JMR, $-14_H$ instruction resulting in an unconditional program jump backward to address 03. It can now be seen that each time an address A17 is decoded the amount of addresses to be jumped by the JMR (CTR) instruction is determined by the count contained in the Jump Counter.

When the last data word of program being loaded has been stored and address A25 is decoded and a HLT instruction generated and executed, the logic 0 level which has been maintained on input lead PLDOOF during the entire Preloader operation is removed and replaced with a logic 1 level. This results in clearing of the Jump Counter 602 and inhibiting of Address Decoded 603 from further operation until "AUTO LOAD" button is again depressed to begin another Preload operation.

MORE DETAILED DESCRIPTION OF CERTAIN PRELOADER ARRANGEMENTS

When address 01101 is received over path 430B resulting in address lead 15 being uniquely marked (as a result of a first paper tape character having been received), the Jump Counter is prepared to be set. When the next address 01110 is received, resulting address lead 16 being uniquely marked, the Jump Counter is set to a count of 1 by the setting of flip-flop 1117 to indicate one character received.

When address 01111 is received, resulting in lead A17 being uniquely marked by logic 0, path 610 will be enabled to provide a selective jump; i.e., a jump from the present address to a variable number of addresses dependent upon the number of characters already received as evidenced by the count contained in the Jump Counter with the following four alternatives:

1. If the counts are 1, 2, 3, 5, 6, 7, 9, 10, 11, 13, 14 and 15, a jump will always be made backward to address 03 for the purpose of inputting the next character.
2. If the count is 4, jump will be made backward to address 00 to store the first word of the loader program in the X Register 408 of DHU.
3. If the count is 8, jump will be made backward to address 01 to enable the PCU and DHU to add the contents of the X Register 408 to the contents of the I Register (i.e. the number of words in the loader program) for the purpose of computing the address of the last word which will be stored in the U Register 415 at address 02.
4. If the count is 12, a jump forward of one step to address 20 will be made to store the word which was packed in the I Register 409 of DHU in the SMU, the beginning word being at the address specified by the contents of the X Register, which becomes incremented by 1 for storage of each word thereafter.

In the idle state (not preloading), the CS signal PLDOOF is in the logic 1 state whereby the output of 1114 is logic 0 whereby 1115 is in the logic 0 state, and 1116 is in the logic 1 state and flip-flops are reset over lead labeled CLR. When preloading is initiated, PLDOOF goes to logic 0 whereby the output of 1114 goes to logic 1 whereby the reset or CLR signal is removed from the latch flip-flop 1115 and 1116 and flip-flops 1117–1120. It should be observed that flip-flops 1117–1120 are D type flip-flops.

With the $C_D$ terminal the reset terminal, a logic 0 on the $C_D$ terminal resets the flip-flop to logic 1 on the $\bar{Q}$ output terminal. The $\bar{Q}$ output terminal is tied back to the D input terminal, as well as to succeeding circuitry whereby a signal going from logic 0 to logic 1, i.e. a positive going signal on the clock terminal C causes the flip-flop to alternately flip one way and then the other. The flip-flops are weighted 1, 2, 4, 8 from left to right. Flip-flop 1120 operates to the state of logic 0 on the $\bar{Q}$ output at count of 8 and remains set to this position until the $C_D$ reset, inasmuch as its D terminal is tied via resistor 1120A to $Vcc$. Because of gate 1121 connected as shown, flip-flop 1119 operates to the logic 0 output on $\bar{Q}$ at the count of 4; operates to the logic 1 on the $\bar{Q}$ output at the count of 8; operates to the logic 0 output on the $\bar{Q}$ output at the count of 12; and remains in this position until reset. This arrangement allows the jump counter to count to 15 (decimal) and thereafter count 12–13–14–15–12–13–14–15, etc. until all characters have been received from teletype paper tape.

Following is a chart showing operation of the jump counter, etc. during receipt of characters from the teletype paper tape:

| Word | Char. | Add. | Gate 1115 | (1) FF 1117 | (2) FF 1118 | (4) FF 1119 | (8) FF 1120 | Dec. Cnt. | Reaction at A17 | Purpose |
|---|---|---|---|---|---|---|---|---|---|---|
| 1 | 1 | A15 | 1 | 0 | | | | 1 | | |
| | | A16 | 0 | | | | | | | |
| | | A17 | | | | | | | JMP to A03 | Bring in next character. |
| | 2 | A15 | 1 | 1 | 0 | | | 2 | | |
| | | A16 | 0 | | | | | | | |
| | | A17 | | | | | | | JMP to A03 | Do. |
| | 3 | A15 | 1 | 0 | | | | 3 | | |
| | | A16 | 0 | | | | | | | |
| | | A17 | | | | | | | JMP to A03 | Do. |
| | 4 | A15 | 1 | 1 | 1 | 0 | | 4 | | |
| | | A16 | 0 | | | | | | | |
| | | A17 | | | | | | | JMP to A00 | Store 1st word of loader program (In DHU). |
| 2 | 5 | A15 | 1 | 0 | | | | 5 | | |
| | | A16 | 0 | | | | | | | |
| | | A17 | | | | | | | JMP to A03 | Bring in next character. |
| | 6 | A15 | 1 | 1 | 0 | | | 6 | | |
| | | A16 | 0 | | | | | | | |
| | | A17 | | | | | | | JMP to A03 | Do. |
| | 7 | A15 | 1 | 0 | | | | 7 | | |
| | | A16 | 0 | | | | | | | |
| | | A17 | | | | | | | JMP to A03 | Do. |
| | 8 | A15 | 1 | 1 | 1 | 1 | 0 | 8 | | |
| | | A16 | 0 | | | | | | | |
| | | A17 | | | | | | | JMP to A01 | Store 2nd word of loader program (In DHU). |
| 3 | 9 | A15 | 1 | 0 | | | | 9 | | |
| | | A16 | 0 | | | | | | | |
| | | A17 | | | | | | | JMP to A03 | Bring in next character. |
| | 10 | A15 | 1 | 1 | 0 | | | 10 | | |
| | | A16 | 0 | | | | | | | |
| | | A17 | | | | | | | JMP to A03 | Do. |

| Word | Char. | Add. | Gate 1115 | (1) FF 1117 | (2) FF 1118 | (4) FF 1119 | (8) FF 1120 | Dec. Cnt. | Reaction at A17 | Purpose |
|---|---|---|---|---|---|---|---|---|---|---|
| | 11 | A15 | 1 | 0 | | | | 11 | | |
| | | A16 | 0 | | | | | | | |
| | | A17 | | | | | | | JMP to A03... | Bring in next character. |
| | 12 | A15 | 1 | 1 | 1 | 0 | | 12 | | |
| | | A16 | 0 | | | | | | | |
| | | A17 | | | | | | | JMP to A20... | Store 1st instruction of loader program (In SMU). |
| 4 | 13 | A15 | 1 | 0 | | | | 13 | | |
| | | A16 | 0 | | | | | | | |
| | | A17 | | | | | | | JMP to A03... | Bring in next character. |
| | 14 | A15 | 1 | 1 | 0 | | | 14 | | |
| | | A16 | 0 | | | | | | | |
| | | A17 | | | | | | | JMP to A03... | Do. |
| | 15 | A15 | 1 | 0 | | | | 15 | | |
| | | A16 | 0 | | | | | | | |
| | | A17 | | | | | | | JMP to A03... | Do. |
| | 16 | A15 | 1 | 1 | 1 | | | 12 | | |
| | | A16 | 0 | | | | | | | |
| | | A17 | | | | | | | JMP to A20... | Store 2nd instruction of loader program (In SMU). |
| | 17 | A15 | 1 | 0 | | | | 13 | | |
| | | A16 | 0 | | | | | | | |
| | | A17 | | | | | | | JMP to A03... | Bring in next character. |
| | 18 | A15 | 1 | 1 | 0 | | | 14 | | |
| | | A16 | 0 | | | | | | | |
| | | A17 | | | | | | | JMP to A03... | Do. |
| | 19 | A15 | 1 | 0 | | | | 15 | | |
| | | A16 | 0 | | | | | | | |
| | | A17 | | | | | | | JMP to A03 | Do. |
| | 20 | A15 | 1 | 1 | 1 | | | 12 | | |
| | | A16 | 0 | | | | | | | |
| | | A17 | | | | | | ETC. | JMP to A20 | Store in 3rd instruction of loader program (In SMU). |

DATA TRANSFER UNIT OPERATION (FIG. 2)

The Data Transfer Unit or DTU–1 (FIG. 2) is a random access memory device that is used to control and monitor all peripheral equipment associated with the NX-1E System. This peripheral equipment includes, relays, teletype units, magnetic tape units, keyboard and associate visual display unit, etc. All address, data and control information needed to operate the DTU come from the MUX (FIG. 3). Information comes to the DTU from the MUX in the form of low voltage current pulses. These current pulses are detected by the pulse transformer circuits in the DTU word address sense amplifiers 211, SMR data sense amplifiers 206, and function control sense amplifiers comprising SMR reset sense amplifying 219 and RT strobe sense amplifiers 217. Information also goes from the DTU to the MUX as current pulses. These current pulses originate at the DTU RT data drivers 204 and are detected by the pulse transformer circuits in the MUX RT data sense amplifiers 301 (FIG. 3). Using pulse transformers and current drivers to establish communication between the MUX and DTU provides DC isolation between the data transfer and multiplexer units. Because of this DC isolation, the high voltage transients caused by relay operation and the voltage fluctuations of the DTU power source are not easily reflected into the MUX, PCU and DHU logic circuits.

The DHU can be divided into four basic areas. These areas and their function are as follows:

1. The address selection circuits consists of the word address sense amplifiers 211 and the word line decoder 213. Address selection selects 1 of 64 DTU words designated 0–64.
2. RT data circuits transfer data from peripheral devices to the MUX. These circuits consist of RT matrix 202 and RT data drivers 204.
3. SMR data circuits transfer data from the MUX unit to peripheral devices. These circuits consist of SMR data sense amplifiers 206 and SMR matrix 208.
4. DTU–1 function control circuits, comprising SMR reset sense amplifiers 219 and RT strobe sense amplifiers 217, control the flow of data through the DTU.

DTU OPERATIONAL DESCRIPTION

Assume that it is desired to transfer data from the MUX (FIG. 3) to a device connected to DTU–1 (FIG. 2) word 0, for example. The data word to be transferred contains 16 bits of data. Address information will be sent to the DTU specifying which DTU word will be used to store the data, i.e. word O for example. Sixteen leads X1–X8, Y1–Y8 are connected over paths 321 and 210 from the MUX word address drivers 304 to the DTU–1 word address sense amplifiers 211. These 16 leads carry the word address information from the MUX to the DTU in a 1 out of 8 by 1 out of 8 selection (abbreviated ⅛ × ⅛). For any one of the 64 possible word addresses in the DTU there will be a distinct pair of the 16 leads activated. The two leads that are activated by the MUX word address drivers 304, turn on two of the corresponding DTU word address sense amplifiers 211. These word address sense amplifiers 211 are connected to the word line decoder 213 inputs. The two active inputs to the word line decoder 213 are decoded to select 1 out of the 64 possible DTU words, or word 0 in this example.

The SMR data word now enters the DTU. The data word is in the form of current pulses coming from the MUX SMR data drivers 306 over paths 323 and 210. For each of the data leads that are activated by the MUX SMR data drivers 306, a corresponding SMR data sense amplifier 206 in the DTU will be turned on. The outputs of the data sense amplifiers 206 are stored in the selected word (word O in the present example) of the SMR matrix 208 i.e., for each of the SMR data sense amplifiers 206 that turns on, a corresponding bit in the selected word of the SMR matrix of the selected DTU will present a ground to the equipment reached over paths 209 and 104. Notice that both the RT matrix 202 and SMR matrix 208 receive the word line select from the word line decoder 213. However, the DYU-1 function control 219 comprising the SMR reset sense amplifier provides an enable to the SMR matrix 208 only, since the selected operation is a data transfer from the MUX to some peripheral device.

If the selected operation was a transfer of data from some peripheral device to the MUX unit, the DTU-1 function control 217 comprising the RT strobe sense amplifier would be conditioned to enable the RT matrix only. The address selection works exactly the same regardless of which data transfer operation is selected. The data that is to be transferred from the peripheral device to the MUX unit must be present at the selected RT matrix word prior to starting the data transfer. When the word line select comes into the RT matrix 202 from the word line decoder 213, the data input to the selected word in the RT matrix 202 is ready to be transferred to the RT data drivers 204. An RT signal from RT strobe sense amplifier 217 to the RT data drivers 204 effects transfer of data from the RT matrix to the RT data drivers 204. One RT data driver is activated on for each ground input at the RT matrix 202. Each of the RT data drivers 204 which is activated turns on the corresponding one of the RT data sense amplifiers 301 in the MUX unit.

MUX UNIT DESCRIPTION (FIG. 3)

The MUX Unit (FIG. 3) performs the address decoding, interfacing, and timing functions needed to transfer data between the DTU (FIG. 2) and the DHU (FIG. 4). The address decoding logic in the MUX Unit can direct the data flow to and from any one of the 512 (8 × 64) available DTU addresses. The interface circuits in the MUX Unit interface the (+5 volt) integrated circuit logic of the DHU (FIG. 4) and PCU (FIGS. 8–10) to the current controlled circuits in the DTU (FIG. 2). The Mux Unit timing circuits provide the timing signals necessary to sequentially move data between the DTU and DHU.

There are three paths or groups of conductors connecting the MUX Unit to the DHU (i.e., ARB, DRB, and IDB), and a path (106 of FIG. 1) connecting the MUX to the PCU including CS conductors from the PCU to the MUX and conductors of path 339 from the MUX to the PCU. The description and purpose of each of the groups follows:

ADDRESS REGISTER BUS (ARB) PATH

This path or group of lines designated 430A contains 11 bits of address information. This address information is needed for both processor input data word (IDW) instructions or operations and processor output data word (ODW) instructions or operations (ODW). This address information is in the following format which is received in a single address register as follows but which is shown in FIG. 3 as four registers 302, 312, 307, and 308.

| 10 | 9 | 8 | 7 | 6 | 5 | 4 | 3 | 2 | 1 | 0 |
|---|---|---|---|---|---|---|---|---|---|---|
| ① | ② | ③ | | | ④ | | | | | |

① This bit of the address information is stored in the MUX SMR register 308 on both IDW and ODW processor instructions. However, this bit in the address information is set to a logic "1" only when an ODW instruction is to be executed. When the SMR register 308 is set to a logic "1" condition, all DTU function control circuits for DTUs 1–8 are conditioned over conductor 332 to transfer data from the DHU to the DTU. Only the selected DTU, however, will receive the data. This bit on lead 332 also conditions the sequencer circuit 315 and the control circuit 314 for SMR operation.

② This bit of the address information is stored in the MUX RT register 307 on both IDW and ODW processor instructions. However, this bit in the address information is set to a logic "1" only when an IDW instruction is to be executed. When the RT register 307 is set to a logic "1," all DTU function control circuits for DTUs 1–8 are conditioned over conductor 329 to transfer data from the DTU to the DHU. Only data from the selected DTU will be transferred, however. This bit on lead 329 also conditions the sequencer circuit 315 and the control circuit 314 for RT operation.

③ These bits of the address information are stored in the MUX DTU address register 312. Three corresponding signals go from the DTU address register over three leads in path 325 to the DTU address decoder 311. The DTU address decoder 311 converts the 3-bit input code into a one out of eight selection enable. Since only one of the eight lines 326A–326H out of the DTU address decoder is enabled, only one of the DTU function control circuits, DTU-1 through dTU-8 such as DTU-1 designated 309, will be selected. If DTU-1 function control 309 is selected, only DTU-1 can receive the SMR, RS, RT control signals necessary to transfer data between the MUX and DTU. The following table lists the DTU address register contents and the corresponding DTU selection:

| DTU Address Register Bit-8 | Bit-7 | Bit-6 | DTU Selection |
|---|---|---|---|
| 0 | 0 | 0 | DTU-1 |
| 0 | 0 | 1 | DTU-2 |
| 0 | 1 | 0 | DTU-3 |
| 0 | 1 | 1 | DTU-4 |
| 1 | 0 | 0 | DTU-5 |
| 1 | 0 | 1 | DTU-6 |
| 1 | 1 | 0 | DTU-7 |
| 1 | 1 | 1 | DTU-8 |

④ These bits of the address information are stored in the MUX word address register 302. Six corresponding output bit signals go from the word address register 302 over six leads in path 319 to the word address decoder 303 where bits 0, 1 and 2 are decoded to provide a one of eight (X) enable and bits 3, 4, and 5 are decoded to provide a one of eight (Y) enable in a ⅛ × ⅛ code over path 320 comprising conductors X1–X8 and Y1–Y8 to the word address drivers 304. Y1–there are two word address drivers 304 enabled, one X driver and one Y driver, for each possible combination of logic "1's" and logic "0's" present at the word address decoder 303 input. The 16 lines out of the word address driver 304 go over paths 321 and 210 to the DTU word address sense amplifier 211. Two of the 16 lines, one X and one Y, will be activated when any of the 64 possible DTU word addresses are referenced. The word address drivers also go to all other DTU's as indicated by the multiple sign in FIG. 2. However, only the selected DTU will use the word address information.

DATA REGISTER BUS (DRB) PATH

This group of lines contains 16 data bits. The lines contain the data that is to be transferred, from the DHU (FIG. 4) to the DTU (FIG. 2), 2), when the processor executes an ODW instruction. If and ODW instruction is executed by the processor, the 16 data bits present at the SMR inputs to the MUX data register 305 are stored in the data register 305. The 16 data register 305 outputs are connected to the SMR data drivers 306. For each data register bit that is set to a logic "1, " the corresponding SMR data driver 306 is enabled. The SMR data drivers do not turn on, however, until a later time determined by the sequencer 315. The SMR data drivers 306 outputs go to all DTUs but only the selected DTU stores the data.

INPUT DATA BUS (IDB) PATH

This group of lines contain 16 data bits. These lines contain the data that is being transferred, from the DTU (FIG. 2) to the DHU (FIG. 4) via the MUX data register 305 when the processor is executing an IDW instruction. The data register 305 receives 16 bits of data from the RT data sense amplifiers 301. The inputs to the RT data sense amplifiers 301 are connected to all DTU's but only the selected DTU can send data.

CONTROL SIGNAL PATHS CS, ETC. BETWEEN PCU AND MUX

This group of leads contain the following control signals between the PCU (FIG. 8) and the MUX (FIG. 3):

Control Leads From MUX Control Circuit 314 to Control Logic 801

Ready-M: (Ready MUX)
Ready-D: (Ready Data)

Control Leads From Control logic 801 to MUX Control Circuit 314

CS Start: Starts the MUX clock
CS Clear: Clears out the SMR or RT bit when master clear button on MCP is depressed.
CS Time-Out: If PCU does not receive the Ready-M of Ready-D signal within the specified time, PCU sends a signal over this time-out lead to the MUX control circuit which resets the SMR or RT register and causes the MuX to withhold the Ready-M signal until the trouble has been cleared or until the MUX has been cleared by operation of the master clear button.

These control signals are necessary to maintain synchronous data flow between the DTU (FIG. 2) and the DHU (FIG. 4). For example, a start signal CS from PCU control logic 801 goes to MUX control circuit 314, control 314 starts the clock 313 which in turn starts the sequencer 315. The sequencer 315 provides the timing pulses which move data through the MUX unit.

The aforementioned control and sequencing of data via MUX between DTUs and DHU is effected by the circuitry in the lower right of FIG. 3.

the control circuit 314 receives and sends signals between MUX and PCU over the leads just described. The control circuit starts and stops the clock 313 which then controls the control circuit 314 and the sequencer 315. The control circuit 314 and sequencer 315 control various elements of the MUX via C and S leads as shown.

The sequences for the SMR operation and for the RT operation including stopping and starting of the PCU and MUX clocks are outlined as follows:

SMR Operation Sequence

1. PCU, as a result of an ODW instruction, effects the presentation to MUX registers 302, 312, 307 and 308 over path ARB of address information; and to MUX registers 305 over path DRB of SMR data information.
2. Observing a MUX ready signal on the READY-M lead from the MUX control circuit 314, PCU sends a start signal over one CS start lead to control circuit 314.
3. Upon observing removal of the MUX ready signal from the READY-M lead, PCU stops its clock 804 interrupting its program, and over another CS-Start lead to control circuit 314 sends another start signal enabling the control circuit 314 simultaneously to generate pulses on the C2 (ARB → AR) and C4 (DRB → DR) leads and to start the MUX clock 313 over path 335.
   C2 (ARB → AR) Address data from the DHU address register. AR of 401 is loaded over ARB path 430A into MUX registers 302, 312, 307, and 308. The data in the DTU Address Register 312 is decoded by the DTU Address Decoder 311 which determines which of the DTU's 1–8 will be used. The data in the SMR register 308 and in the RT register 307 determines which operation, output or input, will be performed; in this case SMR. The data in the address Word Address Register 302 is decoded by the Word Address Decoder 303 which determines which of the 64 addresses 0–63 in the selected DTU will be used.
   C4 (DRB → DR) Data from the DHU data register DR of 402 is loaded over DRB path 431 into MUX data register 305.
4. The first MUX Clock Pulse causes the sequencer 315 to generate the following signal:
   S1 (Core Reset RS) An inhibit current is sent to all DTUs that were not selected by the DTU Address Decoder 311. This inhibit current goes out to the DTU's as the RS signal over path 327 and inhibits the word address sense amplifier and SMR data sense amplifier circuits of all DTU's not selected.
   S2 (WAD to WDR) Gate the word address decoder output 320 to the word address driver 304. Word address current pulses are sent to all DTU's. However, only the selected DTU will receive the address information because all other DTU's have an inhibit current present.
6. The third MUX clock pulse generates the following signals:
   S3 (Reset SMR) This signal is present at all DTU function control circuits but only appears at the selected DTU function control output. The signal output is called SMR and is used to reset the latch circuits of the SMR word of the SMR matrix such as 208 specified by the MUX Word Address Decoder 303.

7. The fourth MUX clock pulse generates the following signals:
   S4 (DR to SDD) The data in the MUX data register 305 is gated to the SMR data drivers 306. The current pulses out of the SMR Data drivers 306 are sent to all DTU's but only the selected DTU will receive the data because all other DTU's have an inhibit current present.
8. The fifth MUX clock pulse generates the following signals:
   S1 (Core Reset) The core reset pulse is generated again but this time, only the the selected DTU receives the signal. The core reset is used in the selected DTU such as DTU–1 to condition the DTU word address sense amplifier circuit 211 and SMR data sense amplifier circuits 206 for the next operation.
9. The 13 microsecond MUX cycle is now complete. The clock 313 signals the control circuit 314 which by a common signal stops the MUX clock 313 and, over Ready-M path 337 signals control circuit 801 which starts the PCU clock 804 whereby the PCU continues with its program and whereby the PCU is signaled that the MUX is idle, ready for any new command. The control circuit 314 also generates the following signal:
   C3 (CLR DR) The MUX data register 305 is cleared at the end of any MUX cycle.

RT Operation Sequence

1. PCU at the point in its program when it is ready, as a result of the receipt and processing of an IDW instruction, effects the presentation to MUX registers 302, 312, 307 and 308 over path ARB of address information.
2. Observing a MUX ready signal on the Ready-M lead from circuit 314, PCU sends a start signal over the CS start lead to control circuit 314 which enables the control circuit 314 simultaneously to generate a pulse on the C2 (ARB–AR) lead and to start the clock 313 over path 335, and to remove the MUX ready signal from the Ready-M lead.
   C2 (ARB–AR) Same as for SMR except that data in RT and SMR registers will indicate RT operation.

Observing the removal of the MUX ready signal from the Ready-M lead, the PCU stops its clock 804, interrupting its program.

3. The first MUX clock pulse causes the sequencer 315 to generate the following signals:
   S6 (CLR DR) The MUX data register 305 is cleared in preparation to receive data from the DTU.
   S1 (Core Reset) An inhibit current is sent to all DTU's that were not selected by the DTU address decoder 311. This inhibit current goes out to the DTU's as the RS signal over path 327 and inhibits the word address sense amplifier and SMR data sense amplifier circuits of all DTU's not selected.
4. The second MUX clock pulse generates the following signals:
   S2 (WAD WADR) Gate the word address decoder output 320 to the word address drivers 304. The word address current pulses are sent to all DTU's. However, only the selected DTU will receive the address information since the other DTU's have inhibit currents present. The bits of selected RT word of the RT matrix 202 will be extended over path 203 to the RT data drivers circuit 204.
5. The third MUX clock pulse generates the following signals:
   S5 (STROBE RT) This signal which only goes to the selected DTU, reads the data out of the DTU RT drivers circuit 204 over path 205 to the MUX RT data sense amplifier circuit 301.
6. The fourth MUX clock pulse generates the following signals:
   S7 (RDS → DR) Gates the data sense amplifier circuit output over path 317 into the data register 305.
7. The fifth MUX clock pulse generates the following signals:
   Si (Core Reset) This signal only goes to the selected DTU and is used to reset the address and data cores in the DTU sense amplifier circuits.
8. After 7 ½ microseconds of the MUX clock cycle wherein the foregoing has occurred the control circuit places a signal over the Ready D lead 337A to the control logic 801 enabling the control logic 801 to start the PCU clock 804 which effects the transfer of the RT information from the MUX register 305 to the DHU memory register 403 as part of the IDW instruction.
9. At the end of the 13- microsecond MUX clock cycle the following signals are generated:
   Ready M (337) The ready signal is sent to the processor control circuit 801 over ready M lead 337, indicating that the MUX unit is ready for a new command.
   C3 (CLR DR) This signal clears the MUX data register 305 in preparation for the next operation.

Resume of Stopping the PCU Clock for MUX Operation

1. PCU, as a result of an output data word (ODW) instruction, effects presentation of information from address register AR of DHU over path ARB to the MUX address register having portions 302, 312, 307, and 308; and effects presentation of information from data register DR of DHU over path DRB to MUX data register 305.
2. PCU observing a MUX ready signal on the Ready-M lead from control circuit 314, sends a start signal over the CS start lead which enables control circuit 314 to start the MUX clock 313 and remove the MUX ready signal.
3. Observing the removal of the MUX ready signal from the Ready-M lead, PCU stops its clock, interrupting its program.
4. MUX, during the 13-microsecond MUX clock cycle, effects the SMR word command via the DTU to the magnetic tape transport, for example, which causes the tape to run, presenting an RT word to the DTU. This takes more than the 13 microseconds, however.

5. MUX, at the end of its 13-microsecond clock cycle, by a common signal stops the MUX clock and over the Ready-M path 337 starts the PCU clock, whereby the PCU continues with its program.
6. PCU, at the point in its program when it is ready, as a result of the receipt and processing of an IDW instruction effects the storage in the MUX address register over path ARB of address information.
7. PCU by a common signal stops its clock 804 and starts MUX clock 313 over CS start lead.
8. MUX, during the first 7½ microseconds of the 13-microsecond MUX clock cycle effects the RT word transfer from the RT matrix via the data drivers 205 and the sense amplifiers 301 to the MUX data register 305.
9. MUX, at the end of the first 7½ microseconds of the MUX clock cycle, by a signal over ready data path Ready-D, labeled 337A, starts the PCU clock which, as part of the IDW instruction, effects the transfer of the RT information from the MUX register 305 to the DHU memory register DR 403 and from this register to A Register 406.
10. The MUX clock is allowed to run out its 13-microsecond cycle effecting no function while it is running out.
11. At the end of the 13-microsecond cycle, control circuit 314 clears the MUX data register 305 and sends the MUX ready signal over Ready-M lead, preparing for the next RT operation.

Additional Detail of Teletype Paper Tape Arrangements

The teletype paper tape contains eight parallel channels for holes beside the small sprocket hole. The eight channels comprise channels 1–7 for bits 0–6 in ASCII Code and channel 8 for the even parity bit.

Information and Control Flow From Teletype Controller to RT Matrix

A 16-lead bus extends from the teletype controller machine to the 16 cells of the associated RT word of the RT matrix such as 202 of FIG. 2, for example word O.

The teletype controller machine converts the tape holes to electrical signals with bits 0–7 as found on the paper tape impressed as electrical high (logic "1") and low (logic "0") signals on the first eight leads. The teletype controller generates and impresses electrical high and low control signals on the next four leads. The remaining four leads are not used for transmission from the tape controller to the RT matrix. Accordingly these last 4 bits of the 16-bit RT word will always be logic "0' s."

Following is a chart of these leads and bits:

| Lead | Bit | Function |
|---|---|---|
| 1 | 0 | Data |
| 2 | 1 | Data |
| 3 | 2 | Data |
| 4 | 3 | Data |
| 5 | 4 | Data |
| 6 | 5 | Data |
| 7 | 6 | Data |
| 8 | 7 | Even Parity Bit |
| 9 | 8 | Parity Error |
| 10 | 9 | Send Ready |
| 11 | 10 | Character Ready |
| 12 | 11 | Open Line |
| 13 | Vacant | |
| 14 | Vacant | |
| 15 | Vacant | |
| 16 | Vacant | |

Bits 0–11 are received in the RT-word and "0's" always occupy the last four cells of the RT word. These 16 bits are loaded via the MUX into the memory register MR in the DHU and from thence into the A Register 406.

Similar arrangements are used for reception of information and control signals from other equipments of the system.

When the input data word(IDW) instruction is being executed by the PCU-DHU combination relative to inputting paper tape information and control signals by use of the preloader, the bits from the RT-word are repeatedly brought into the MR Register, from thence into the A Register, and from thence into the Arithmetic and Logic Unit where certain logic control bits are observed as follows. The 10th bit (character ready) is inspected until the logic "1" therein apprises the PCU-DHU combination that a character has been received. Thereupon the PCU-DHU combination checks the parity error bit 8 for error. Assuming no error, bits 0–15 of the A Register are loaded into the DR register and shifted 12 places to the left. The contents of the DR register are then loaded into the A Register. For rotating purposes, the contents, of A are loaded in DR; the contents of 1 into MR; and a rotation of four places to the left is effected. Thereupon the contents of the DR is loaded into A and the contents of MR into 1. This process is repeated for the next three characters, whereby the word is packed in the I Register. Thereupon the word is loaded as follows:

If first word — loaded into X register.

If second word — receives arithmetic and logic treatment and becomes stored in U register.

If third or succeeding word — becomes loaded into SMU.

Information and Control Flow From SMR-Matrix To Teletype Controller

The following bits are transmitted from the 16 cells of the SMR word in the SMR matrix, such as word "0," for example, 202 via the 16 leads to the teletype controller machine, enabling the tape transport machine to print out a tape as required.

| Lead | Bit | Function |
|---|---|---|
| 1 | 0 | Data |
| 2 | 1 | Data |
| 3 | 2 | Data |
| 4 | 3 | Data |
| 5 | 4 | Data |
| 6 | 5 | Data |
| 7 | 6 | Data |
| 8 | 7 | Parity |
| 9 | 8 | Interrupt Reset |
| 10 | 9 | Processor Break |
| 11 | 10 | Send Command |
| 12 | 11 | Ignore Character Return to Line Feed |
| 13 | 12 | Break Release |
| 14 | Vacant | |
| 15 | Vacant | |
| 16 | Vacant | |

Similar arrangements are used for transmission of information and control signals to other equipments of the system.

Additional Detail of Magnetic Tape Arrangements

The magnetic tape contains seven parallel channels. The seven channels comprise channels 1–6 for bits 0–5 in IBM magnetic tape code BA 8421 and channel 7 for the parity bit.

Information and Control Flow From Magnetic Tape Transport to RT Matrix

A 16-lead bus extends from the magnetic transport to the 16 cells of the associated RT word of the RT matrix such as 208 of FIG. 2, for example word 63.

The magnetic transport converts the magnetic impulses derived from the magnetic tape to electrical signals with bits 0–6 as found on the magnetic tape impressed as electrical high (logic "1") and low (logic "0") signals on the first seven leads. The magnetic transport generates and impresses electrical high and low control signals on the next seven leads. The remaining two leads are not used for transmission from the magnetic transport to the RT matrix. Accordingly, the last 2 bits of the 16-bit RT word will always be logic "0's."

Following is a chart of these leads and bits:

| Lead | Bit | Function |
|---|---|---|
| 1 | 0 | Data |
| 2 | 1 | Data |
| 3 | 2 | Data |
| 4 | 3 | Data |
| 5 | 4 | Data |
| 6 | 5 | Data |
| 7 | 6 | Even Parity Bit |
| 8 | 7 | Read Clock — indicates a character code is present |
| 9 | 8 | Load Point — indicates the tape is positioned at load point and tape unit is in ready status |
| 10 | 9 | End of Tape Past — indicates end of tape (EOT) tab has passed the photosense assembly since the last rewind command was received and tape unit is in ready status. |
| 11 | 10 | Write Enabled — indicates the write data electronics are enabled and tape unit is in ready status. |
| 12 | 11 | End of Tape — indicates end of tape tab is under photosense assembly. |
| 13 | 12 | Rewinding — indicates the tape unit is rewinding. |
| 14 | 13 | Automatic — indicates mode of operation, and controllable by the processor when in ready status. |
| 15 | Vacant | |
| 16 | Vacant | |

The 6 bits 0–5 of the IBM Code are translated by the PCU–DHU to derive the 4 character bits in the present machine code as follows:

| Magnetic Tape IBM Code BA 8421 | 4 Bit Machine Code |
|---|---|
| 001010 | 0000 |
| 000001 | 0001 |
| 000010 | 0010 |
| 000011 | 0011 |
| 000100 | 0100 |
| 000101 | 0101 |
| 000110 | 0110 |
| 000111 | 0111 |
| 001000 | 1000 |
| 001001 | 1001 |
| 110001 | 1010 |
| 110010 | 1011 |
| 110011 | 1100 |
| 110100 | 1101 |
| 110101 | 1110 |
| 110110 | 1111 |

Bits 0–13 are received in the RT word and "0's" always occupy the last two cells of the RT word. These 16 bits are loaded via the MUX into the Memory Register MR and DHU and from thence into the A Register 406.

(As before stated, similar arrangements are used for reception of information and control signals from other equipments of the system.)

Information and Control Flow From SMR Matrix to Magnetic Tape Transport

Two SMR words designated SMR–1 and SMR–2 are transmitted from the SMR matrix via the associated 16 leads to the magnetic tape transport enabling the tape transport to place magnetic signals on the tape. SMR–1 and SMR–2 words might occupy word 1 and word 2 of the SMR matrix for example. SMR–2 word would be transmitted first for control purposes; and then SMR–1 word for data and write permit, the data in SMR–1 in bits 0–5 being provided by the PCU in the IBM Code BA 8421. The contents of these SMR words is as follows:

SMR-1

| Lead | Bit | Function |
|---|---|---|
| 1 | 0 | Data |
| 2 | 1 | Data |
| 3 | 2 | Data |
| 4 | 3 | Data |
| 5 | 4 | Data |
| 6 | 5 | Data |
| 7 | 6 | Parity |
| 8 | 7 | Write Permit |
| 9 | Vacant | |
| 10 | Vacant | |
| 11 | Vacant | |
| 12 | Vacant | |
| 13 | Vacant | |
| 14 | Vacant | |
| 15 | Vacant | |

SMR-2

| Lead | Bit | Function |
|---|---|---|
| 1 | 0 | Write Reset - this command bit resets the phase of the write head drivers, generally for the purpose of generating longitudinal end of record (EOR) parity characters. |
| 2 | 1 | Vacant |
| 3 | 2 | Forward Drive - this command causes the tape drive to run in the forward direction. When removed, the tape drive stops. |
| 4 | 3 | Reverse Drive - this command causes the tape drive to run in the reverse direction. When removed, the tape drive stops. |
| 5 | 4 | Rewind - this command causes the tape to rewind. The tape drive continues to rewind when this command bit is removed. |
| 6 | 5 | Unload - this command causes the tape unit to rewind and places it in the local operating mode. |
| 7 | 6 | Write Clock - this command controls the writing of characters onto the tape. Data is strobed onto the tape on the trailing edge of the pulse. |
| 8 | 7 | Read Reset - this command resets the input and output registers, as long as it is on, to the "zero" state. |
| 9 | Vacant | |
| 10 | Vacant | |
| 11 | Vacant | |
| 12 | Vacant | |
| 13 | Vacant | |

| | |
|---|---|
| 14 | Vacant |
| 15 | Vacant |

EXECUTION OF PRELOADER PROGRAM TO BRING IN LOADER PROGRAM FROM TELETYPE TAPE

| | | |
|---|---|---|
| 1st Word | 1st Character | IDW Instruction: Placed in MR, transferred to Arithmetic and Logic unit, observing logic function OR. Transferred to A. Shift instruction SHL, A12: transfer to DR. Shift left twelve places. Transfer into A. Rotate instruction RTL, 1, 4: contents of A and I transfer into DR and MR respectively. Rotated left four places. Contents of DR and MR transfer into A and I respectively. |
| | 2nd Character | Same as 1st character. |
| | 3rd Character | Same as 1st character. |
| | 4th Character | Same as 1st character plus word packed in I; plus contents of I stored in X. |
| 2nd Word | 1st Character | Same as 1st character, 1st word. |
| | 2nd Character | Same as 1st character, 1st word. |
| | 3rd Character | Same as 1st character, 1st word. |
| | 4th Character | Same as 1st character, 1st word; plus word packed in I; add contents of X to I; results stored in I; contents of I transferred to U. |
| 3rd Word | 1st Character | Same as 1st character, 1st word. |
| | 2nd Character | Same as 1st character, 1st word. |
| | 3rd Character | Same as 1st character, 1st word. |
| | 4th Character | Same as 1st character, 1st word; Plus word packed in I; contents of I stored in SMU |
| Succeeding Words | | Similar to 3rd word. |

execution of loader program to initialized parameters into SMU

Loading of data tables in SMU and X Register.

Execute LBH, 1 which loads $1_8$ in BH Register.

Execute LBG, 0 which loads $0_8$ in BG Register.

Execute LDA, DH, Data 3 which loads $177770_8$ in A.

Execute STA, DH, Data 4 which transfers $177770_8$ from A to SMU Data 4.

Execute LDA, DH, Data 5 which loads $177774_8$ into A.

Execute STA, DH, Data 6 which transfer $177774_8$ from A to SMU Data 6.

Execute LDA, N, 0 which loads A with all zeros.

Execute 5 STA, DH, — which transfers contents of A into SMU Data 7, 8, 9, 12, and 13.

Execute LDA, N, 1 which loads $1_8$ in A.

Execute STA, DH, Data 14 which transfers contents of A to SMU Data 14.

Execute LDX, N, 0 which loads X with all zeros.

Execute LDA, N, 0 which loads A with all zeros.

Execute STA, DH, Data 7 which stores contents of A in Data 7.

continued execution of loader program to address teletype

Execute LDQ, N, $200_8$ to load $200_8$ in Q.

Execute SHL, 2, Q to shift contents of Q left 2 positions. This changes $200_8$ to $1,000_8$ which is address of teletype for an RT word.

Continued Execution of Loader Program To Bring in Bootloader Program from Teletype Tape Execute an IDW instruction

| | | |
|---|---|---|
| 1st word | 1st Character | Place in MR, then A. Place contents of A in Arithmetic and Logic Unit — observe bit 10 for character. Place contents of A in R. Place in MR, then A. Place contents of A in Arithmetic and Logic Unit — observe bit 10 for character. Compare all 16 bits of R and A. Store A in S. Place contents of SMU Data 12 position word in A for purpose of testing for last word of program. Place contents of R in A. Test 8th bit of A for a 1 (for odd parity). Add 1 to SMU Data 6 position word (character counter and test for overflow which indicates 4th character. Place contents of R in A again (contents of A was destroyed during another 17 bit parity check, not described). Place contents of A in Arithmetic and Logic Unit and do a logical product with $17_8$ to extract character, Store answer back in A. Store A in R. Load contents of SMU Data 7 word (all zeros) into A (reason become better understood later). Add contents of R to A. Transfer A to Data 7 (which now contains the first character). Load SMU Data 14 into A which places $1_8$ in A. Test A for all zero condition to determine whether this is 4th character. No, because A is not all zeros. Load Data 7 back in A. Shift A four positions to left. Store A in Data 7 |
| | 2nd Character | Same as 1st character. |
| | 3rd Character | Same as 1st character. |
| | 4th Character | Same as 1st character up to and including test for overflow. Subtract $1_8$ from Data 14, indicating a possible branch upon subsequent test. Same up to and including test for 4th character, observing contents of A is 0. Add $1_8$ to Data 14. Load Data 5 in A i.e. (177774). Store contents of A in Data 6. Test contents of X for 0 to see if this is 1st word. Load Data 7 in A (entire first word). Store A into Data 8 (starting address of program to be loaded). Add $1_8$ to X. |
| 2nd Word | 1st Character | Same as 1st word, 1st character. |
| | 2nd Character | Same as 1st word, 1st character. |
| | 3rd Character | Same as 1st word, 1st character. |
| | 4th Character | Same as 1st word, 4th character up to and including testing X for 0. X will be $1_8$ indicating not 1st word. Load contents of X into A. Compare contents of A which is $1_8$ to SMU Data 15 which is $1_8$. Test for equality. Answer is "yes" it is equal. Load SMU data 7 into A (number of words in program). Stores contents of A in SMU data 9. Add contents of SMU data 8 to A. Subtract $1_8$ from A which gives address of last word in bootloader program. Store contents of A in SMU data 13. Compare contents of A to SMU data 10 which contains $400_8$ (which had previously been stored by use of MCO). Is starting address of loader greater than last address of bootloader (to guard against destroying loader). Load A with SMU data 8 which is starting address of bootloader. Compare contents of A with SMU data 11 which contains last address of loader program $605_8$ (To test if starting address of bootloader is greater than last |

| | | |
|---|---|---|
| | | address of loader. Load SMU data 8 into I (starting address of bootloader). Add $1_8$ to X. |
| 3rd Word | 1st Character | Same as 1st word, 1st character. |
| | 2nd Character | Same as 1st word, 1st character. |
| | 3rd Character | Same as 1st word, 1st character. |
| | 4th Character | Same as 1st word, 4th up to and including test for equality. Answer is "No" it is not equal. Load SMU data 7 in A (contains four characters). Store contents of A into SMU at address specified by contents of I. Load SMU data 13 into A. Compare contents of A (last address) with contents of I (present address. Do not test equal. Not end of record. Increment address register I by 1. |
| 4th Word | 1st Character | |
| Last word | 4th Character | Compare contents of A (last address with contents of I (present address). Test equal. Add $1_8$ to SMU data 12 to indicate a branch. |
| Input Next Character (EOT Code) | | Same as 1st word, 1st character up to and including test for last word of program in which case this is last word. Contents of A = $1_8$. Subtract $1_8$ from data 12. Load contents of R to A (EOT Code). Do logical product of A with $377_8$ which extracts end of tape character (EOT). Compare contents of A with $204_8$, testing for equality. Equality exists. Load $6_8$ into A. Store contents of A in SMU address $605_8$ (Halt). Load $200_8$ into Q. Shift Q left 3 positions which enables addressing of Teletype for an SMR word. Load $200_8$ into A Shift A left 2 positions. Execute ODW which outputs a "1" in SMR1 bit 9 which causes teletype shut down. |

Execution of Bootloader Program

Execution of the Bootloader Program accomplishes the following:

1. Disables interrupts, including the 10-millisecond clock interrupt for duration of loading from magnetic tape.
2. Rewinds the tape back to the load point. (It assumed that the attendant has threaded the magnetic tape so that the load point has passed the read heads.)
3. Advances the tape to bring in the O–256 word program O into the magnetic tape transport control memory.
4. As the tape continues to advance, the first TCB will be stored in SMU at location $7430_8$–$7437_8$, which specifies the size and number of succeeding records, etc., and the starting address of the first word of the first record.
5. Effects reading of longitudinal record clock character (LRCC) to verify longitudinal parity check.
6. The CPU by an ODW stops the tape and then checks for read errors.
7. Assuming no read errors, CPU by an ODW starts tape again.
8. Brings in first record of program, composed of specific number of words as specified by the associated TCB block temporarily stores this first record in the buffer area of SMU set aside from this purpose at location $07456_8$–$10056_8$.
9. CPU by ODW stops tape; then performs various verifying checks including LRCC check; then stores this record in assigned SMU location.
10. This same process is continued down through the number records specified in the TCB block.
11. Following the last record, an end of file character (EOF) is brought in.
12. CPU by an ODW instruction stops the tape by removing the forward drive bit of SMR–2.

It is understood that these various steps involve the execution of many instructions.

We claim:

1. In a central processing system for use with an automatic telephone system processor control means PCU, preloader means PRL located in said central processing system and external to the processor control means PCU and having a plurality of hardwired logic circuits which are operable to generate word instructions for said processor control means for the purpose of initiating loading of software program information into said central processing system, data handling means DHU located in said central processing system and external to said processor control means PCU including address means for providing addresses to said preloader means PRL, means in said preloader means for enabling said hardwired logic circuits to provide correspondingly different ones of said word instructions for different addresses input thereto, means for forwarding said word instructions to said processor control means PCU, and means in said processor control means PCU responsive to receipt of certain of said correspondingly different ones of said word instructions from said preloader means to control said data handling means to provide correspondingly different addresses to said preloader means PRL.

2. A system as set forth in claim 1 in which said means in said preloader means PRL include address decoder means, data input means for coupling input data from said data handling means DHU to said address decoder means, and control means connected to said processor control means PCU for selectively enabling said address decoder means to decode the input data.

3. A system as set forth in claim 1 in which said means in said processor control means PCU includes control logic means for providing command signals to said data handling means DHU in response to the instruction word output from said preloader means PRL, instruction register means connected to said control logic means, and gating means for gating said instructions to said instruction register means.

4. A system as set forth in claim 3 which includes storage memory means SMU, and in which said gating means in said processor control means is operative to also gate the instruction word output from said storage memory means SMU to said instruction register means.

5. A system as set forth in claim 3 in which said data handling unit DHU includes memory register means, and said gating means also gates the instruction word output from said preloader means PRL to said memory register means in said data handling means DHU.

6. A system as set forth in claim 1 which includes master control panel means MCP having start means for operation by an attendant, and in which said processor control means PCU includes means for enabling said data handling means DHU responsive to operation of said start means, and in which said data handling means DHU includes means responsive to said enablement to control said address means to initiate the forwarding of addresses to said preloader means PRL.

7. A system as set forth in claim 1 which includes storage memory means SMU, program source means for providing said software program information, and in which said processor control means PCU is operative in response to the instructions provided by said preloader means PRL to enable said data handling means DHU to provide at least a part of said software program information to said storage means SMU for storage thereat.

8. A system as set forth in claim 7 in which said data handling means DHU includes register means for registering the words of said software program received from said program source means, and in which said processor control means PCU provides control signals for selectively transferring certain of said registered words to said storage memory means SMU, whereby the other of said registered words are retained in said data handling means DHU for control purposes.

9. A system as set forth in claim 7 in which said software program provided for storage in said storage memory means includes a loader program.

10. A system as set forth in claim 7 in which said part of said software program is provided by a paper tape source, and in which said part of said software program is used to control said processor control means PCU and said data handling means DHU to input program instructions from a magnetic tape source to said storage memory means.

11. A system as set forth in claim 1 in which said data handling unit DHU includes memory register means, and means for also forwarding the word instruction output from said preloader means PRL to said memory register means, and in which said data handling unit DHU also includes a plurality of memory array registers connected to receive information from said memory register means for temporary storage in a data processing operation.

12. A system as set forth in claim 11 in which certain bits of an instruction word from said preloader means PRL stored in said memory register means designate the address of one of said memory array registers.

13. A system as set forth in claim 11 in which said logic circuits in said preloader means PRL are enabled in response to certain address inputs to provide a word instruction to said memory register means which includes a plurality of data constants.

14. A system as set forth in claim 11 in which said logic circuit means in said preloader means PRL is operative in response to predetermined address inputs to provide a word instruction to said memory register means which has a portion thereof selected for concatination with a portion of a different word stored in said memory array register means.

15. A system as set forth in claim 11 in which said memory array registers include a plurality of discrete registers BG, BH, X, WR, at least certain of which store word information, and means in said processor control means for effecting forwarding of a portion of one of said words from a selected one of said discrete registers BG, BH, to said memory register means for concatination with a portion of a word in said memory register means received from said preloader means PRL.

16. A system as set forth in claim 15 which includes means in said processor control means PCU for transferring the word information stored in a further one of said discrete registers X for combining with the word information stored in said memory register means, and means for thereafter enabling transfer of the resultant word information to a further one of said memory array registers WR for storage.

17. In a central processing system for use with an automatic telephone system, processor control means PCU including instruction register means, storage memory means SMU, means for providing data to said storage memory means SMU including input means connected to a data source, data handling means connected to said input means including memory register means for storing the data received over said input means from said data source, preloading means for providing a source of word instructions including means for providing certain of said word instructions from said preloading means simultaneously to said instruction register means and to said memory register means, and means in said processor control means PCU operative in response to receipt of predetermined ones of said word instructions to control said data handling means DHU to transfer information in said memory register means to said storage memory means SMU.

18. In a central processing system for use with an automatic telephone system, processor control means PCU, storage memory means SMU, data handling means DHU controlled by said processor control means PCU to provide words to said storage memory means SMU, said data handling means including arithmetic and logic circuit means for processing at least one word input to said data handling means, which word is comprised of a plurality of characters, each character being comprised of a plurality of bits, a transfer path for selectively extending an output from said arithmetic and logic circuit means to associated equipment in said system, a plurality of character marker means, each of which identifies a different character of a word and a plurality of bit marker means, each of which identifies a different bit of a character, enabling means for simultaneously enabling a selected one of said character marker means and at least one of said bit marker means, and gating means connected to said character and bit marker means operative to gate only the marked bit in the marked character of said word from said arithmetic and logic circuit means in said data handling means over said transfer path to said associated equipment.

19. A system as set forth in claim 18 in which said enabling means are located in said processor control means PCU.

20. A system as set forth in claim 19 in which said enabling means are operative to simultaneously enable at least one of said character marker means and a plurality of said bit marker means to effect gating by said gating means of a corresponding number of bits of said one character in said word over said transfer path.

21. A system as set forth in claim 20 in which said gating means include one character gating means and two bit gating means connected to effect selective gating of only two bits.

22. A system as set forth in claim 19 in which said enabling means are operative at times to enable a plurality of said character marker means and each of said bit marker means to effect gating of the corresponding characters in said word to said transfer path.

23. A system as set forth in claim 18 which includes a plurality of memory array registers, and in which said transfer path is connected between said arithmetic and logic circuit and said memory array registers.

24. A system as set forth in claim 18 in which said associated equipment includes a plurality of memory array registers in the data handling unit DHU for storing data provided over said transfer path, further register means, and in which said processor control means PCU includes control means for selectively controlling transfer of information from said memory array registers to said further register means on a word basis.

25. A system as set forth in claim 24 which includes means selectively enabled by said processor control means PCU to transfer the information from said further register means on a whole word basis.

26. A system as set forth in claim 25 in which said further register means includes data register means, and in which said processor control means PCU effects gating from said data register means on a character basis.

27. A system as set forth in claim 26 in which said data handling means DHU includes means for providing bits of a given logic level for a selected character simultaneous with the gating thereof from said data register means to said arithmetic and logic circuit means.

28. A system as set forth in claim 24 in which said data handling means DHU includes gating means controlled by said processor control means PCU to selectively gate individual characters of a word from said memory register means into said arithmetic and logic circuit means.

29. A system as set forth in claim 18 in which said data handling means further includes a plurality of memory array registers for storing data provided over said transfer path, and in which said processor control means has means for effecting selective transfer of one-half of a word which is stored in one of said memory array registers to said memory register means.

30. A central processing system for use with an automatic telephone system as set forth in claim 18 in which said associated equipment in said data handling means DHU includes a plurality of memory array registers, and in which said data handling means DHU includes data register means for storing word bits received from one of said memory array registers, shift control means controlled by said processor control means PCU for effecting shifting of the bits stored in said data register means selectively in either of two directions, and output means for transferring said shifted bits to one of said memory array registers.

31. A system as set forth in claim 30 in which said bits are shifted 12 places to the left.

32. A system as set forth in claim 30 which includes memory register means, and in which said processor control means PCU transfer said bits from said one of said memory array registers to said data register means, and further bits from a second one of said memory array registers to said memory register means, and in which said shift control means are operated by said processor control means PCU to rotate the bit information in said data register means and said memory register means with spill-over of bits therebetween.

33. A system as set forth in claim 32 in which said processor control means effects transfer of said bits as rotated into said one and said second memory array registers respectively.

34. A system as set forth in claim 30 in which said shift control means includes separate clock means and in which said processor control means PCU provides a signal for enabling said shift control means including said separate clock means.

35. A system as set forth in claim 30 which includes first clock means for driving said processor control means PCU and second clock means for driving said shift control means and control means enabled by said processor control means PCU to selectively enable said second clock means and means in said shift control means responsive to starting the second clock means for providing a signal to the processor control means PCU to simultaneously terminate the output of said first clock means.

36. A system as set forth in claim 35 in which said shift control means includes means for providing a signal to said processor control means PCU at the end of each period said shift control means are enabled, and means in said processor control means for restarting said first clock means responsive to receipt of said signal.

37. A central processor system for use with an automatic telephone system as set forth in claim 18 which includes first clock means for said processor control means PCU, a communication path comprising a multiplexer circuit MUX and data transfer means DTU connected to equipment external to said central processor system, second clock means for said multiplexer circuit MUX, control means for enabling said communication path to effect communication between said external equipment and said data handling means DHU over said data transfer means DTU and said multiplexer means MUX, means in said processor control means PCU for enabling said second clock means, and clock control means responsive to start of said second clock means to stop said first clock means.

38. A system as set forth in claim 37 in which said clock control means signal said processor control means PCU to restart its driving clock means at the end of enablement of said communication path.

39. A system as set forth in claim 37 which includes means for providing an output data word instruction to said processor control means PCU and said data handling means DHU, and in which the data handling means is responsively enabled thereby to output a word over said communication path including said multiplexer circuit MUX and said data transfer means DTU.

40. A system as set forth in claim 37 which includes means for providing an input data word instruction to said processor control means PCU and said data handling means DHU, and in which data handling means is responsively enabled thereby to input a word over said data transfer means DTU and said multiplexer circuit MUX to said data handling means.

41. A system as set forth in claim 18 which includes preloader means in said central processing system which provides a source of word instructions, and means in said processor control means PCU operative in response to receipt of predetermined ones of said word instructions from said preloader means to control said data handling means DHU to provide at least a part of a software program to said storage means SMU for storage thereat.

* * * * *